April 30, 1968   G. G. D. SOUTHARD ETAL   3,380,399
REMOTE CONTROL AND SUPERVISION SYSTEM FOR A RAILROAD TRAIN
Filed June 30, 1965   56 Sheets-Sheet 10

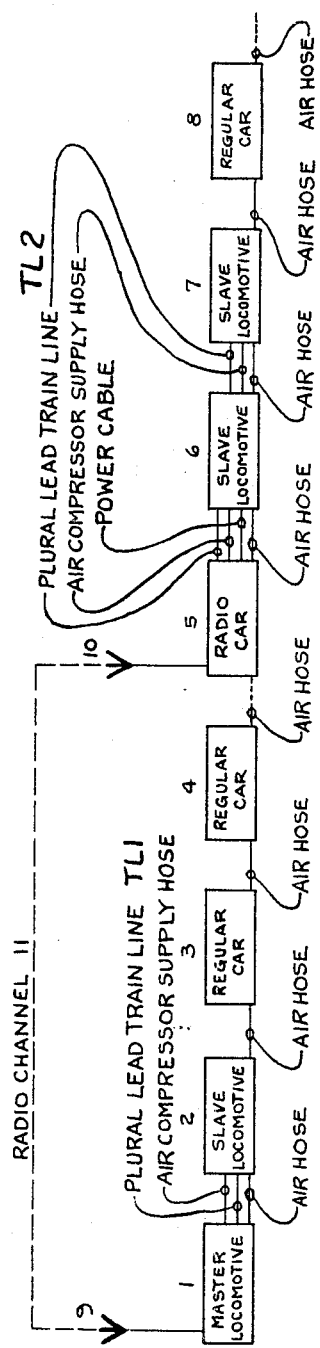

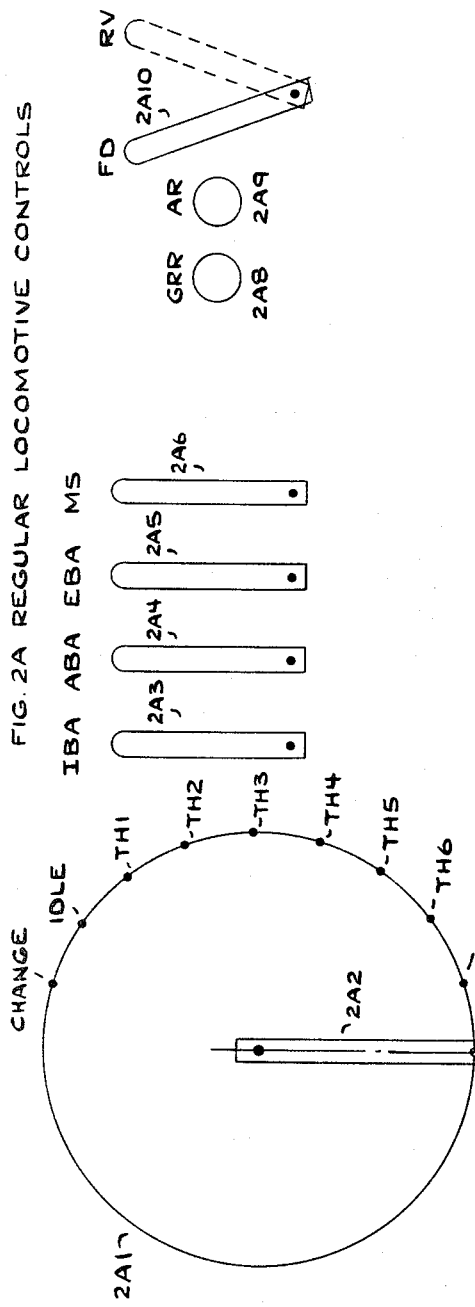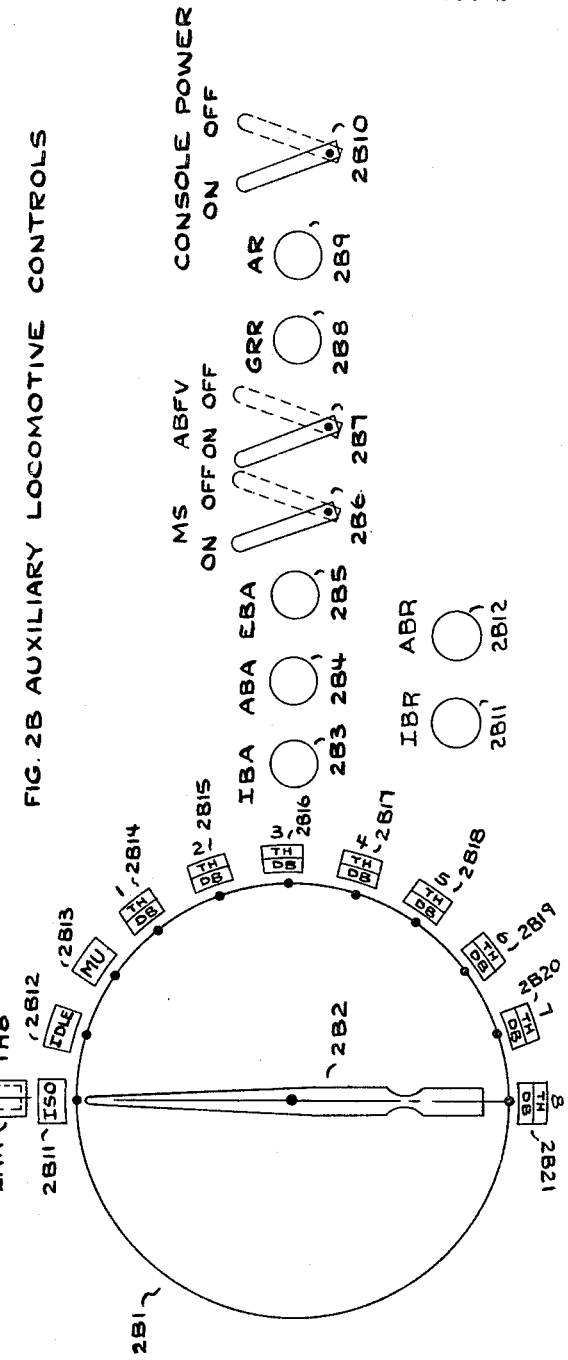

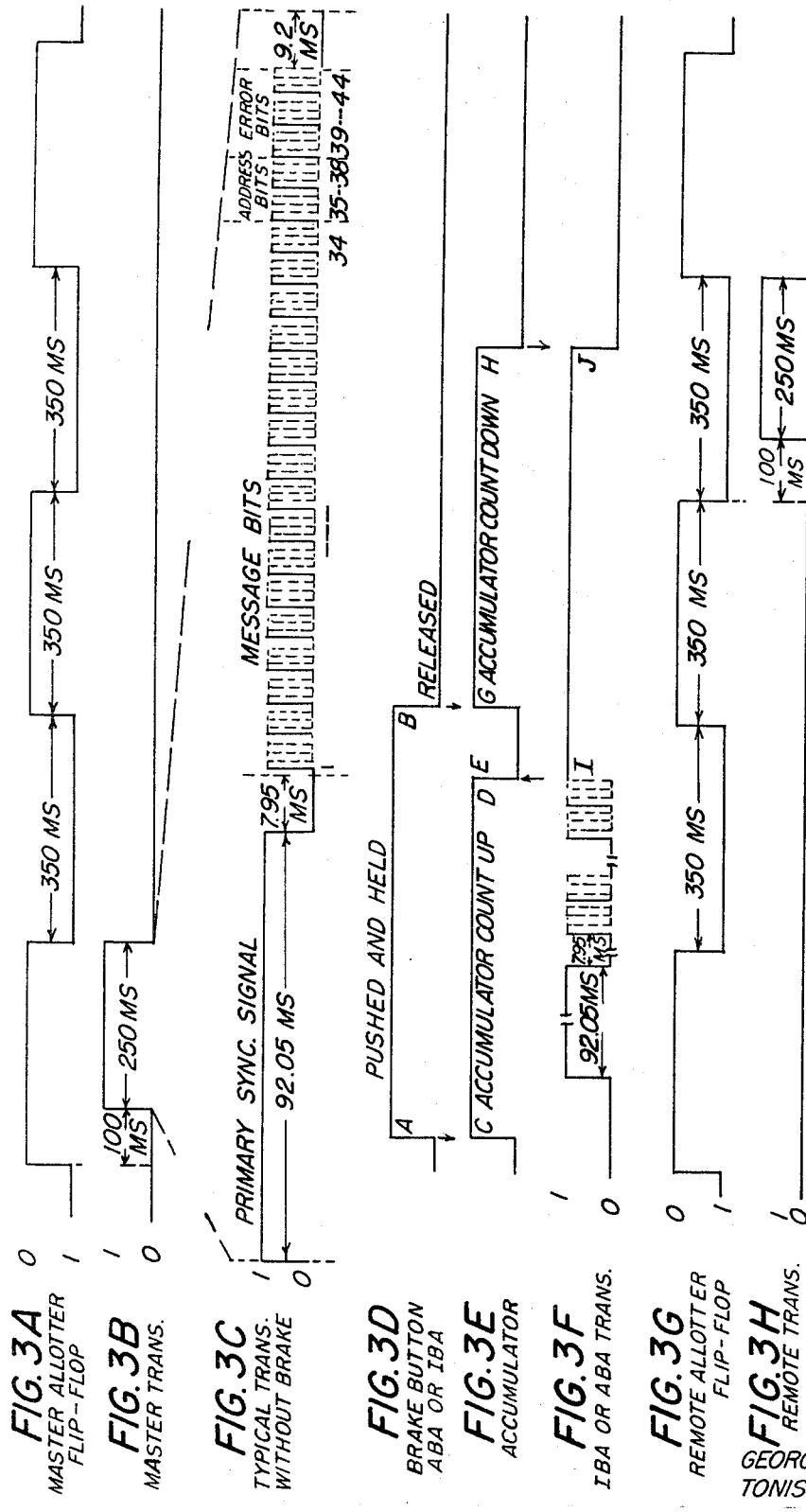

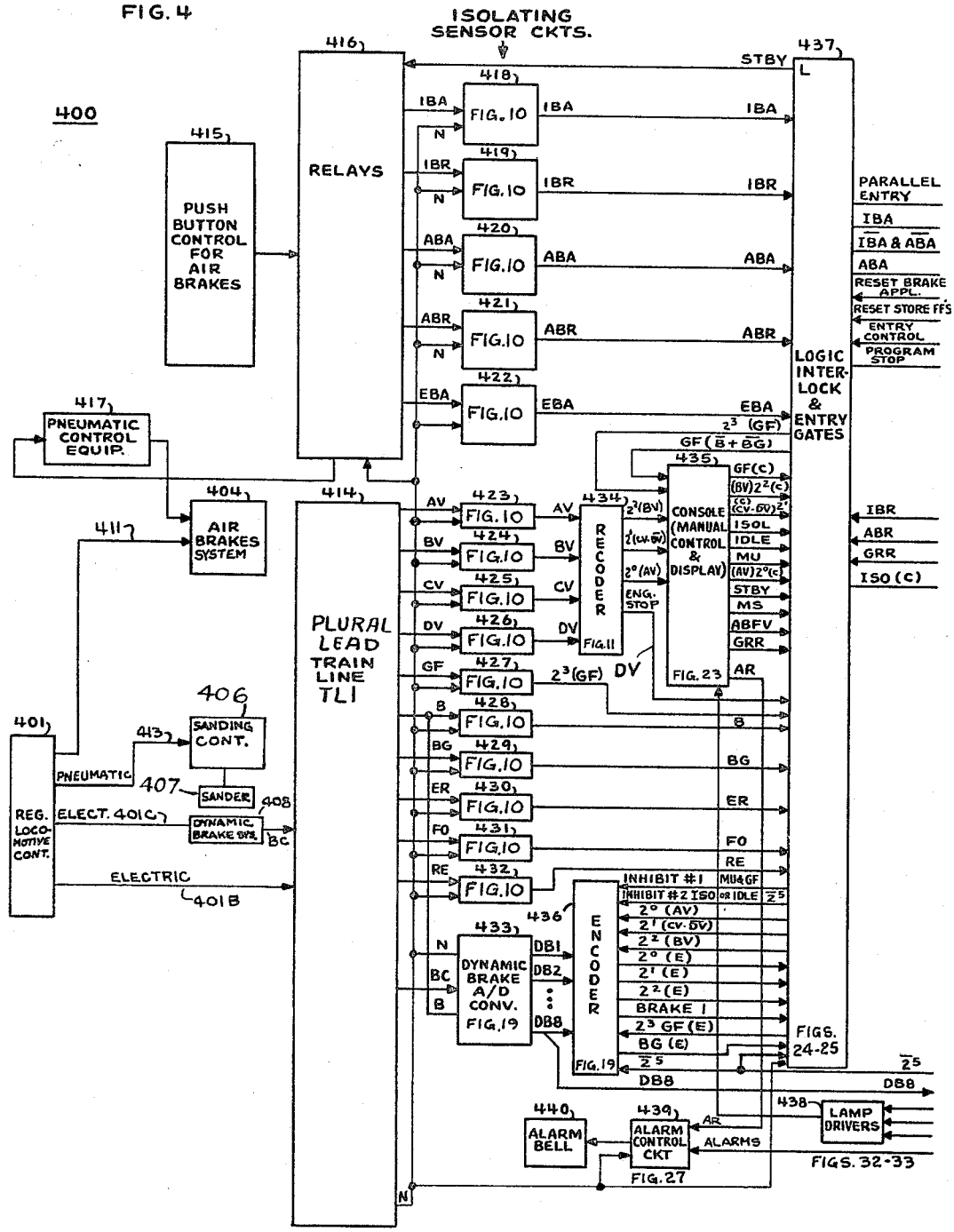

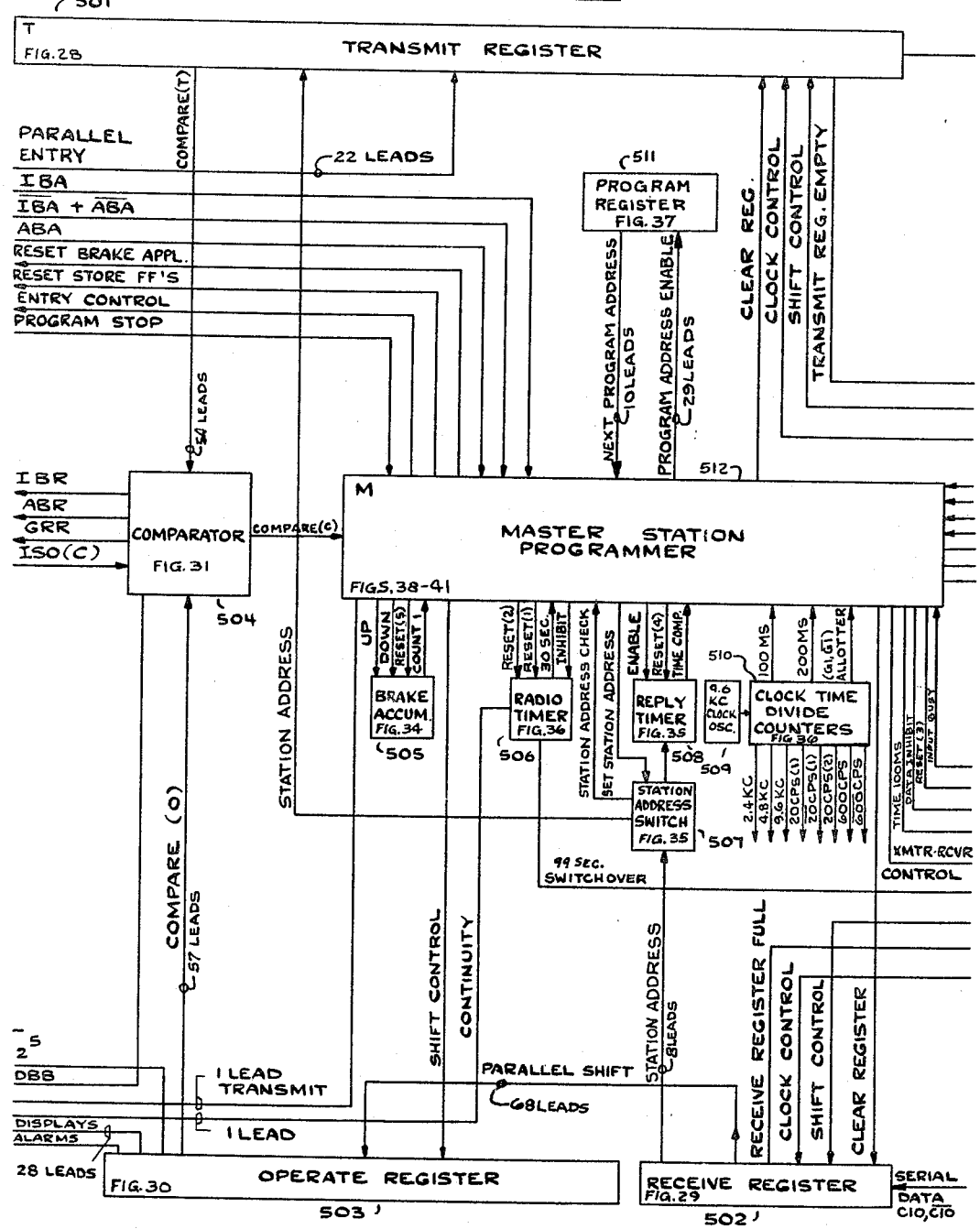

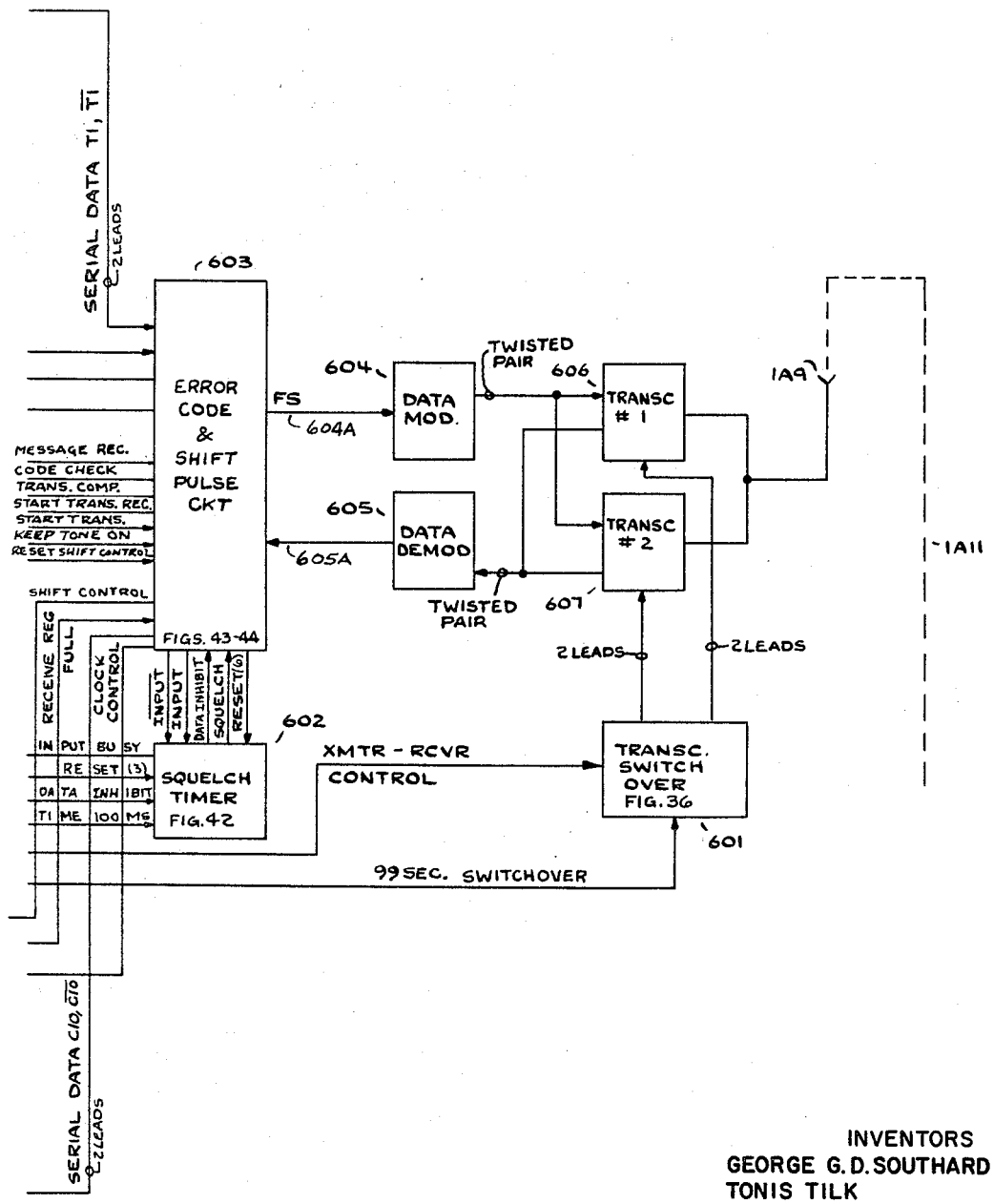

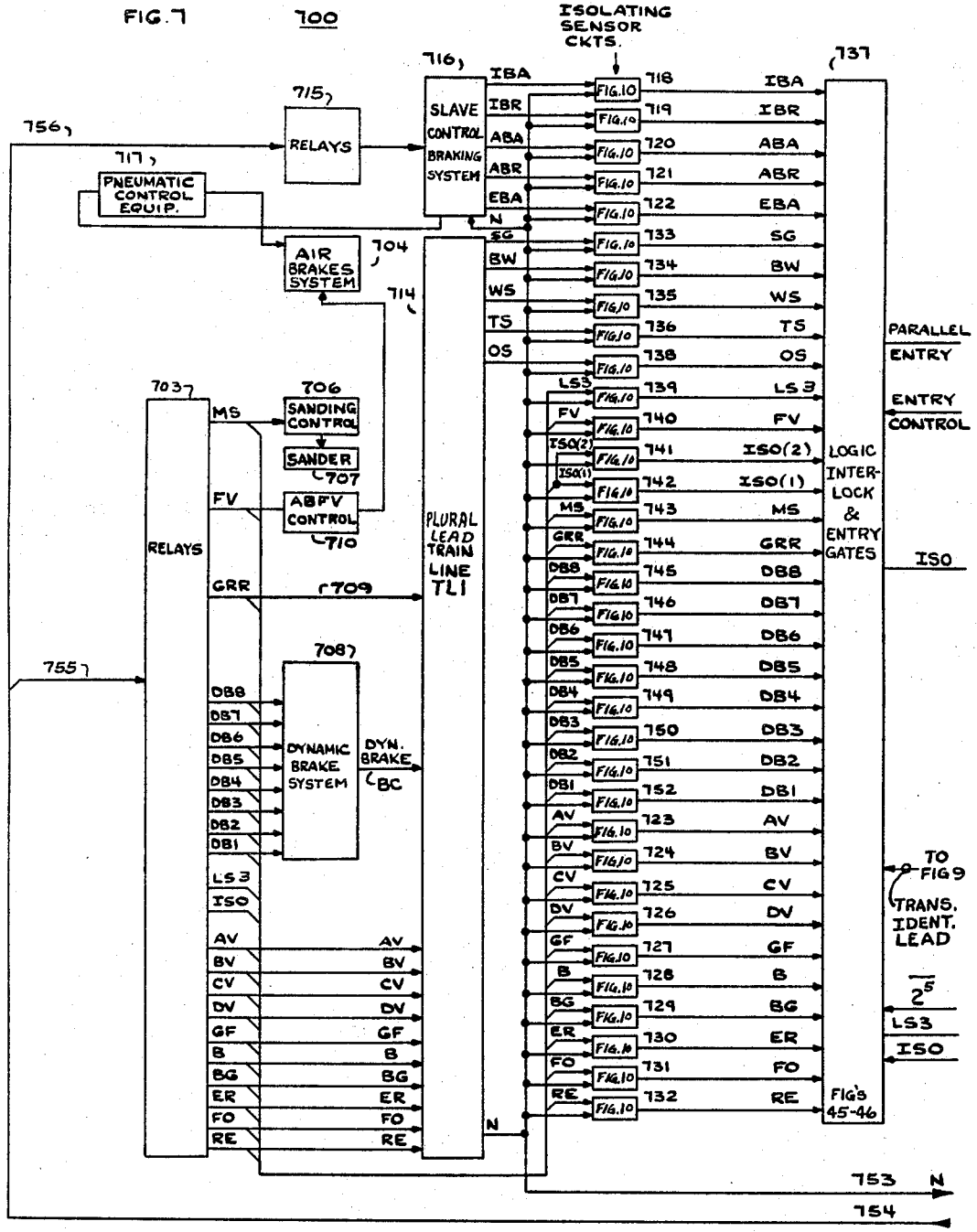

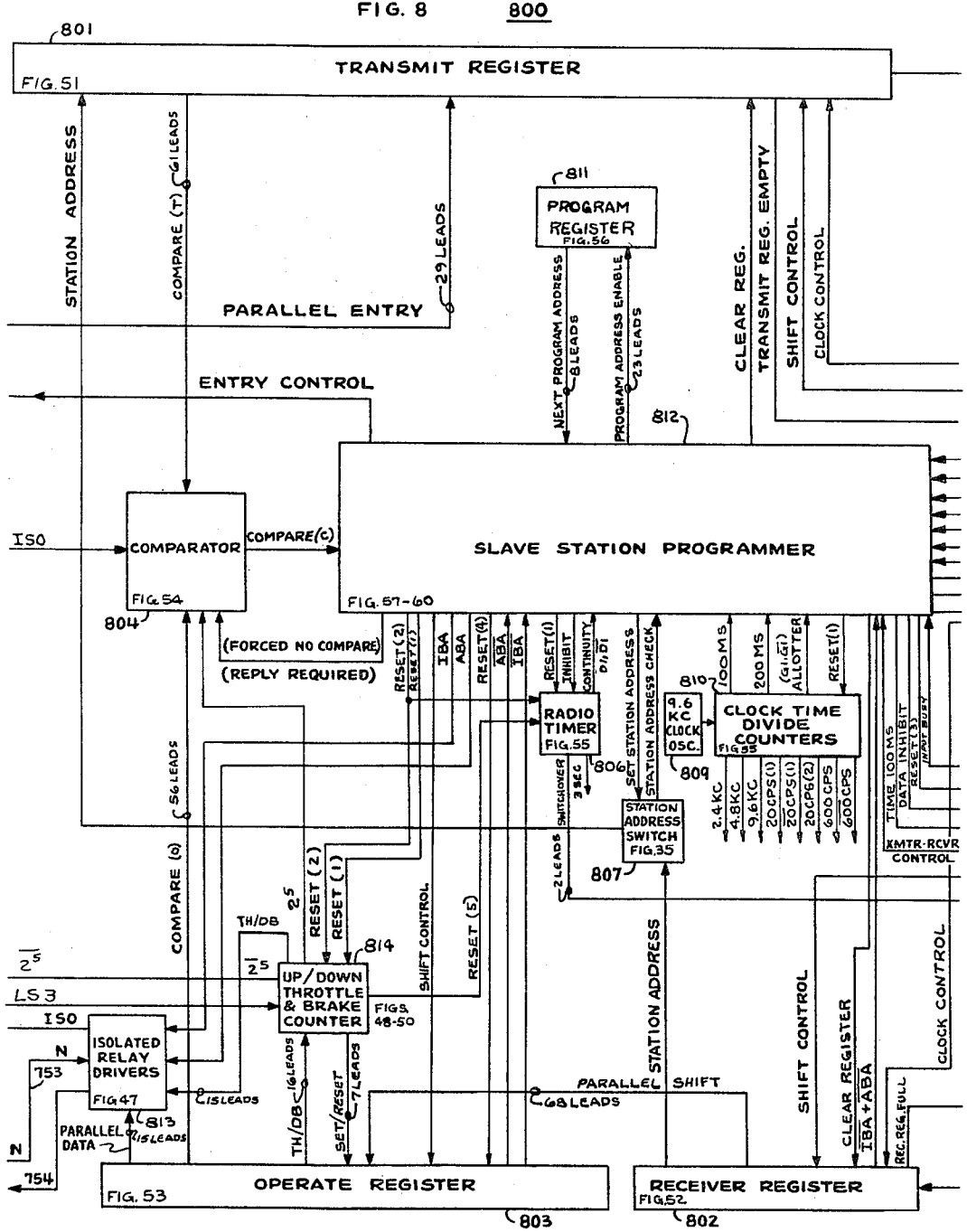

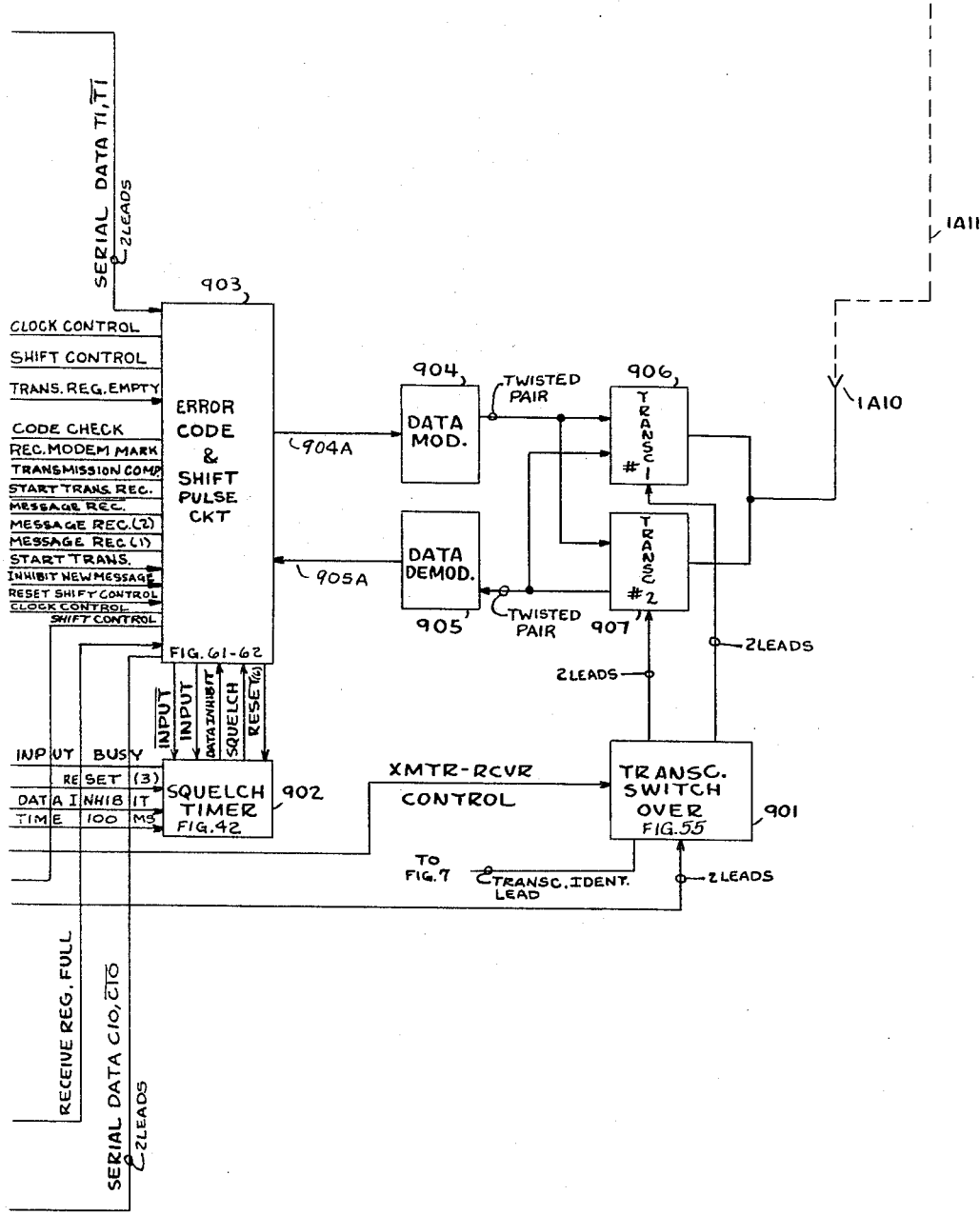

FIG. 10 ISOLATING SENSOR CKT.

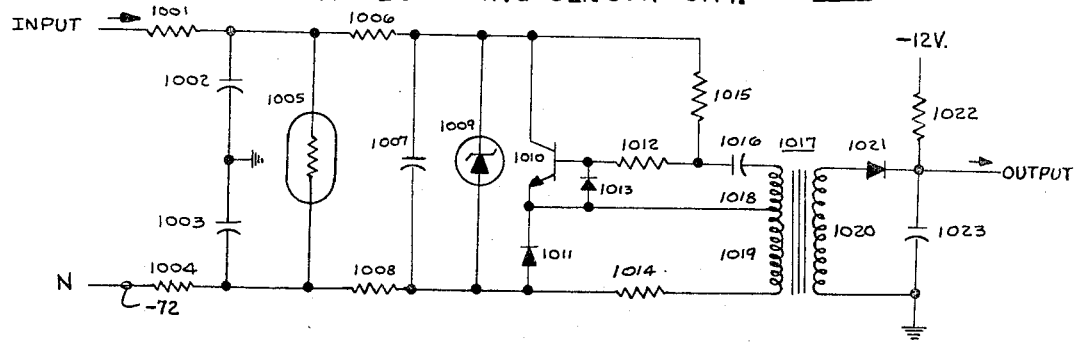

FIG. 11 RECODER

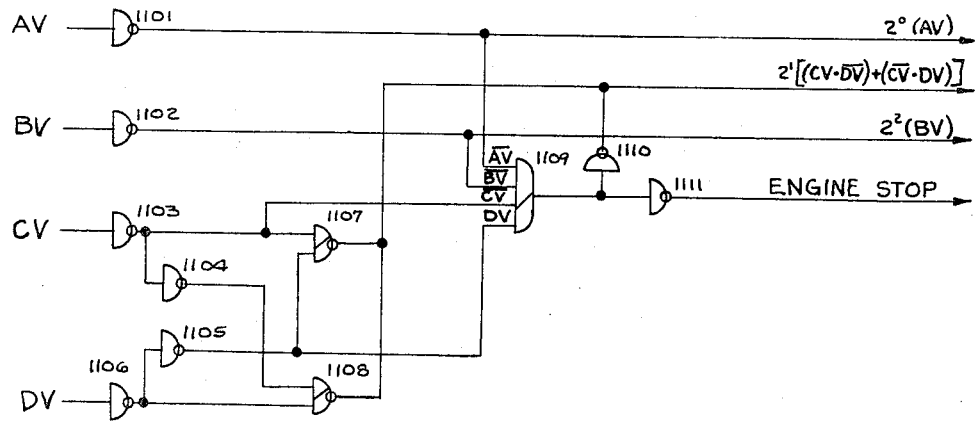

FIG. 12
ENGINE
POTENTIALS $\left.\begin{array}{l}+\\ -(N)\end{array}\right\} 72 \pm 20V.$

FIG. 13
SYSTEM
POTENTIALS

12V. = LOGIC "0"
0V. = LOGIC "1"
-12V. = BIAS
NOTE: 0V. = CHASSIS GRD.

FIG. 14
CHANNEL
LOGIC

HIGHER TONE = LOGIC "1"
LOWER TONE = LOGIC "0"

FIG. 15
PRIMARY SYSTEMS
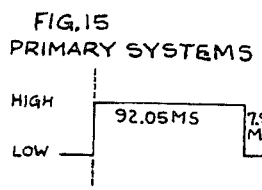

FIG. 16
SECONDARY SYNC. SIG.
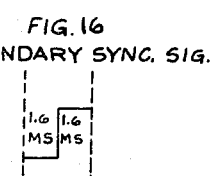

FIG. 17
LOGIC "0" BIT
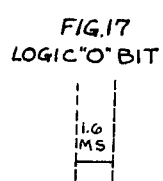

FIG. 18
LOGIC "1" BIT
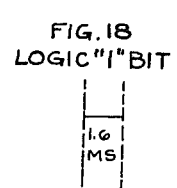

INVENTORS
GEORGE G. D. SOUTHARD
TONIS TILK

BY *Bruns Jackson Batcher & Dunner*

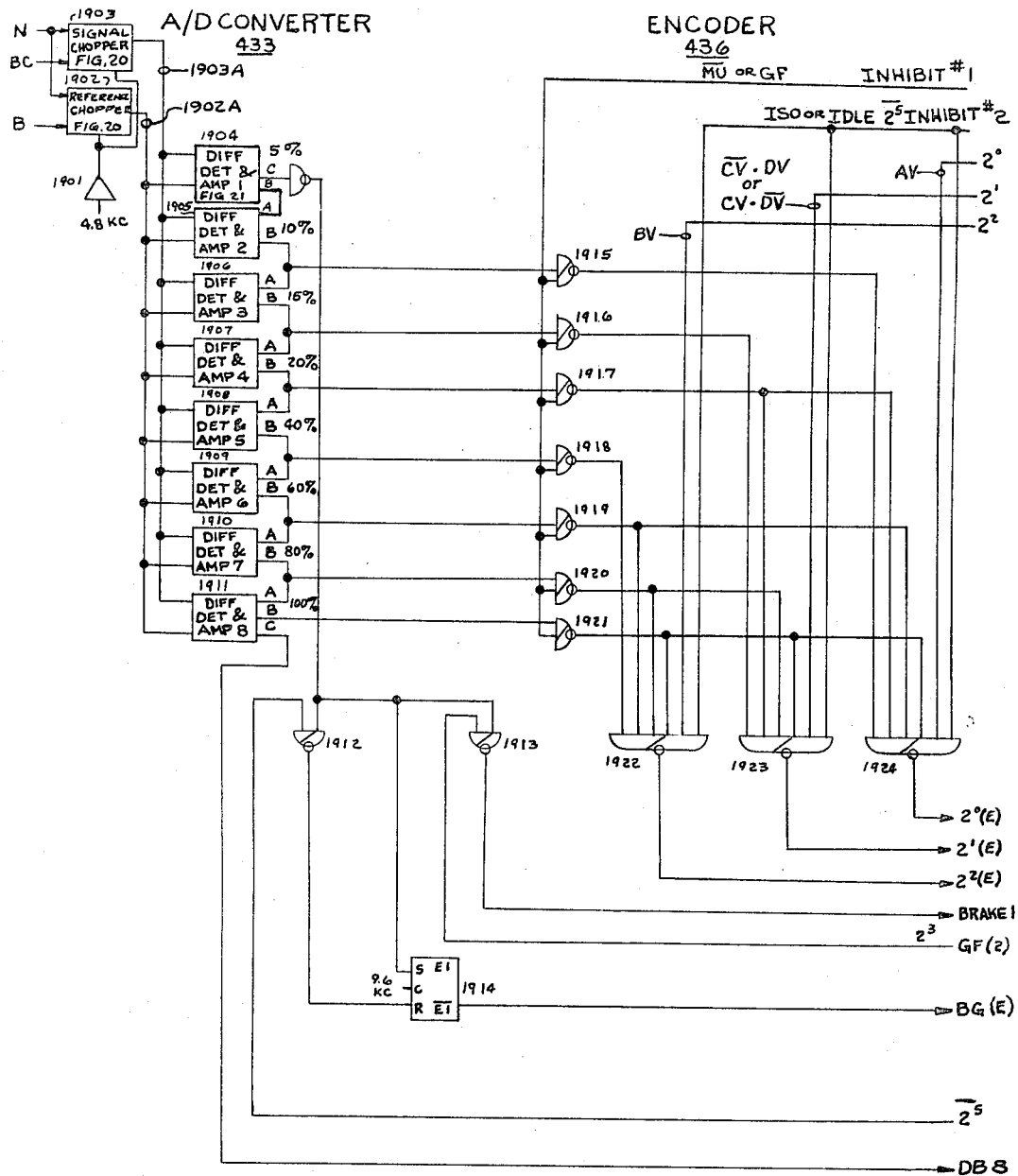

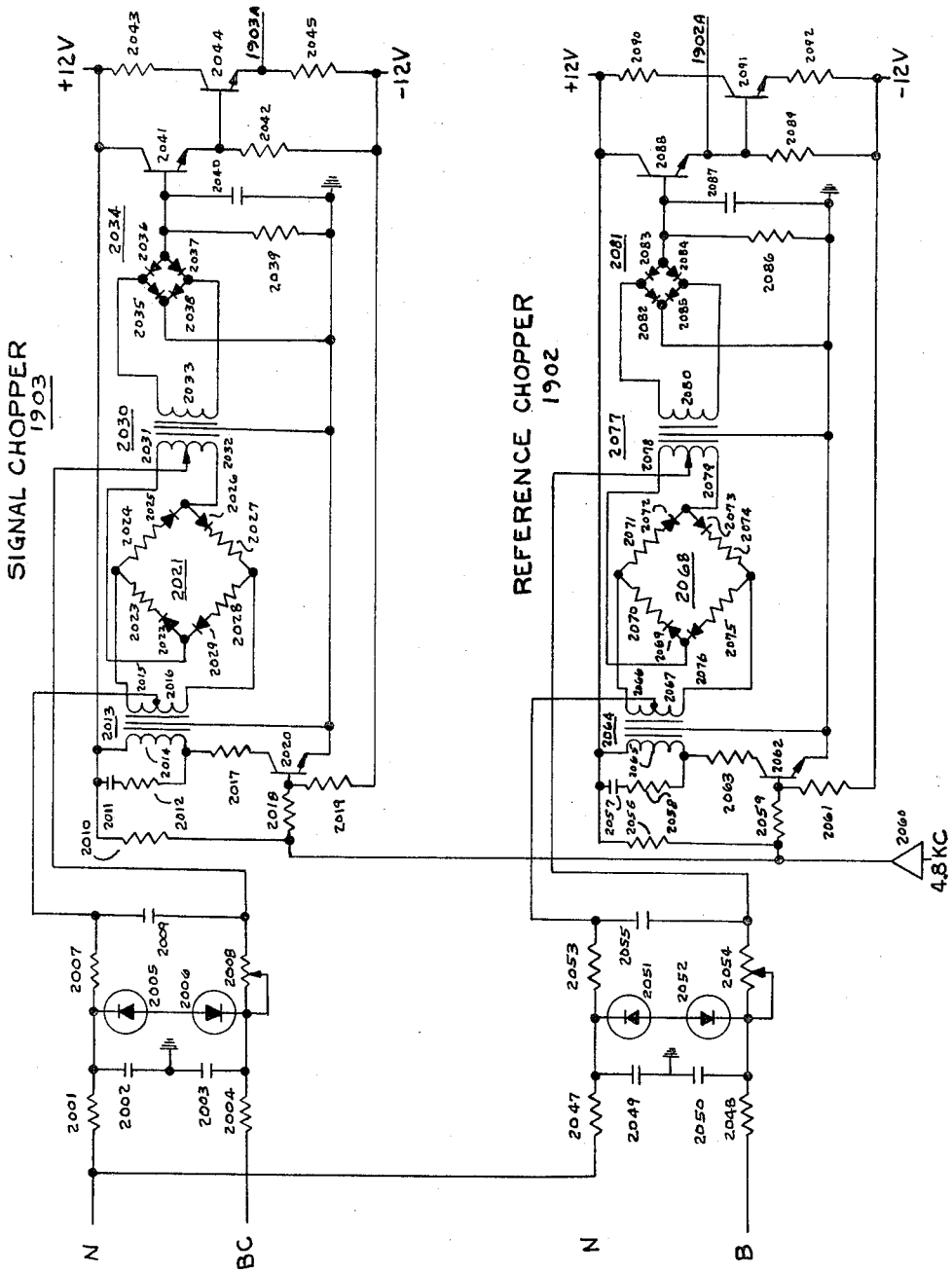

April 30, 1968   G. G. D. SOUTHARD ET AL   3,380,399
REMOTE CONTROL AND SUPERVISION SYSTEM FOR A RAILROAD TRAIN
Filed June 30, 1965   56 Sheets-Sheet 13
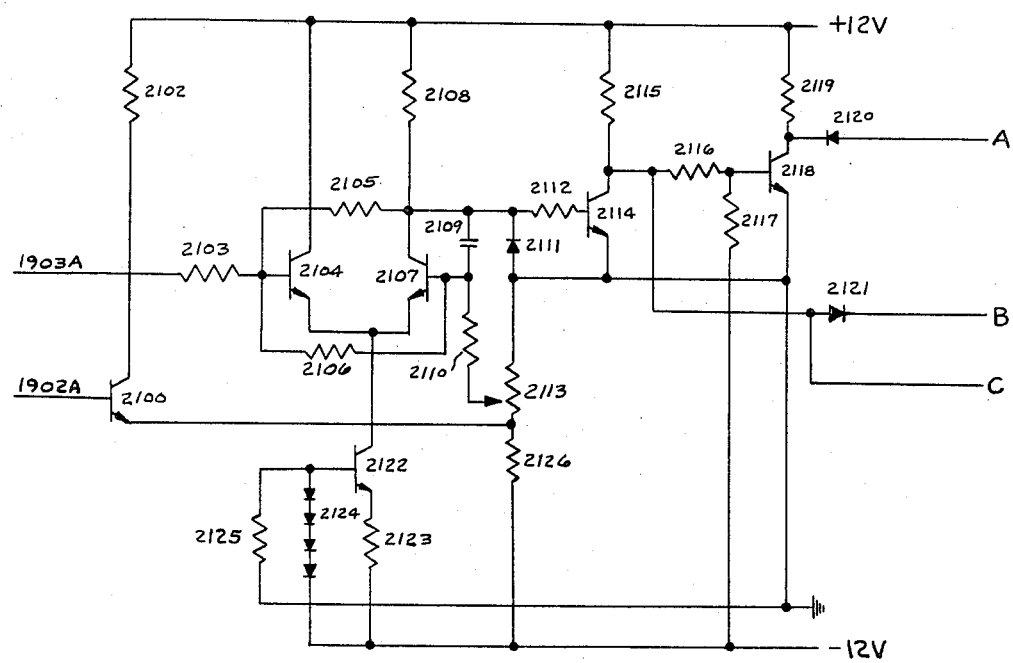
FIG. 21 DIFFERENTAL DETECTOR & AMPLIFIER
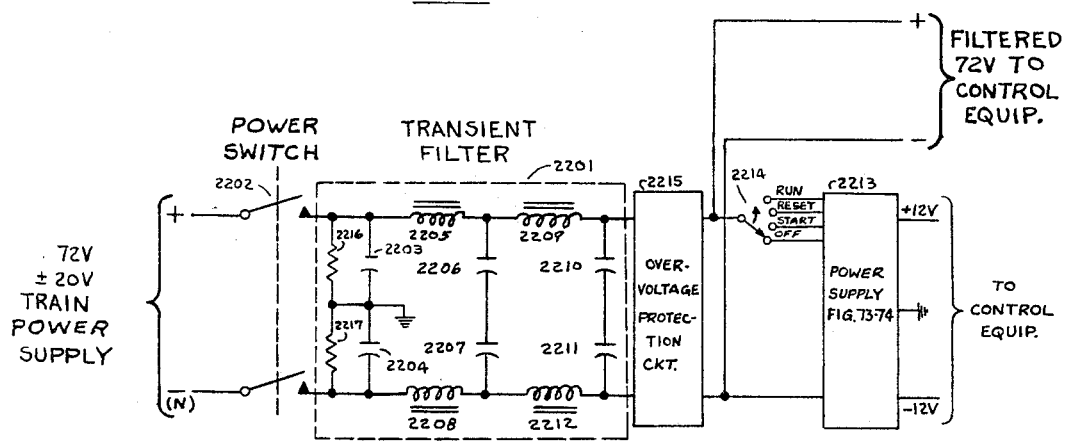
FIG. 22 POWER SUPPLY EQUIPMENT 2200
INVENTORS
GEORGE G. D. SOUTHARD
TONIS TILK
BY April 30, 1968   G. G. D. SOUTHARD ETAL   3,380,399
REMOTE CONTROL AND SUPERVISION SYSTEM FOR A RAILROAD TRAIN
Filed June 30, 1965   56 Sheets-Sheet 14
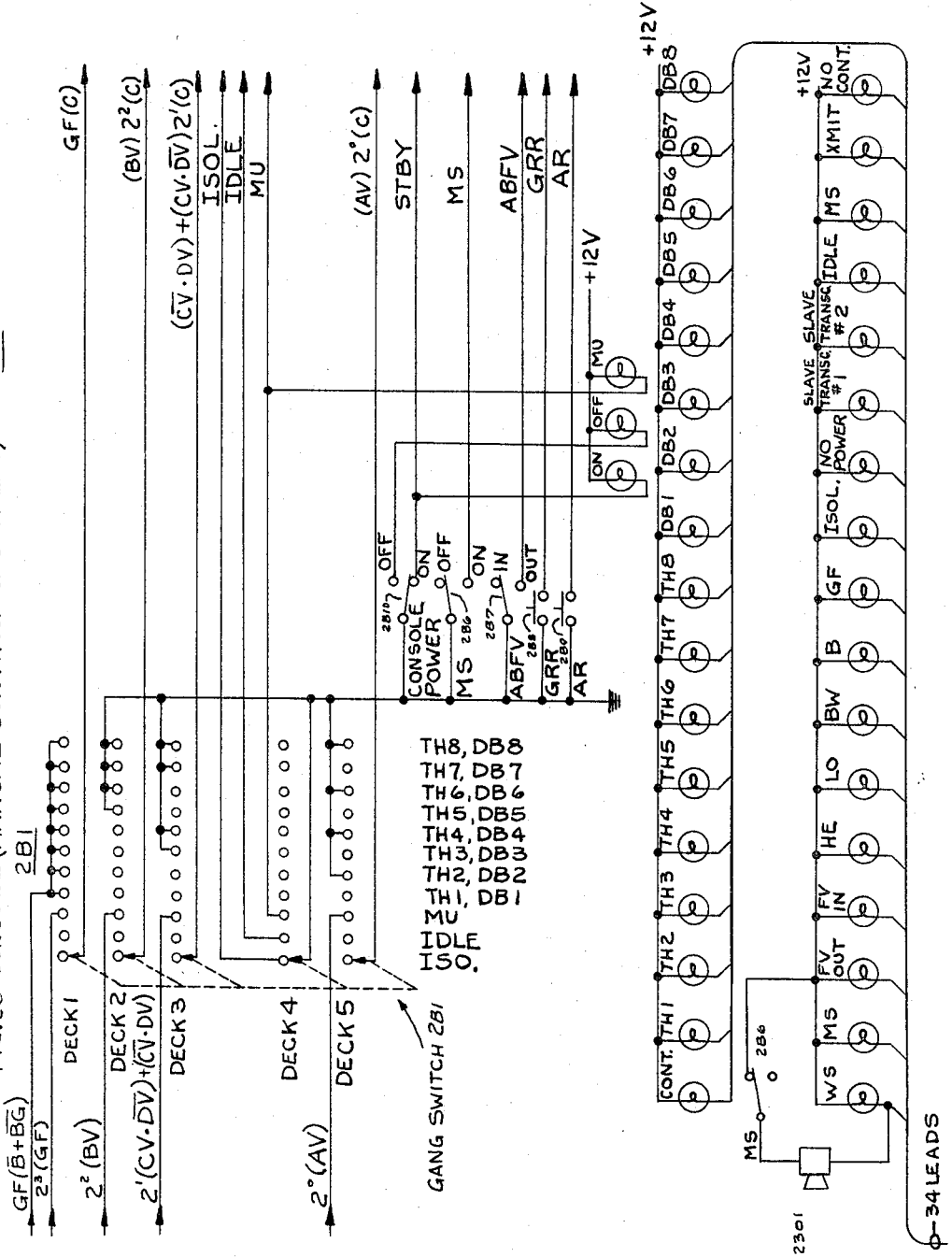
INVENTORS
GEORGE G. D. SOUTHARD
TONIS TILK

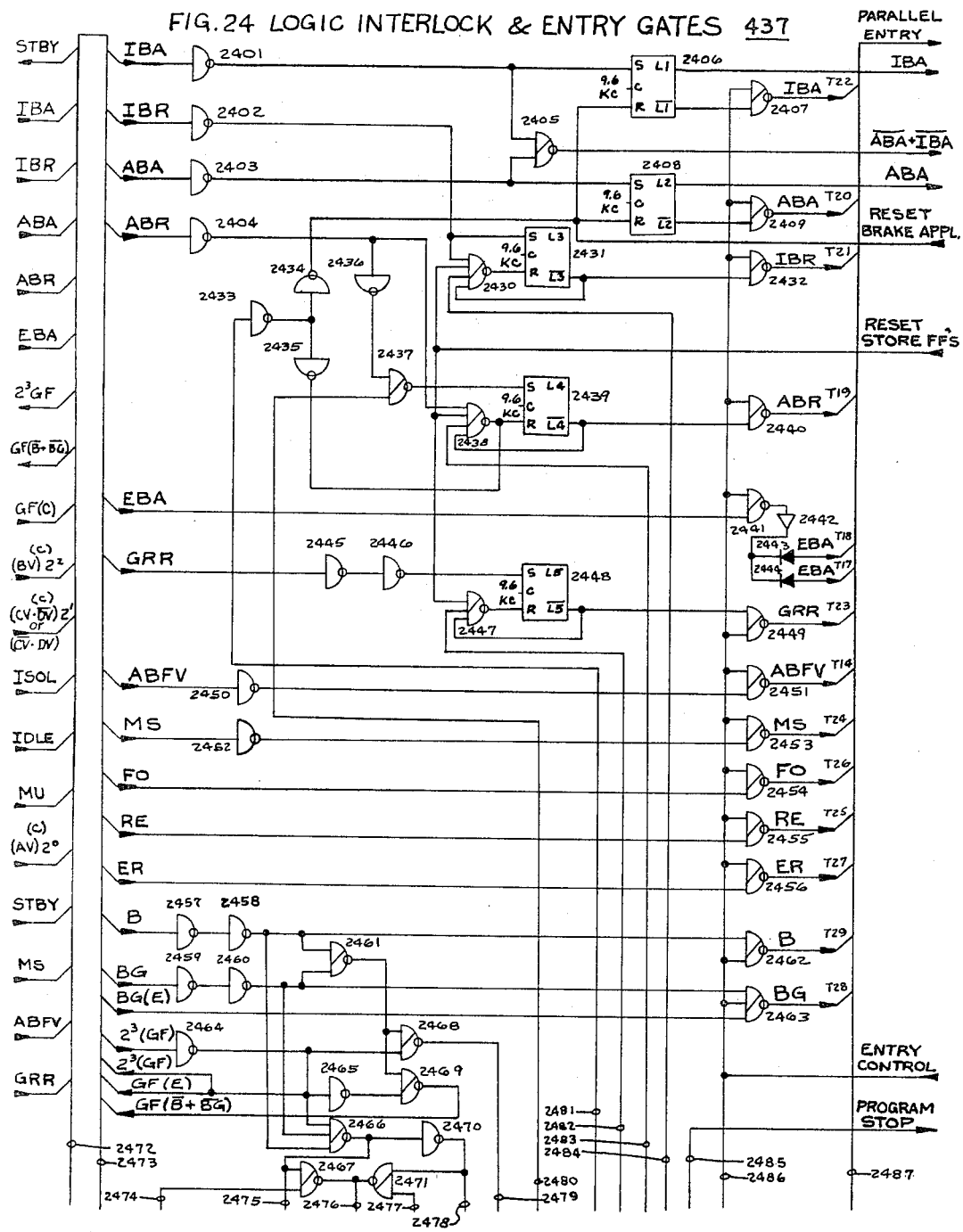

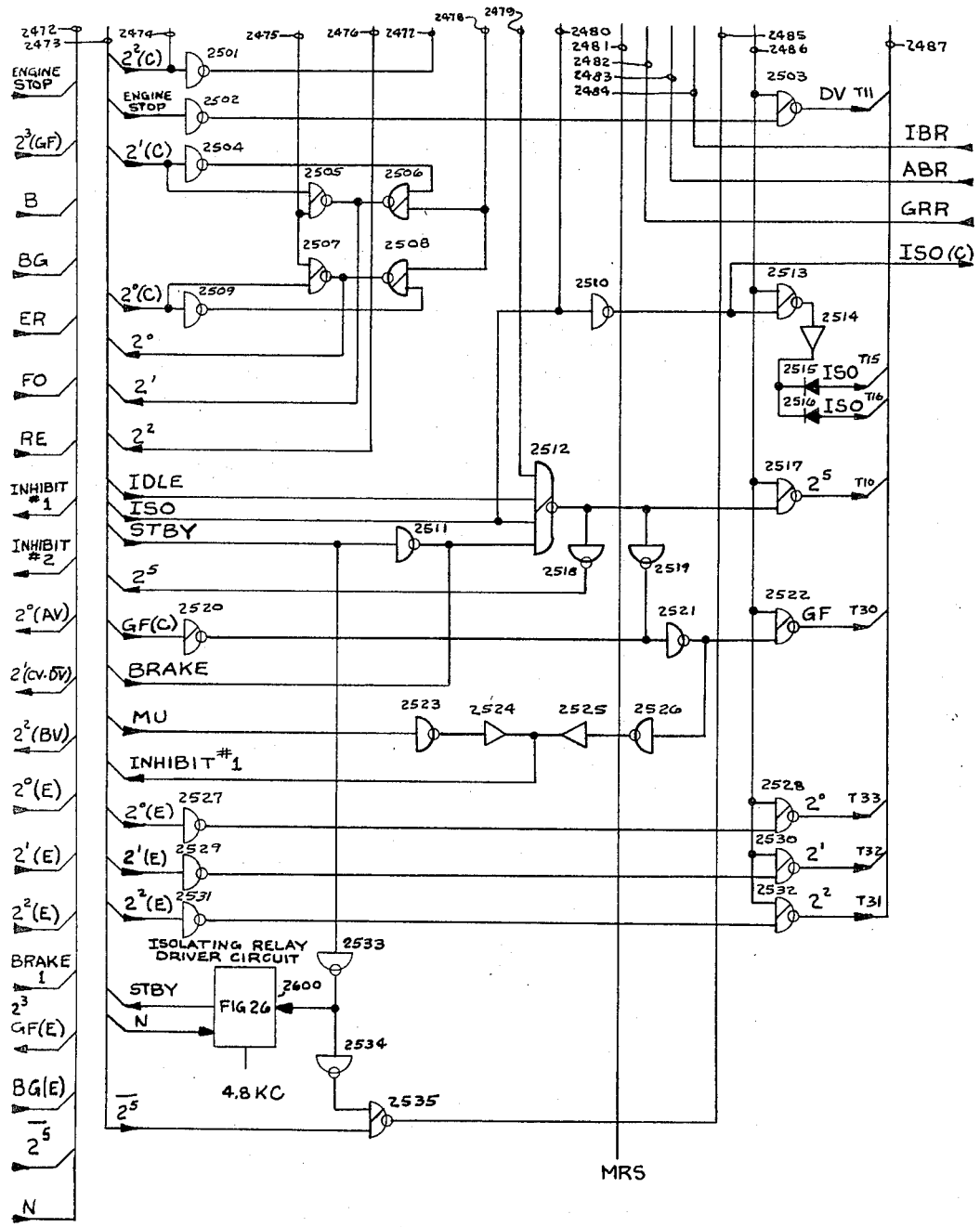
FIG. 25 LOGIC INTERLOCK & ENTRY GATES 437

April 30, 1968    G. G. D. SOUTHARD ETAL    3,380,399
REMOTE CONTROL AND SUPERVISION SYSTEM FOR A RAILROAD TRAIN
Filed June 30, 1965    56 Sheets-Sheet 17
FIG. 26    ISOLATING RELAY DRIVER CIRCUIT
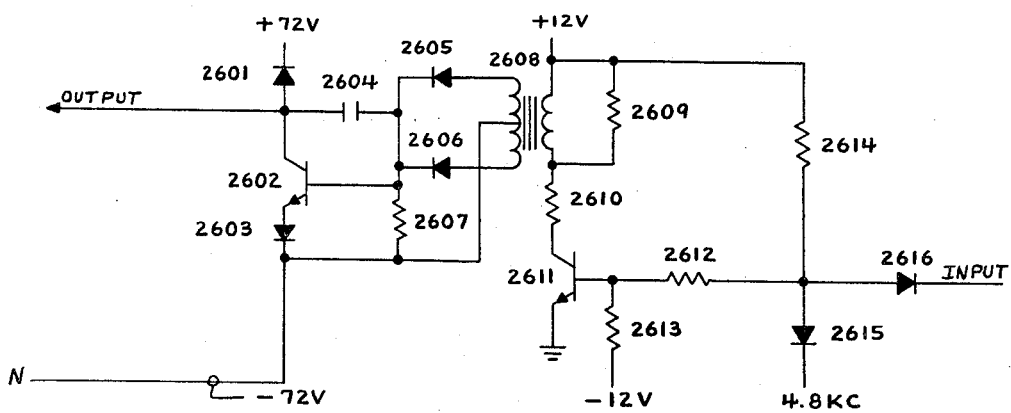
FIG. 27    ALARM CONTROL CIRCUIT
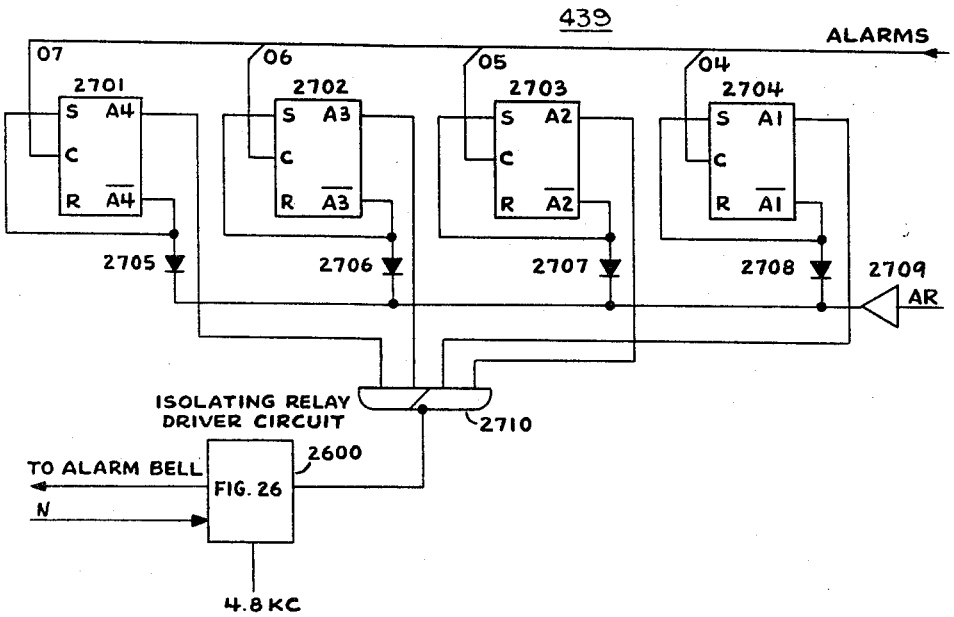
INVENTORS
GEORGE G.D. SOUTHARD
TONIS TILK

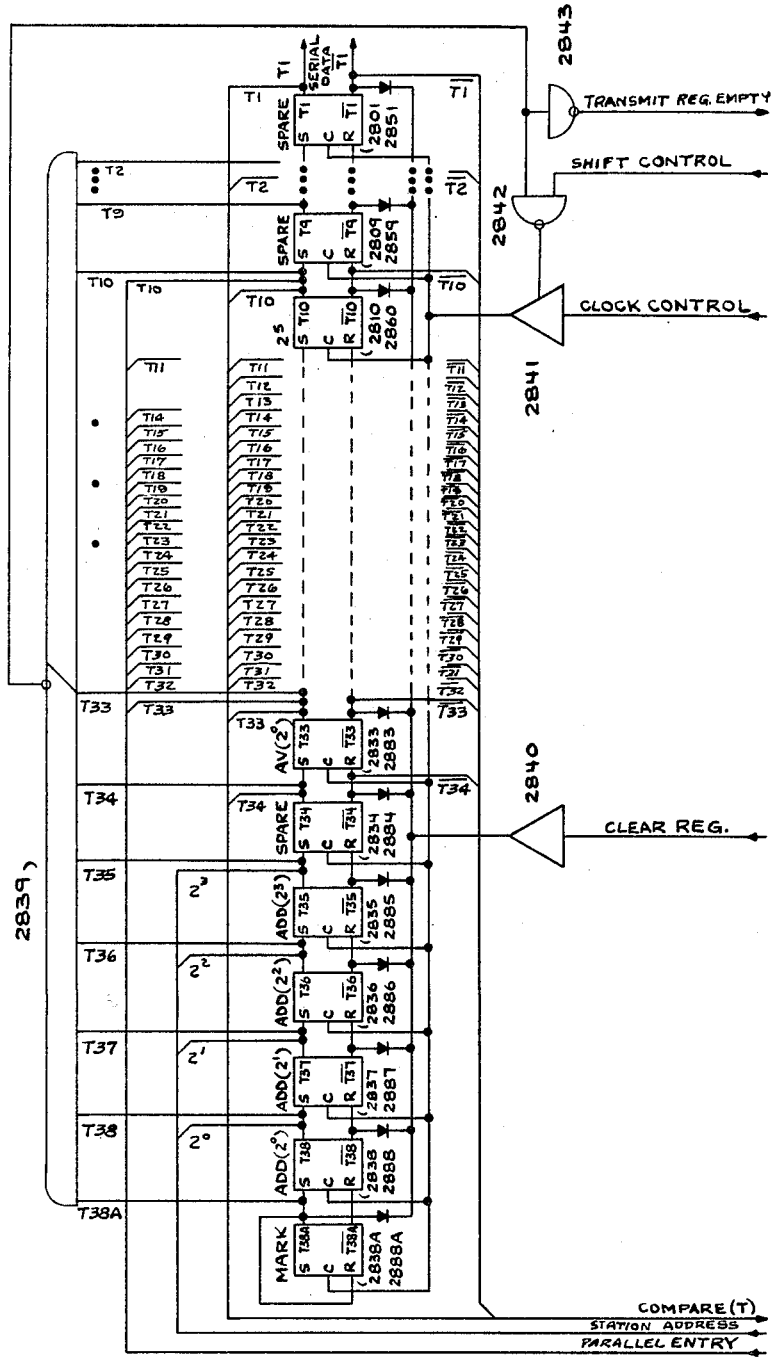
FIG. 28 TRANSMIT REGISTER (MASTER STATION)

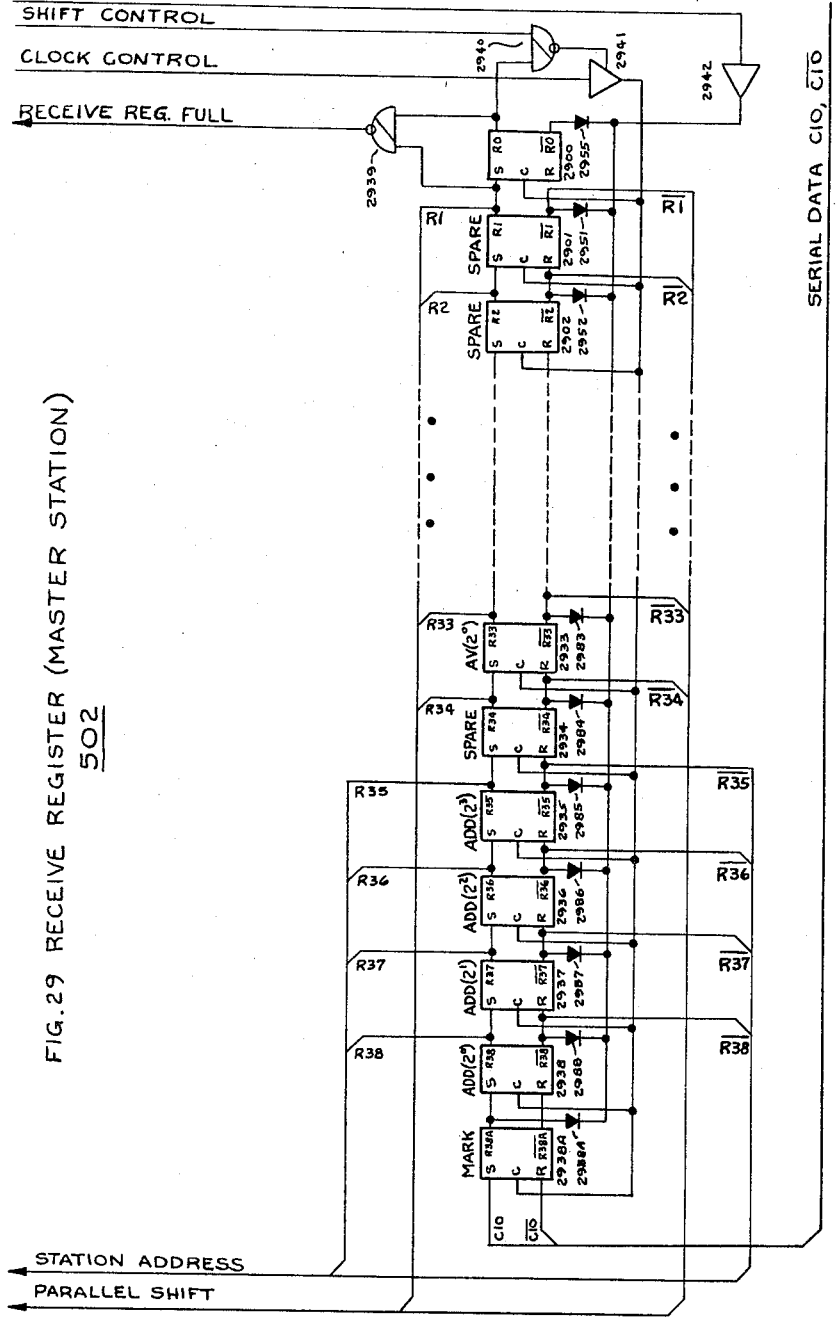
FIG.29 RECEIVE REGISTER (MASTER STATION) 502

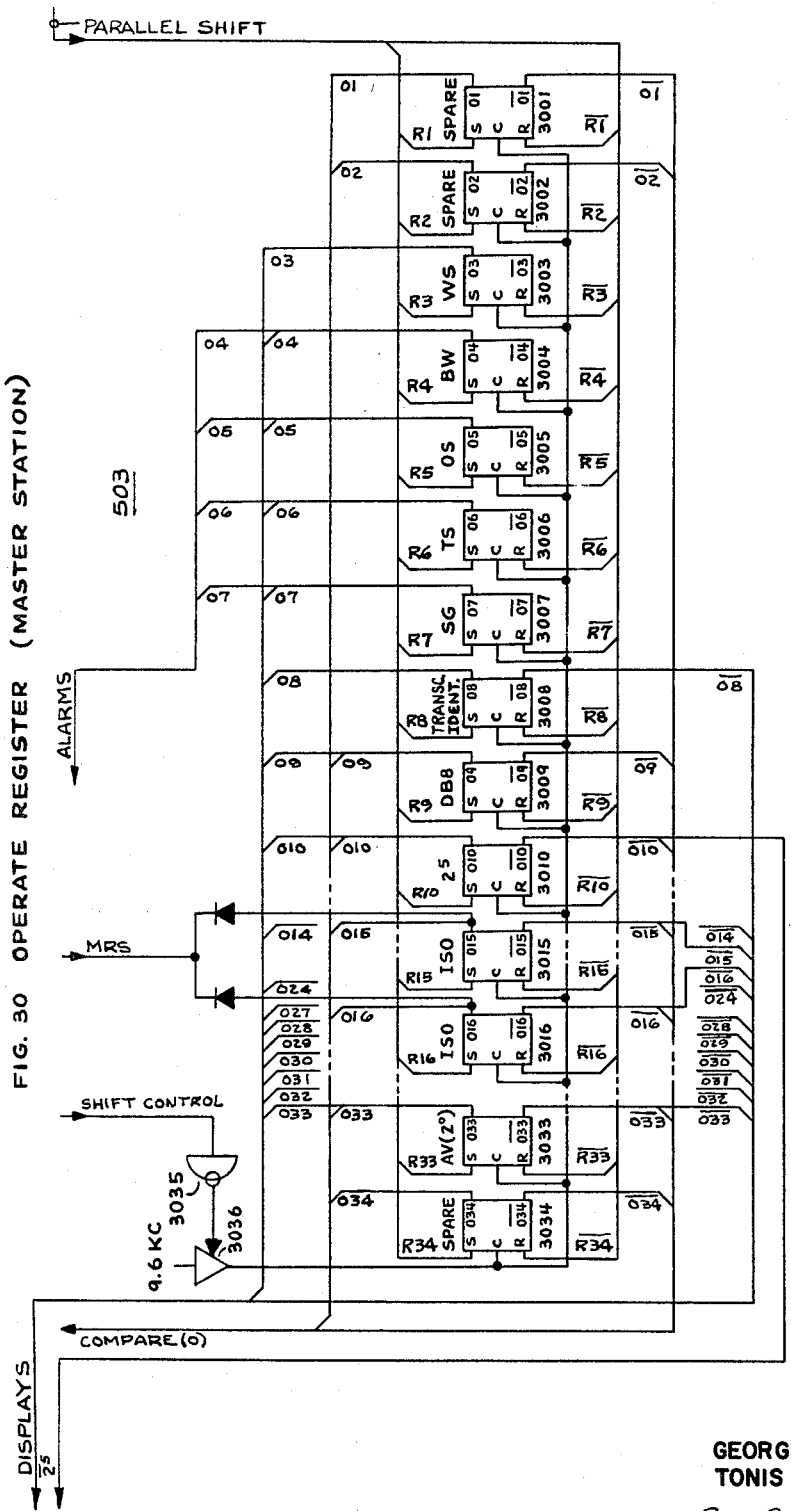

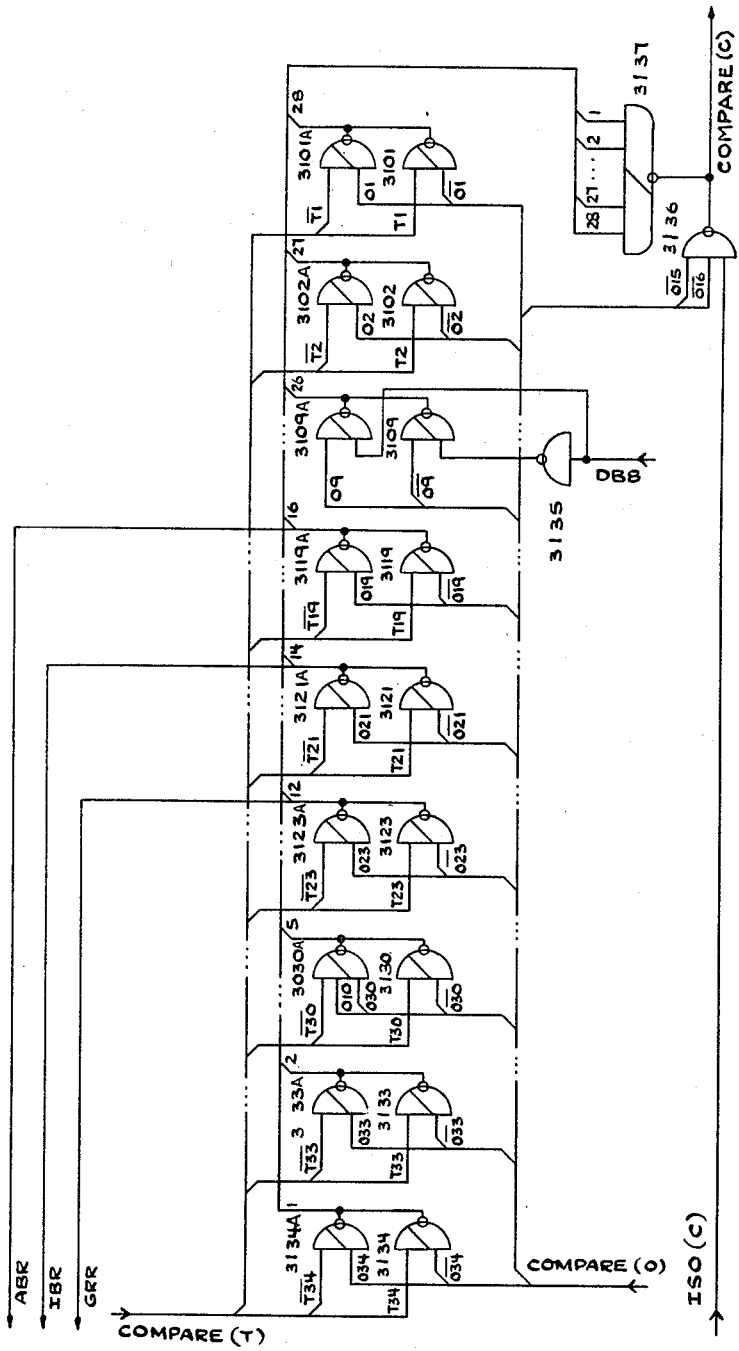

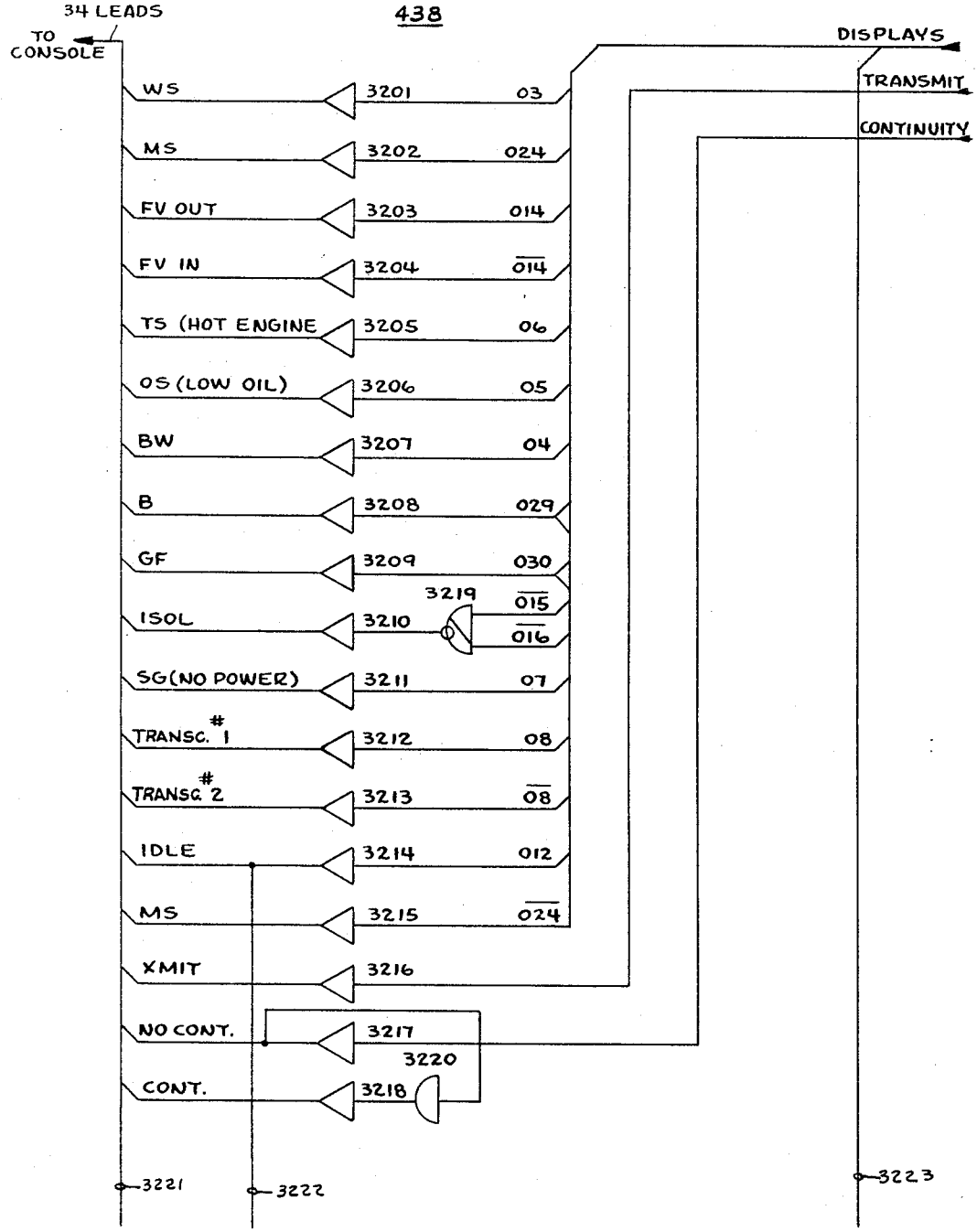

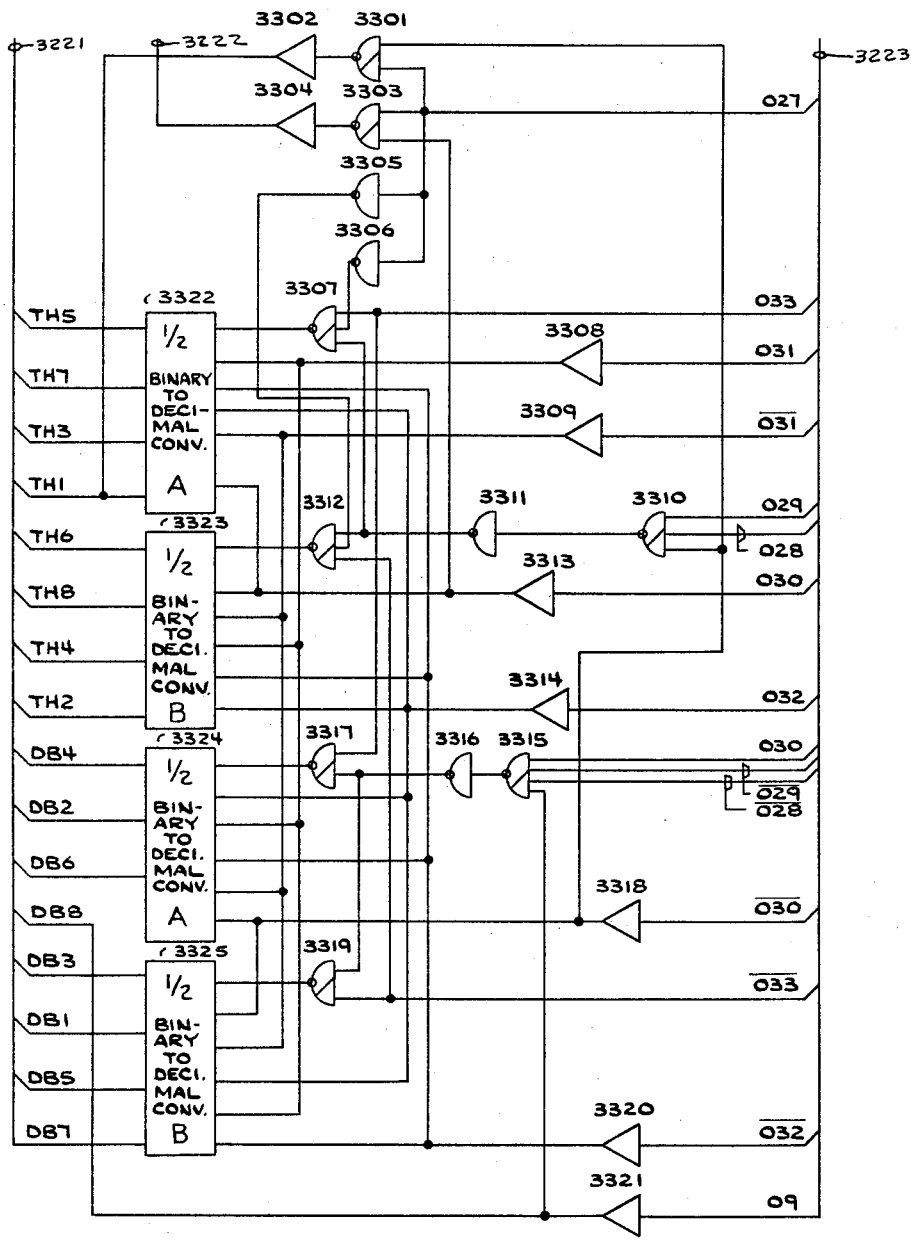

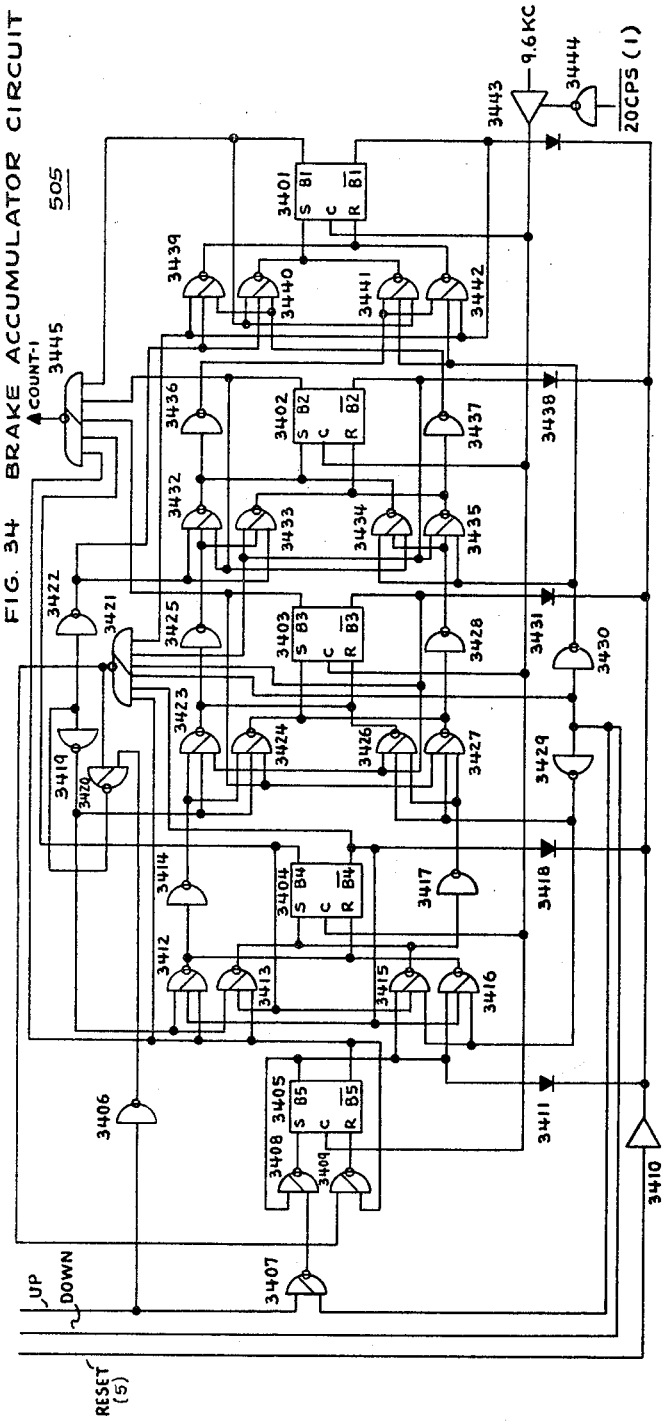

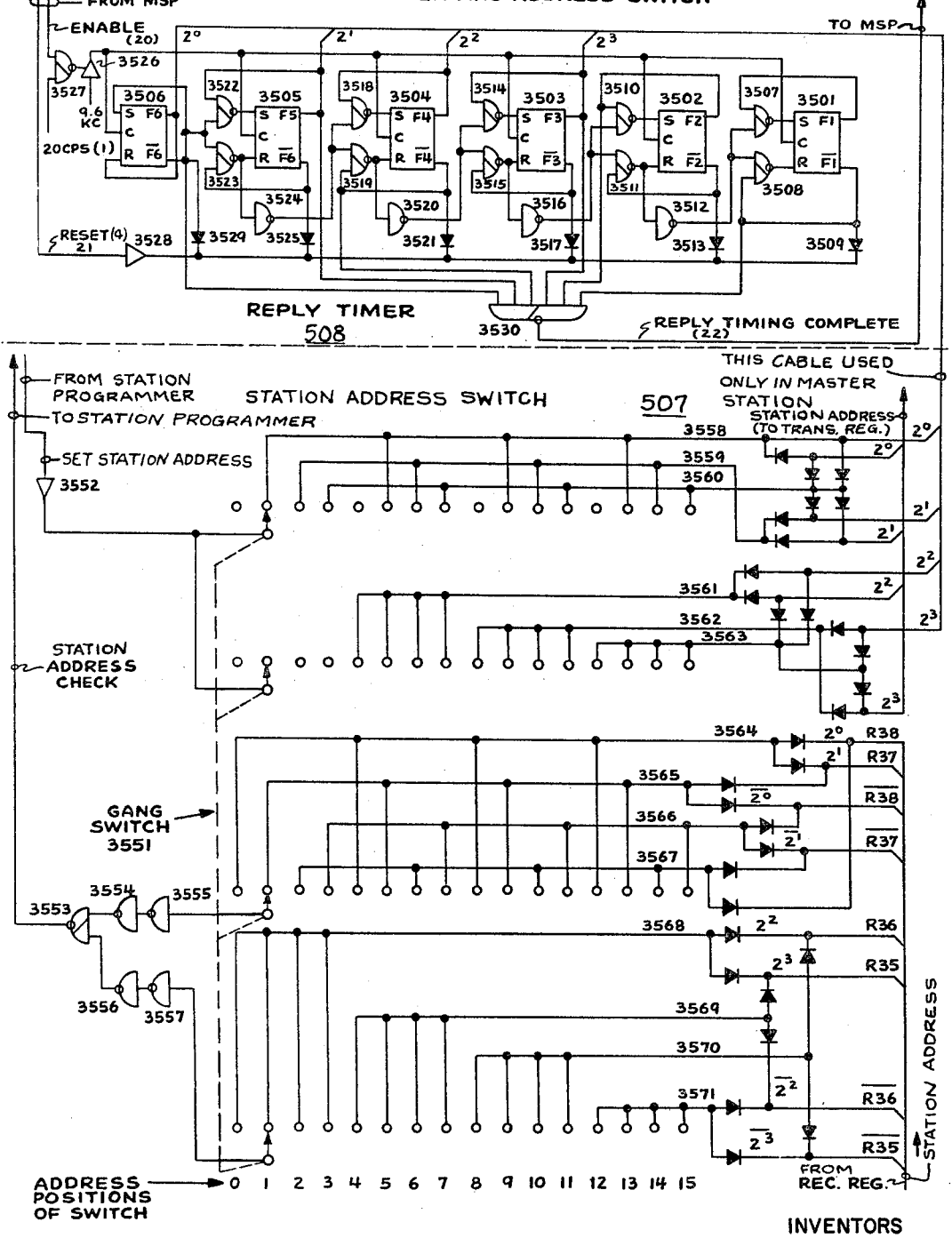

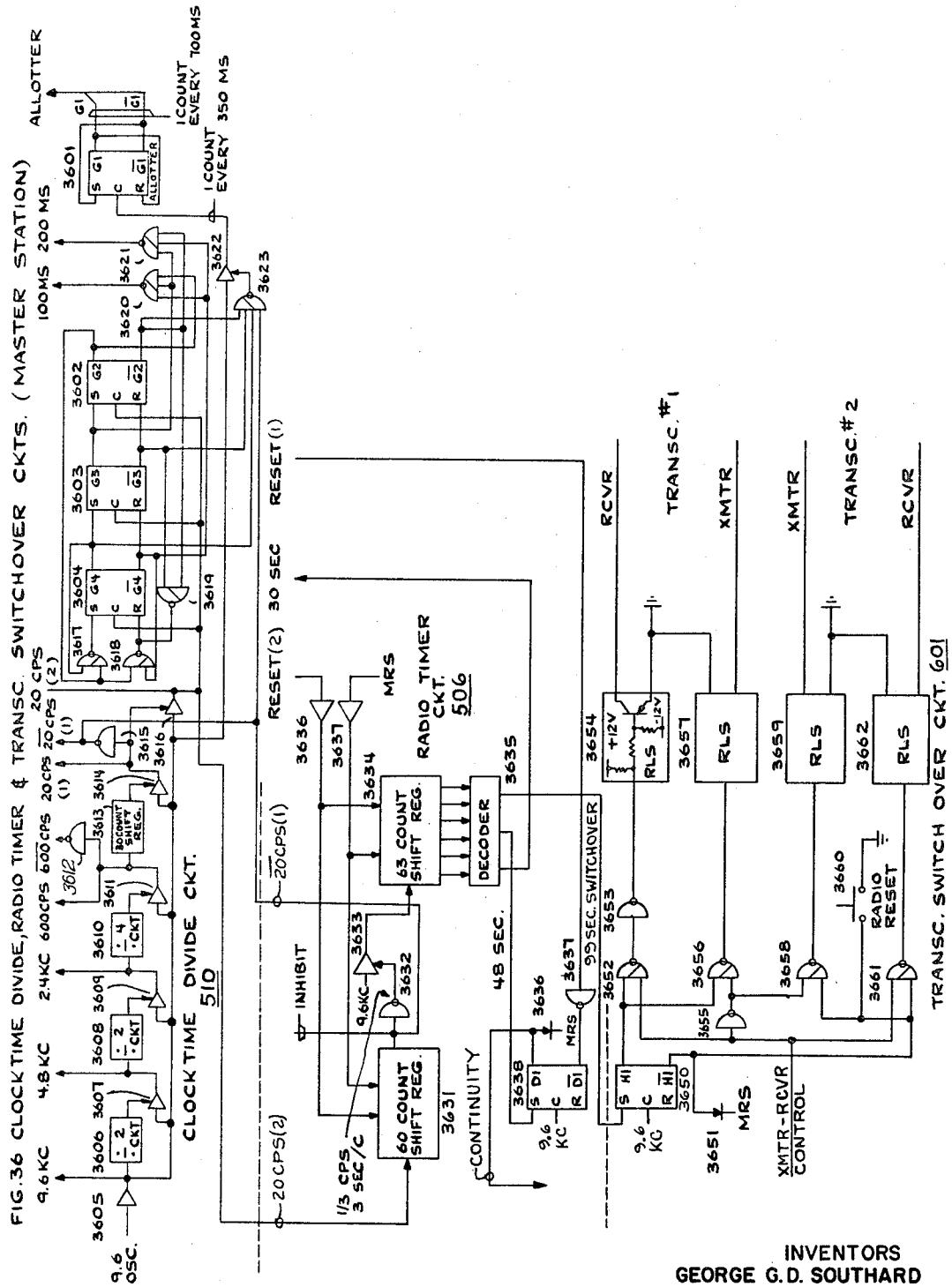

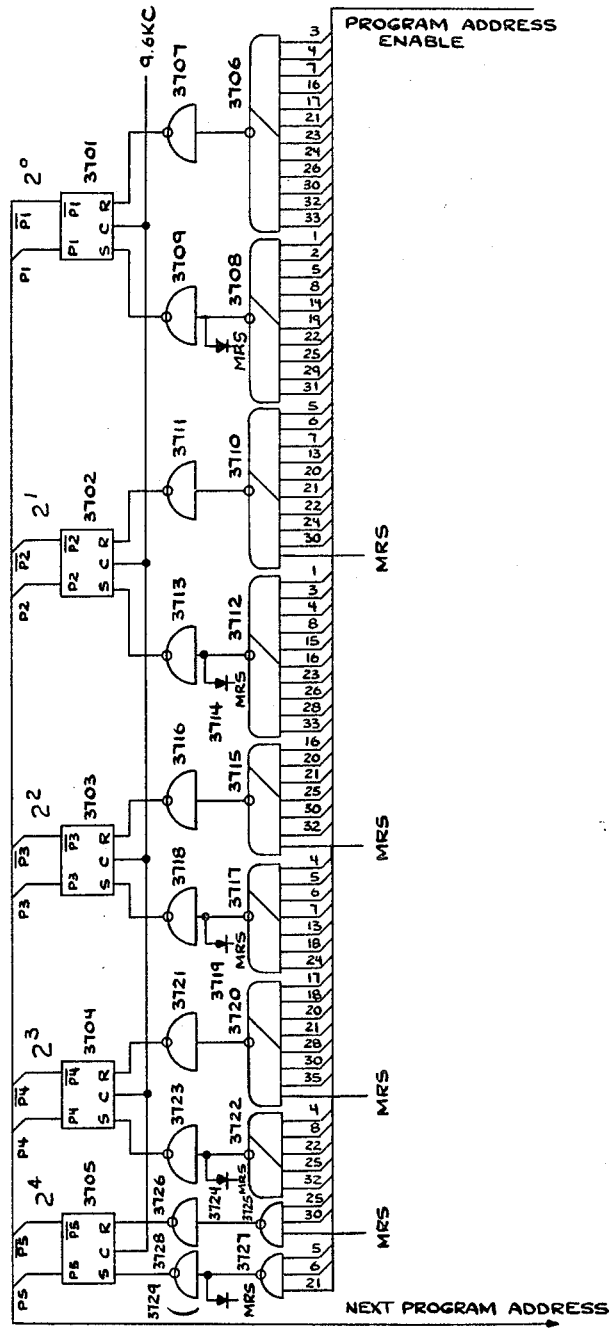

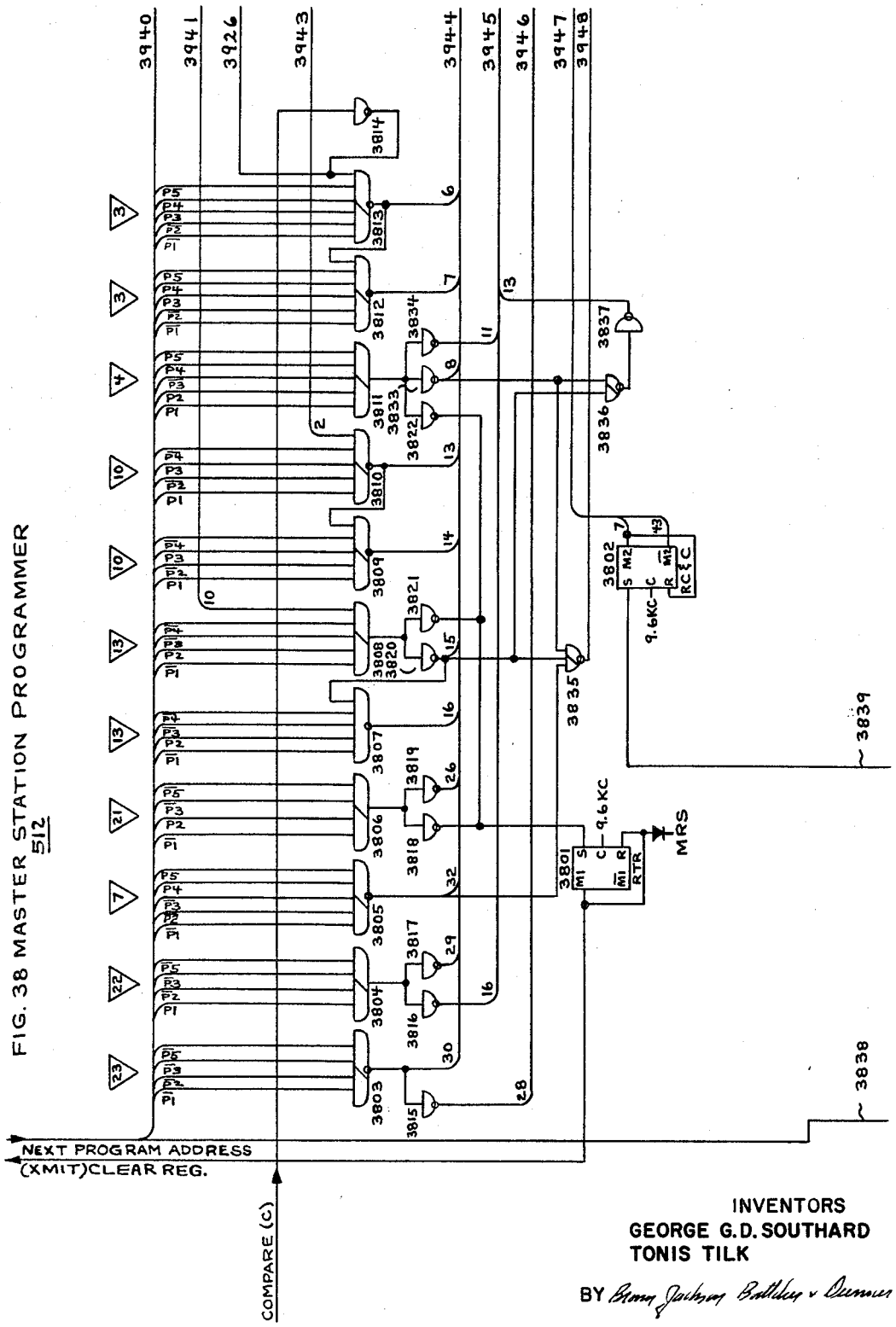

FIG. 41

FIG.44 ERROR CODE & SHIFT PULSE CKT. (MASTER STATION)

INVENTORS
GEORGE G. D. SOUTHARD
TONIS TILK

FIG. 45 LOGIC INTERLOCK & ENTRY GATES (SLAVE STATION)

April 30, 1968  G. G. D. SOUTHARD ETAL  3,380,399
REMOTE CONTROL AND SUPERVISION SYSTEM FOR A RAILROAD TRAIN
Filed June 30, 1965  56 Sheets-Sheet 38

SLAVE UP/DOWN THROTTLE & BRAKE COUNTER

INVENTORS
GEORGE G. D. SOUTHARD
TONIS TILK

SLAVE UP/DOWN THROTTLE & BRAKE COUNTER 814

INVENTORS
GEORGE G. D. SOUTHARD
TONIS TILK

SLAVE UP/DOWN THROTTLE & BRAKE COUNTER

FIG. 52 RECEIVE REGISTER (SLAVE STATION)

FIG. 54 COMPARATOR (SLAVE STATION)

FIG. 56 PROGRAM REGISTER (SLAVE STATION)

FIG. 58 SLAVE STATION PROGRAMMER

FIG. 59 SLAVE STATION PROGRAMMER

April 30, 1968     G. G. D. SOUTHARD ETAL     3,380,399
REMOTE CONTROL AND SUPERVISION SYSTEM FOR A RAILROAD TRAIN
Filed June 30, 1965     56 Sheets-Sheet 54

FOR FIGURES 65-72 INCLUSIVE
SEE THE SHEET HAVING Fig. 34

INVENTORS
GEORGE G. D. SOUTHARD
TONIS TILK

April 30, 1968 G. G. D. SOUTHARD ETAL 3,380,399
REMOTE CONTROL AND SUPERVISION SYSTEM FOR A RAILROAD TRAIN
Filed June 30, 1965 56 Sheets-Sheet 55

FIG. 73 POWER SUPPLY 2213

FOR FIGURES 65-72 INCLUSIVE
SEE THE SHEET HAVING

*INVENTOR*
GEORGE G. D. SOUTHARD
TONIS TILK

BY *Brum Jackson Boetther & Dunner*

ATTORNEY

FIG 74 POWER SUPPLY
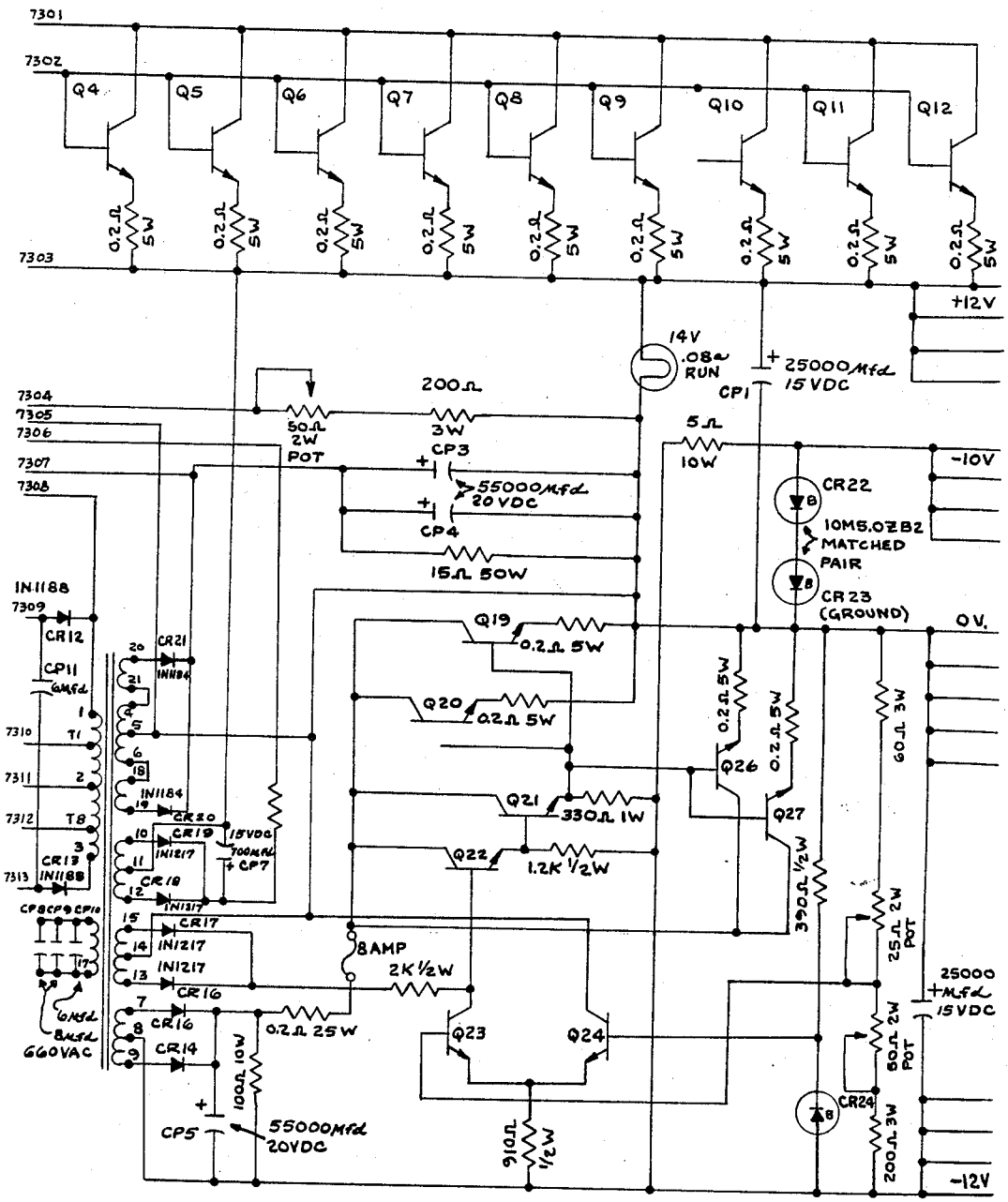

3,380,399
REMOTE CONTROL AND SUPERVISION SYSTEM FOR A RAILROAD TRAIN
George G. D. Southard, Galion, and Tonis Tilk, Columbus, Ohio, assignors to North Electric Company, Galion, Ohio, a corporation of Ohio
Filed June 30, 1965, Ser. No. 468,292
20 Claims. (Cl. 105—61)

ABSTRACT OF THE DISCLOSURE

Arrangements in a remote control and supervisory system using solid state components including a master locomotive having equipment for controlling a slave locomotive via a radio link and for receiving indications of conditions at the slave locomotive over such link, the master locomotive means transmitting a word every thirty seconds which comprises address, information and check bits, the information bits defining a comprehensive recapitulation of all controls, and receiving a corresponding word message in return. Primary and secondary sync signals and a primitive polynomial code are used to provide integrity in the transmissions. If the report back shows a discrepancy, the master locomotive repeats its words every three seconds until the word received back is in agreement. If an alarm condition arises at the slave station, the system breaks into the thirty second routine, and transmits a single word updating the status of controls and alarm indications.

---

The present invention relates to remote control and supervision systems, and more specifically to a novel system for effecting the control and supervision by a lead or master railroad locomotive of a slave locomotive remotely located in the same train.

In normal usage, a locomotive which powers a train is located at the front or lead end of the train. When long, heavily loaded trains are operated, however, it is necessary to use several locomotives to provide sufficient power, and in such use it is normal to arrange the lead unit as the controlling locomotive and all additional units as slaves. The slave units which in some instances may have as many as six or eight units are grouped together and controlled by a cable called the "train line," and also by several air lines which are used mainly for braking. In the field, such grouping of locomotives is called a consist.

In the use of more than one locomotive, it has been found that certain advantages are gained when the locomotive power is split into sections with one section of locomotives being placed at the lead end, and another section located at a position approximately two-thirds of the length of the train. Some of these advantages include (a) Rapid air brake release—in braking, air must be coupled from the locomotive to each of the freight cars for braking purposes. By locating the locomotives in such position, the air passages can be filled by pumping action from both the slave and master units and the overall distance through which the air must be propagated by either unit is substantially decreased. (b) Safer emergency stops—in braking, the air is expelled and brakes applied at both ends of the train, thus decreasing the "run-in" of slack. (c) Better handling in mountainous areas—in long climbs, the rear power section pushes the load over the tops of hills and also around the "zig-zags" of mountainous terrain, and the overall applied force in the forward direction is increased. (d) Longer trains are possible—when very long trains are pulled up long grades, and the entire length of the train is supported and pulled by the lead end, excessive loading is applied to the car couplers. When power is supplied at the rear, both push and pull forces are provided to the car, and the effective length and overall strain is noticeably reduced.

In placing the locomotive power in sections to obtain such advantages, control of the remote or slave locomotive must be provided in the lead or controlling locomotive to insure safe, reliable control. One preferred arrangement might include a radio control system having a control center in the lead locomotive which is arranged to transmit control signals over a radio link to switching equipment in the slave locomotive.

Although efforts heretofore have been made to provide such a system, the control devices previously developed have not been particularly successful. One such prior attempt results in a system which used electromagnetic relays for switching and control purposes. It soon became apparent that such system could not function with suitable reliability in the shock and vibration environments incident to railroad work. Additionally, the system inherently did not have sufficient operating speed to respond to the required time.

It is an object of the present invention therefore to provide a more safe, reliable control system using solid state equipment which is adapted to function reliably under conditions of shock and vibration normally experienced in railroad environments and at speeds necessary to the achievement of safe control.

It is a further object of the present invention to provide a novel system of such type including a master station and a remote slave station on the train which controls and supervises at least one slave locomotive from a master locomotive, and in which the stations include means for tranmitting words between the stations which include information bits relating to the status of the equipment at the stations to achieve more reliable control and supervision of such equipment.

It is an additional object to provide novel means at the stations in such arrangement which provide words each of which includes a primary sync signal, information bits which indicate the status of all functions at the transmitting station, a plurality of secondary synch signals interleaved with the information bits, address bits and error checking bits, whereby complete data is transmitted between the stations with increased integrity.

It is yet another object of the invention to provide a system of such type which includes improved means for synchronizing message transmissions between the stations and specifically means for providing a plurality of secondary sync signals in each word, each pair of information bits in a word being prefixed by a secondary sync signal, and means for invalidating a word whenever the secondary sync signals are not detected by receiving means at a station in such relation to the information or message bits.

It is an additional object of the invention to provide a novel error code and shift pulse circuit in such system having means for synchronizing the receiving means at a station with the receipt of each secondary sync pulse (every 6.4 ms.), whereby possible shift in the bit stream of a word relative to the clock pulse stream is minimized.

It is yet another object of the invention to provide a novel control system which includes a half duplex communication channel having allotter means at the master and slave stations for providing interleaved transmission of words between the stations using the same carrier and two tones in the transmission of words in both directions, whereby a greater efficiency in the use of frequency bandwidths is achieved.

It is an additional object of the invention to provide a system which effects a more reliable control of the air brake equipment on the train, and particularly means operable by the engineer for effecting a decrease of the air pressure in the brake reservoir of a first air brake system for a predetermined time at the master station, means for precisely measuring the time period of air pressure decrease in milliseconds, means for transmitting words having information bits to select a second air brake system at the slave locomotive, and thereafter to decrease the air pressure in the brake air pressure reservoir at the slave locomotive for precisely the same time period, whereby more even application of the brakes by the multiple air braking system is accomplished.

It is yet another object of the invention to provide novel dynamic braking means including means at the master station for providing a reliable signal output representative of the various degrees of dynamic braking required, from a signal input provided by a train power supply which may vary as much as plus or minus 28%.

These and other advantages of the present invention will become apparent with reference to the following specification and accompanying drawings wherein basic embodiments of the structure are illustrated, and in which:

FIGURE 1 illustrates a train comprising a lead or master locomotive remotely controlling a slave locomotive, the control equipment at the lead end being located in the master locomotive; and the control equipment at the remote location being located in a radio car preceding the slave locomotive;

FIGURE 2A diagrammatically illustrates controls normally located in a locomotive;

FIGURE 2B diagrammatically illustrates auxiliary locomotive controls which are installed in the lead or master engine, switches 2B1, 2B6, 2B7, 2B10, and non-locking push button 2B8 and 2B9 are located on the console shown in FIGURES 4 and 23. Push-buttons 2B3, 2B4, 2B5, 2B11 and 2B12 are located in the push-button control shown in FIGURE 14;

FIGURES 3A–3H illustrate certain timing arrangements and codes of the system;

FIGURES 4–6 comprise a box diagram of the master station located in the lead or master locomotive;

FIGURES 7–9 comprise a box diagram of the slave station located in the radio car, the master and slave stations as shown in FIGURES 6 and 9 being interconnected by radio means including an antenna at the master station and an antenna at the slave station;

FIGURE 10 sets forth an isolating sensor circuit and illustrates the various isolating sensor circuits found in FIGURES 4 and 7;

FIGURE 11 comprises a logic diagram of the recoder circuit found in FIGURE 4;

FIGURES 12–18 illustrate the potentials and basic signals used in the system;

FIGURE 19 comprises a box and logic diagram of the dynamic brake A to D converter and encoder found in FIGURE 4;

FIGURE 20 comprises a circuit diagram of the signal and reference choppers found in FIGURE 19;

FIGURE 21 sets forth the circuit diagram of the differential detectors and amplifiers found in FIGURE 19;

FIGURE 22 illustrates the master station power supply equipment;

FIGURE 23 illustrates the console found in FIGURE 4 with controls shown in FIGURE 2B;

Figure 42:
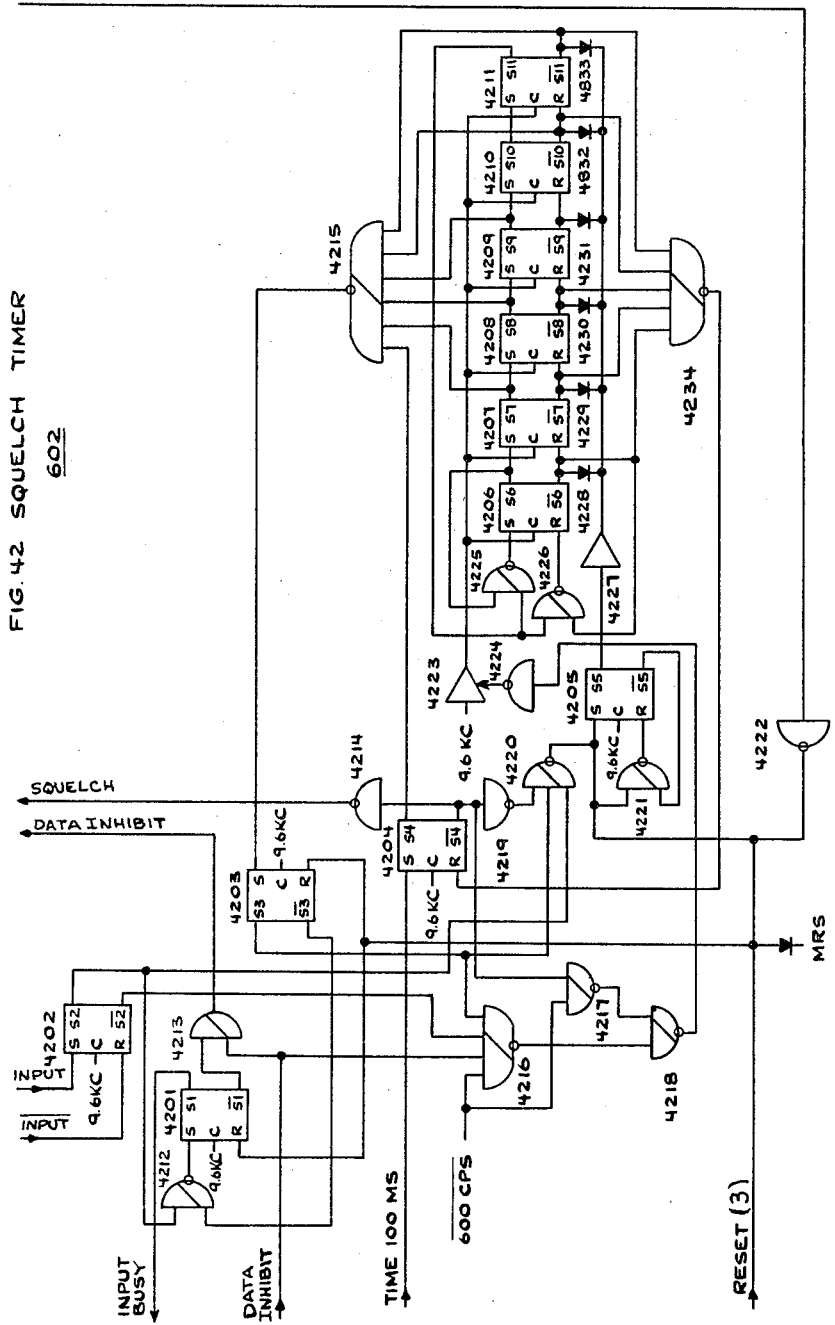
Figure 43:
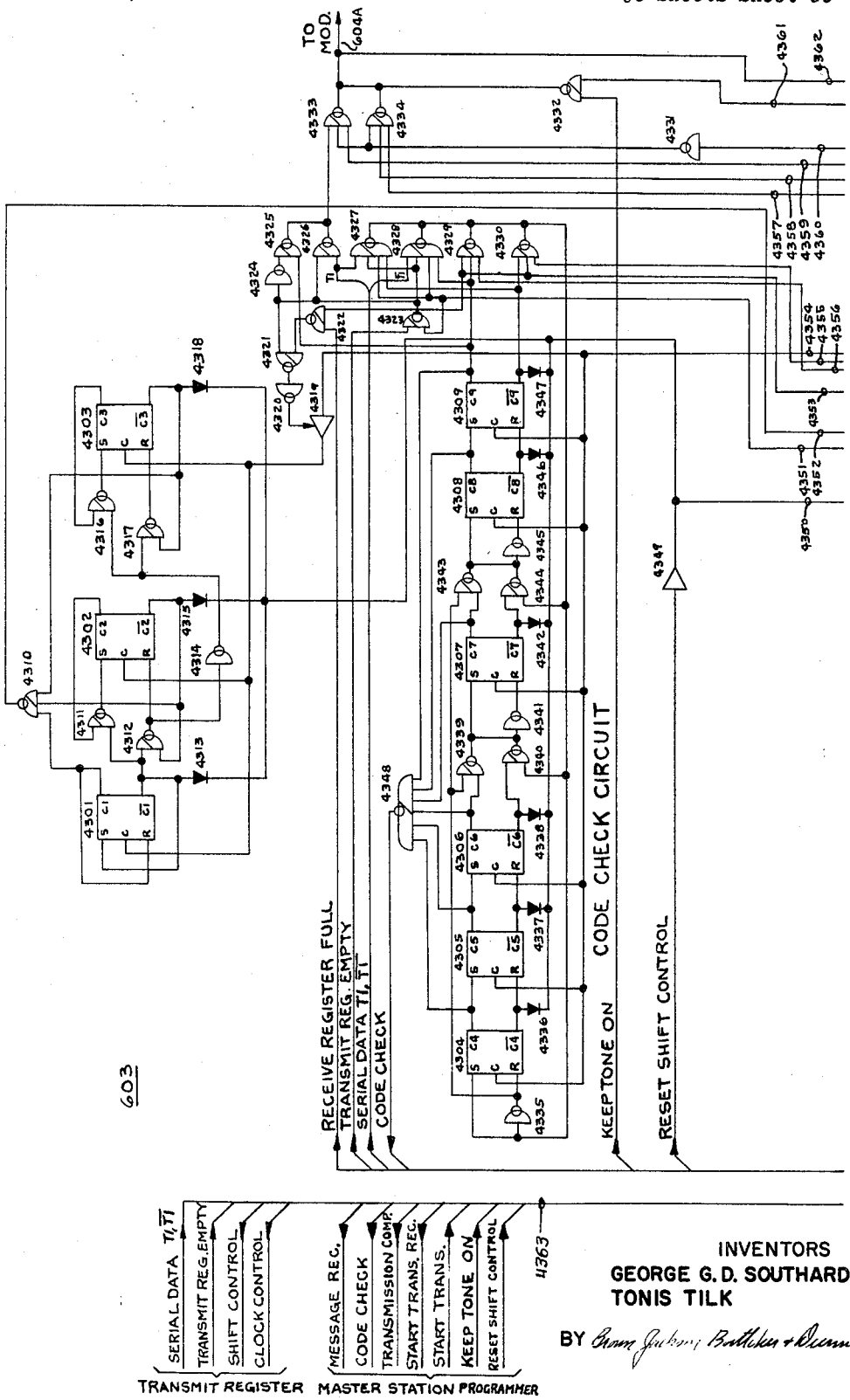
Figure 44:
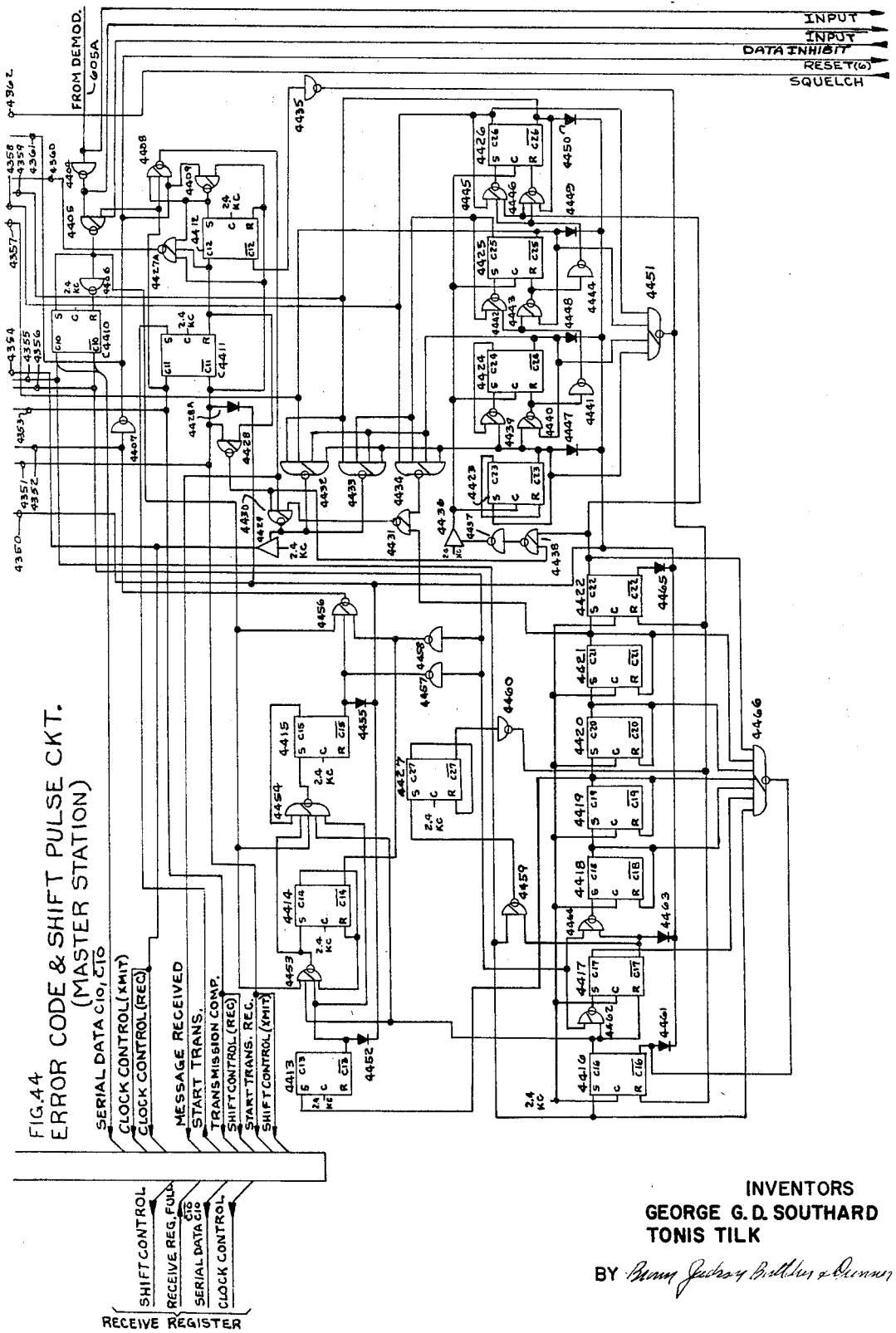
Figure 45:
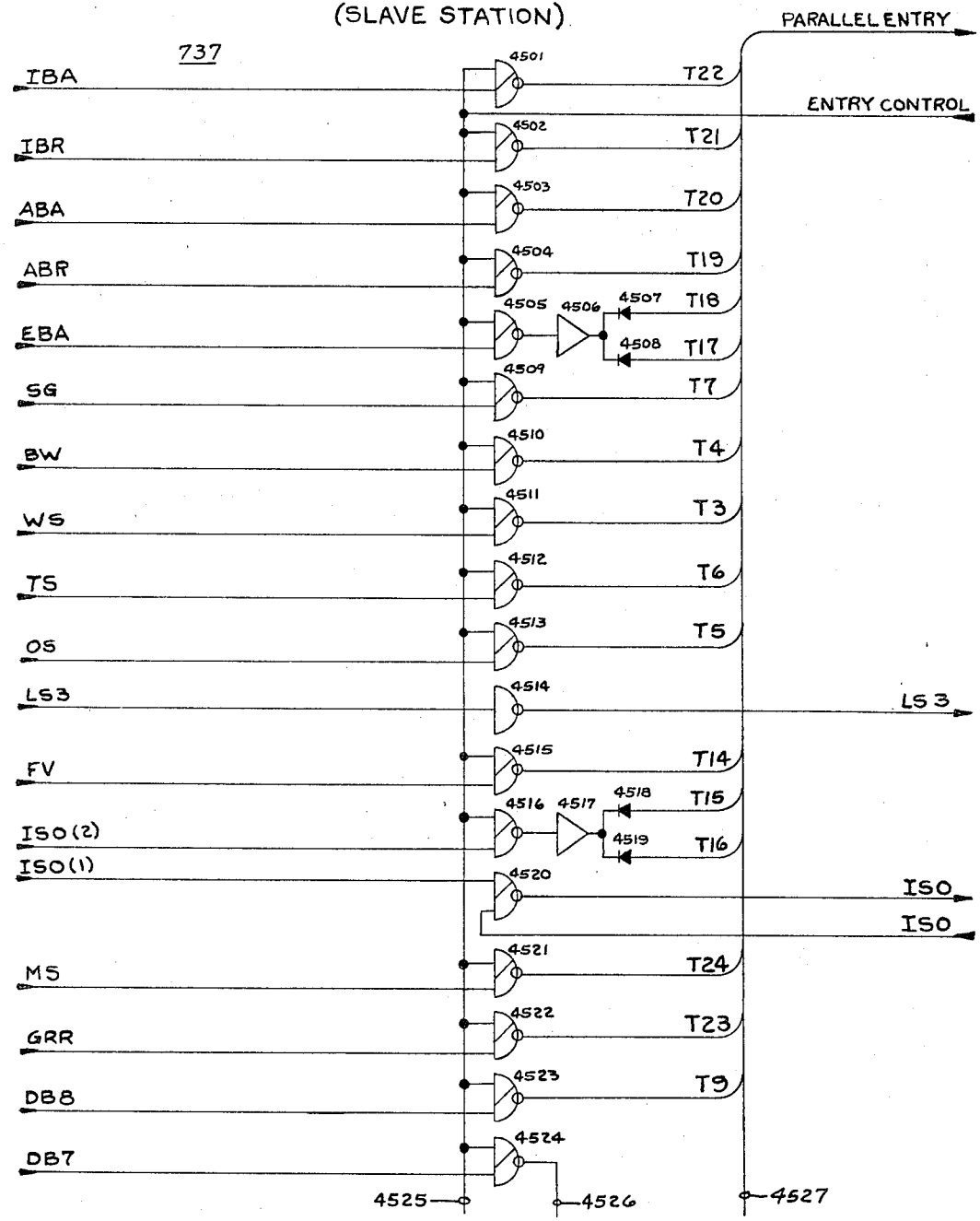
Figure 46:
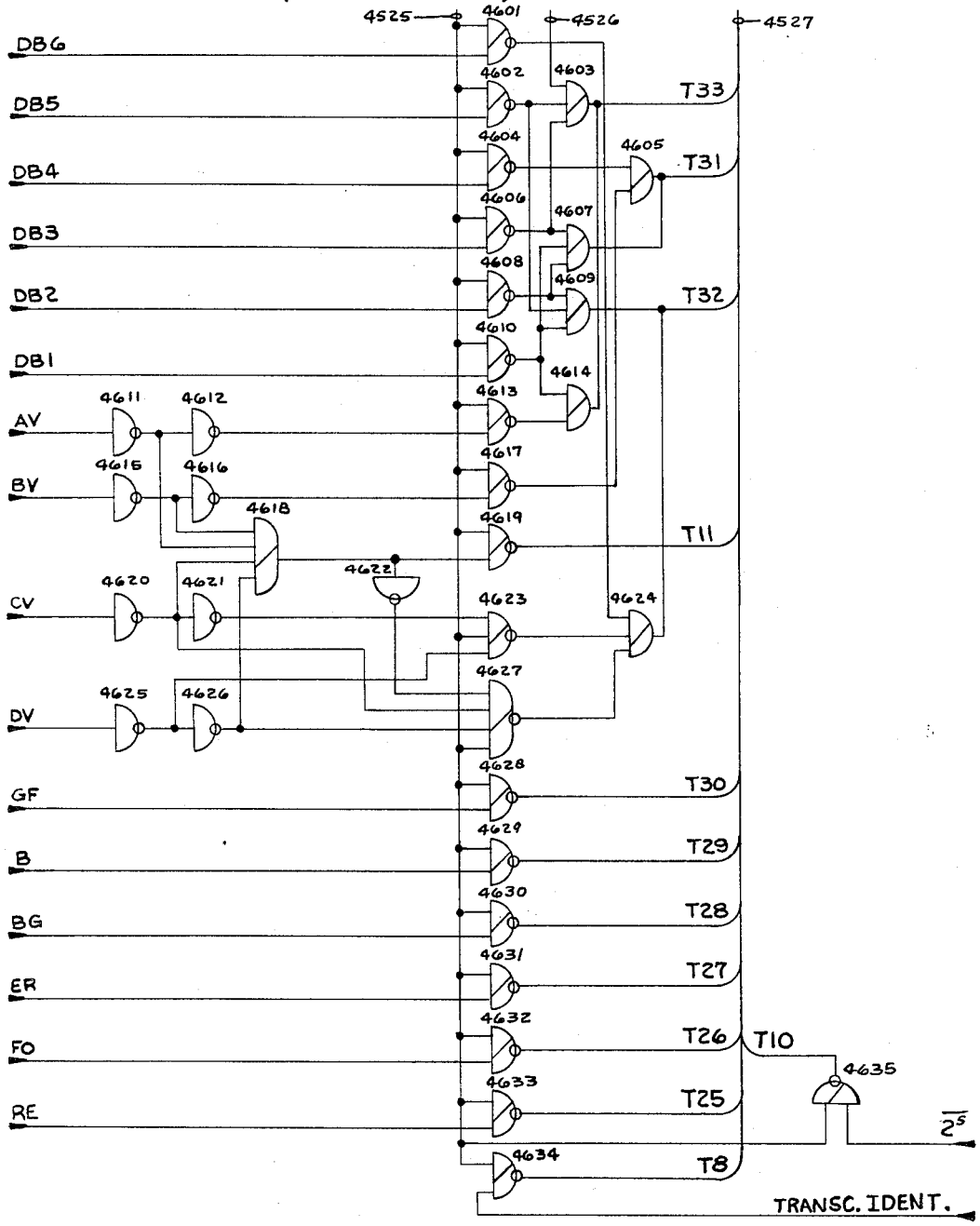
Figure 47:
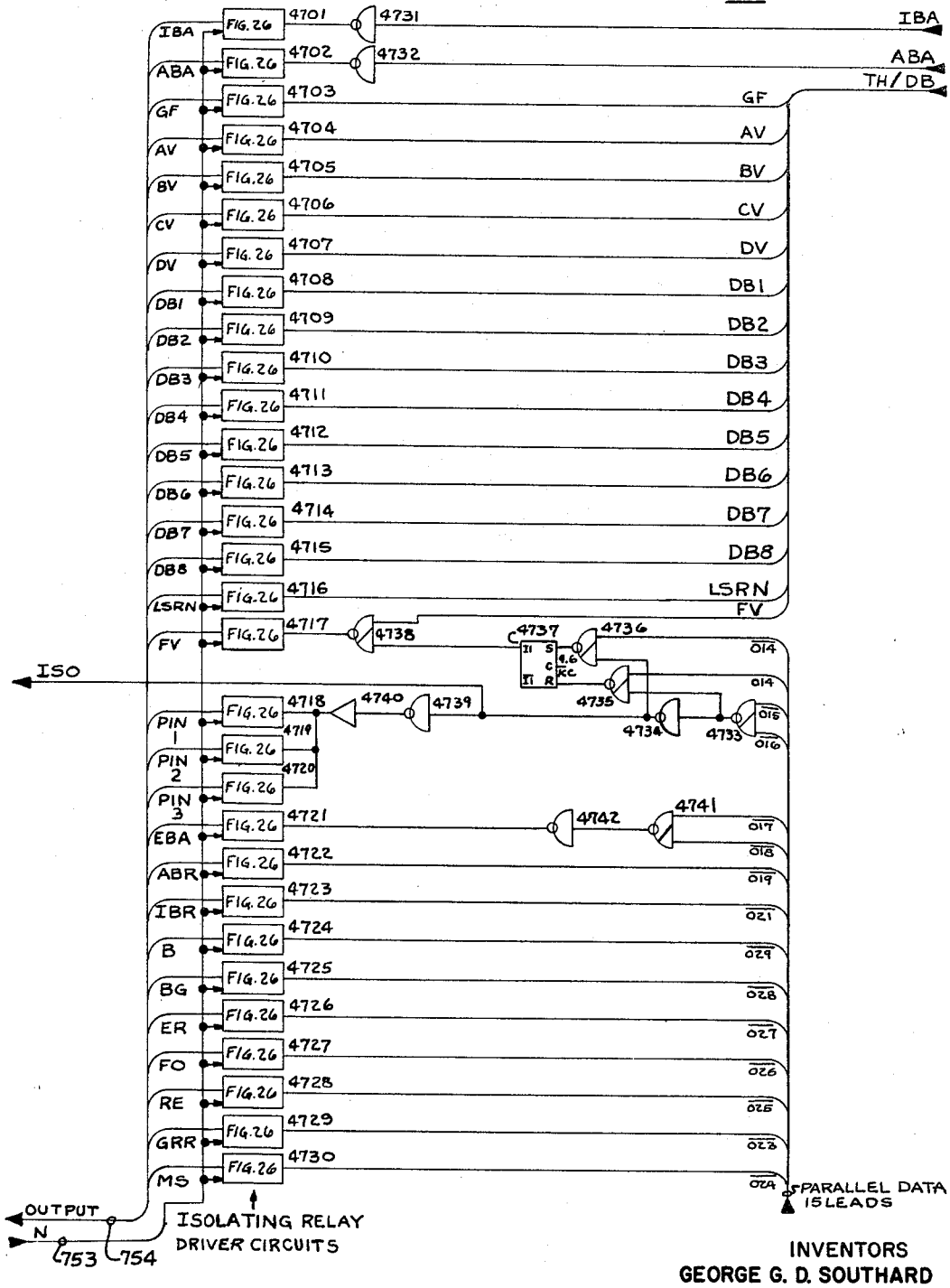
Figure 48:
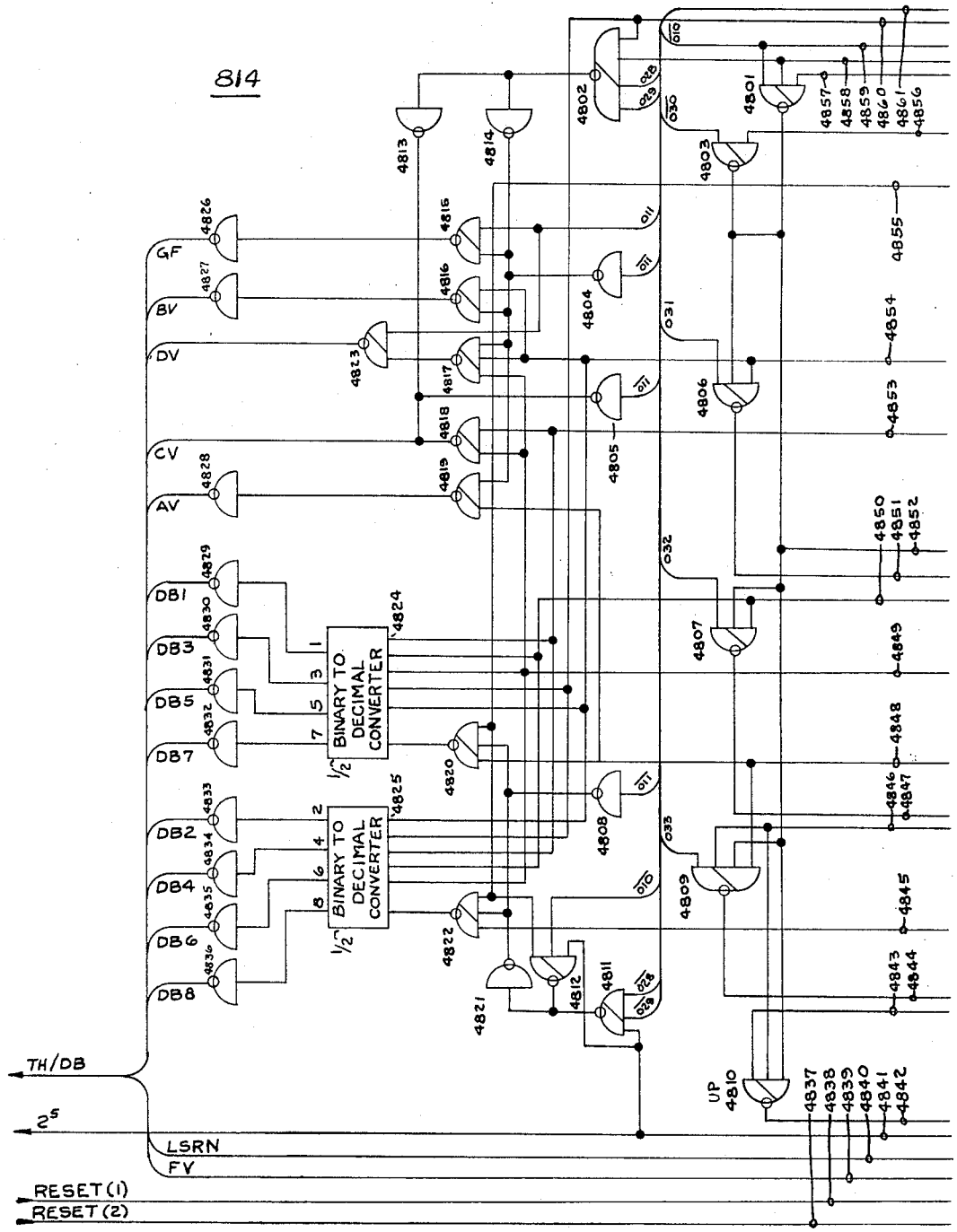
Figure 49:
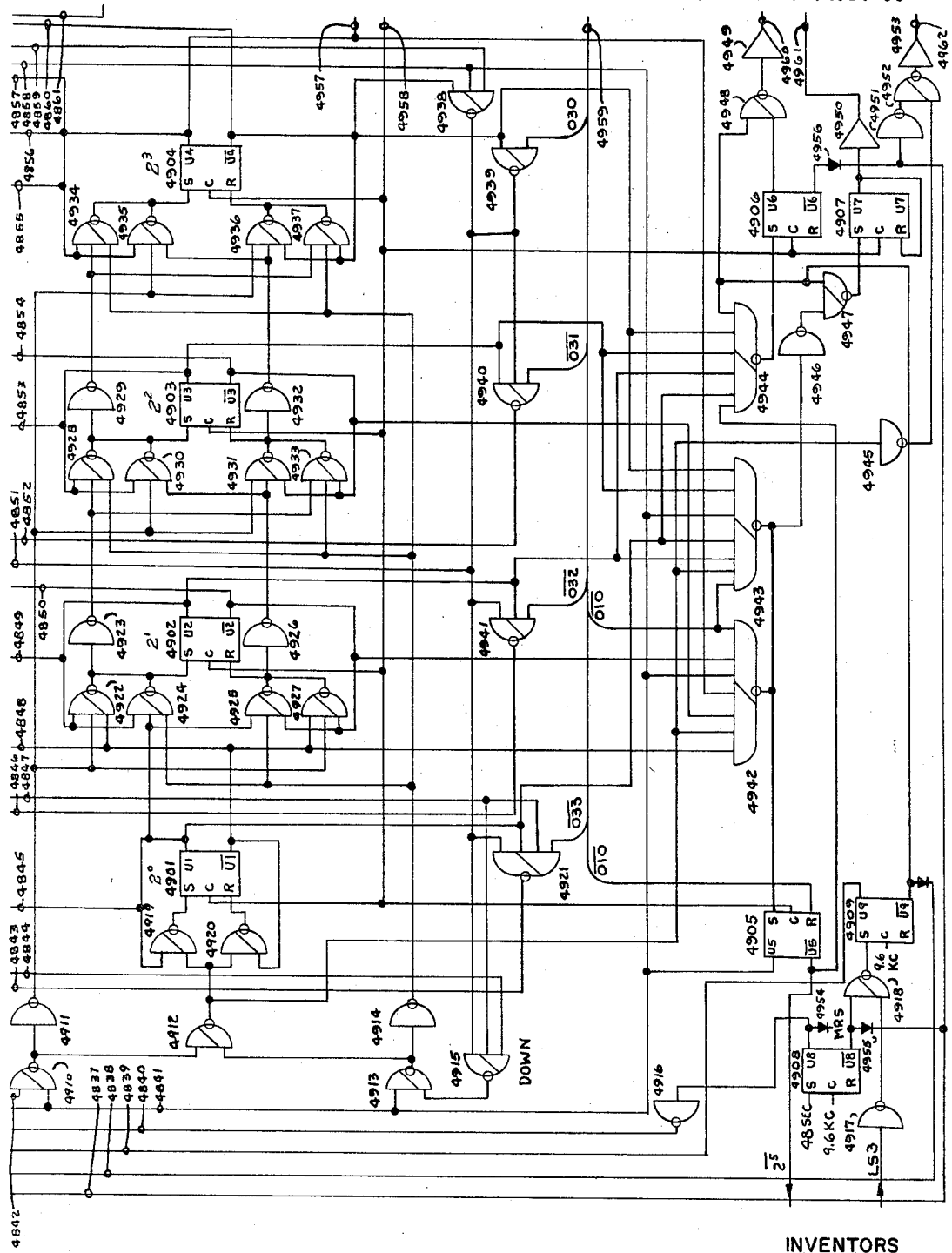
Figure 50:
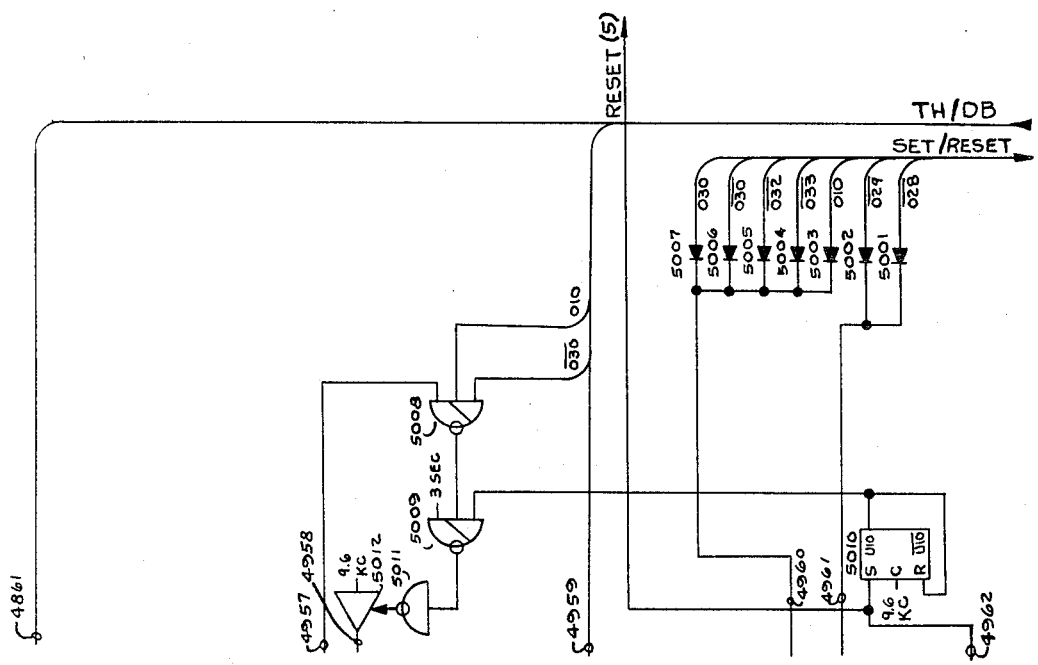
Figure 51:
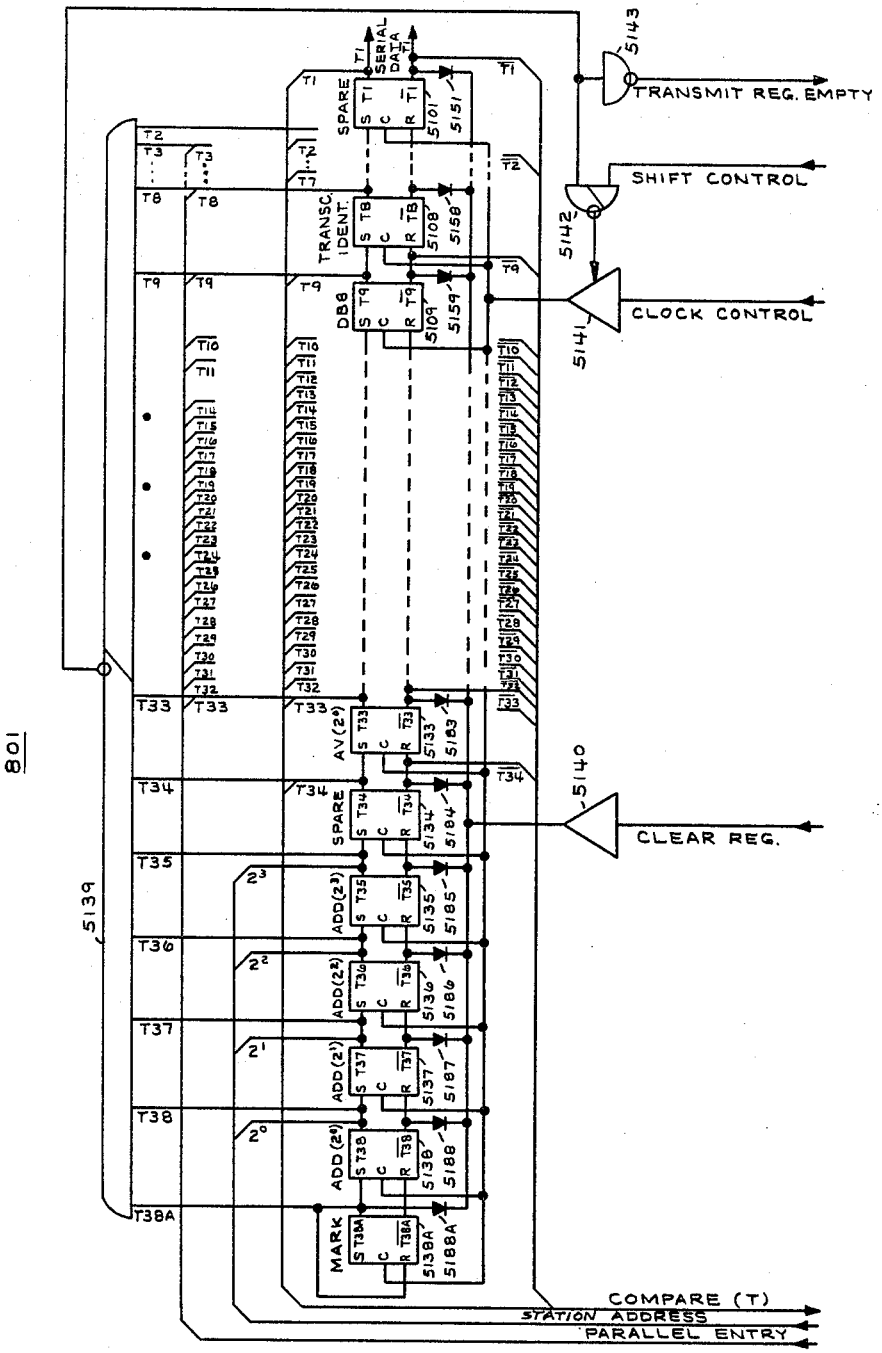
Figure 52:
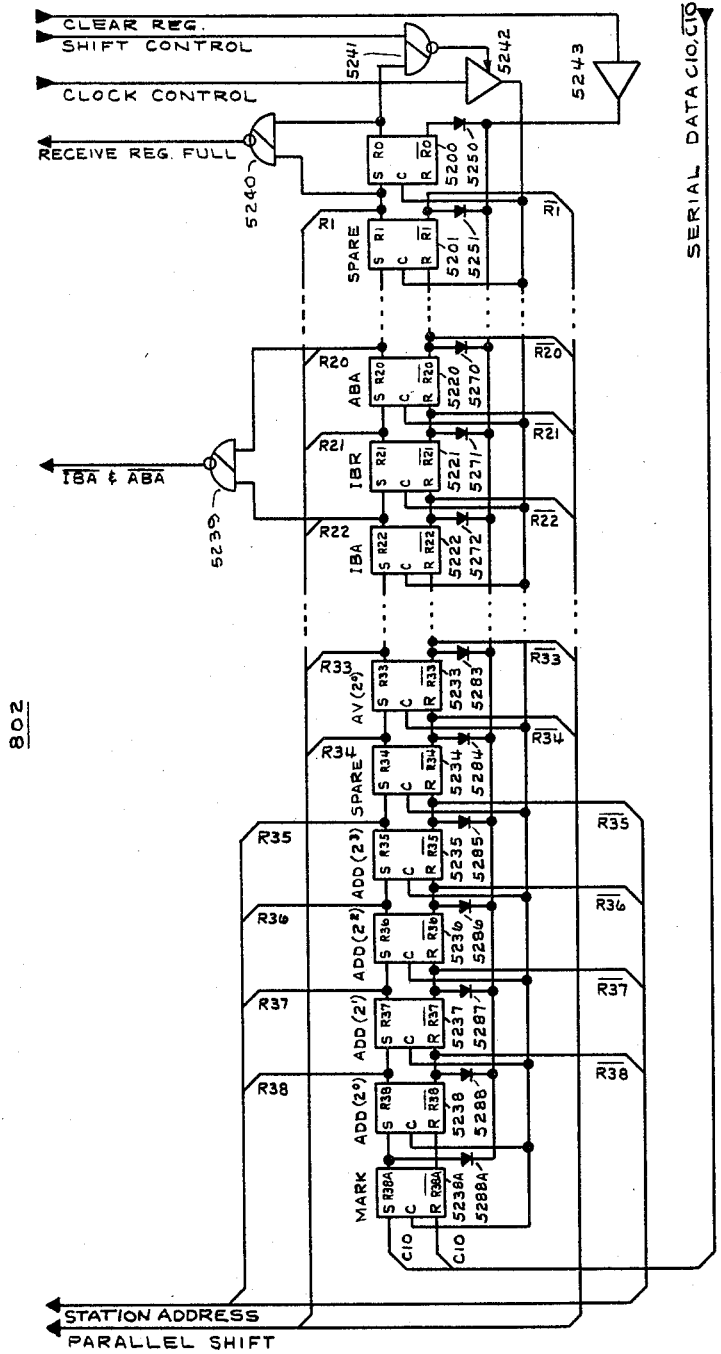
Figure 53:
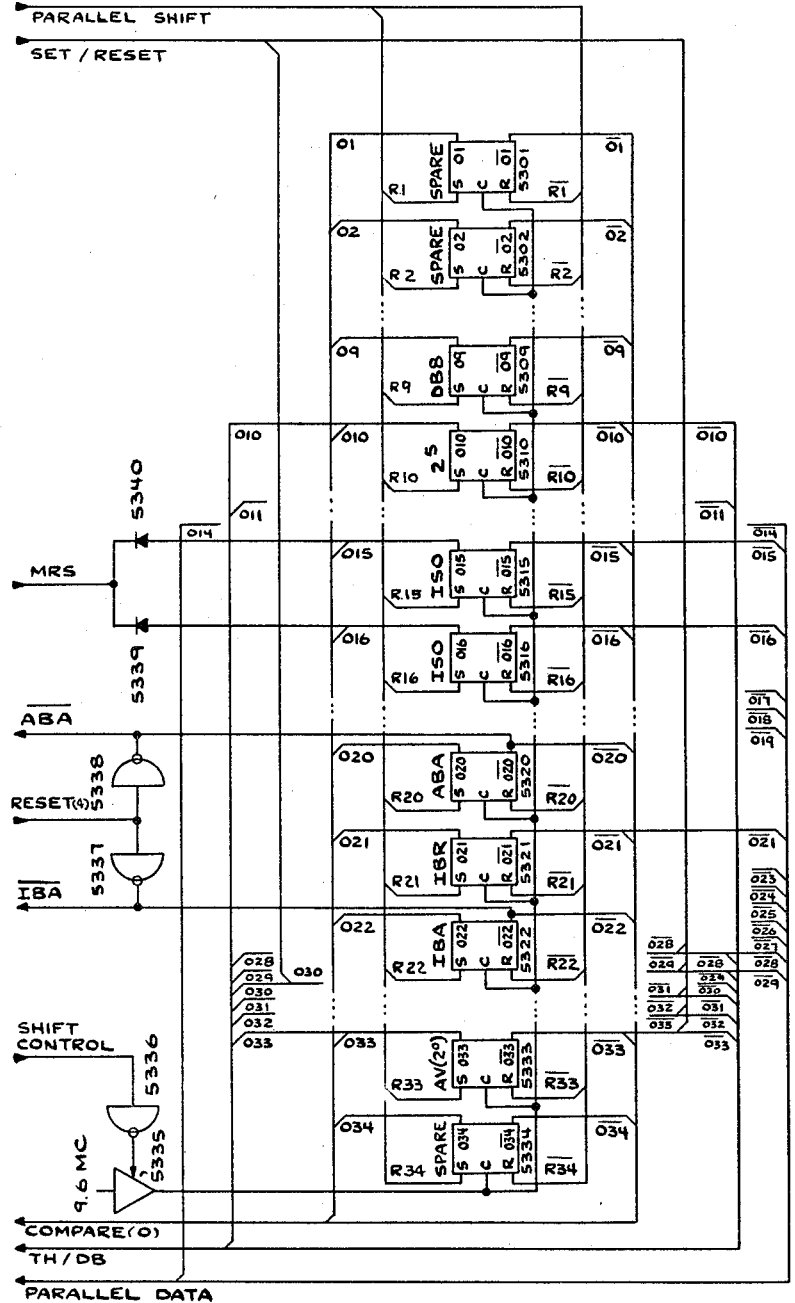
Figure 54:
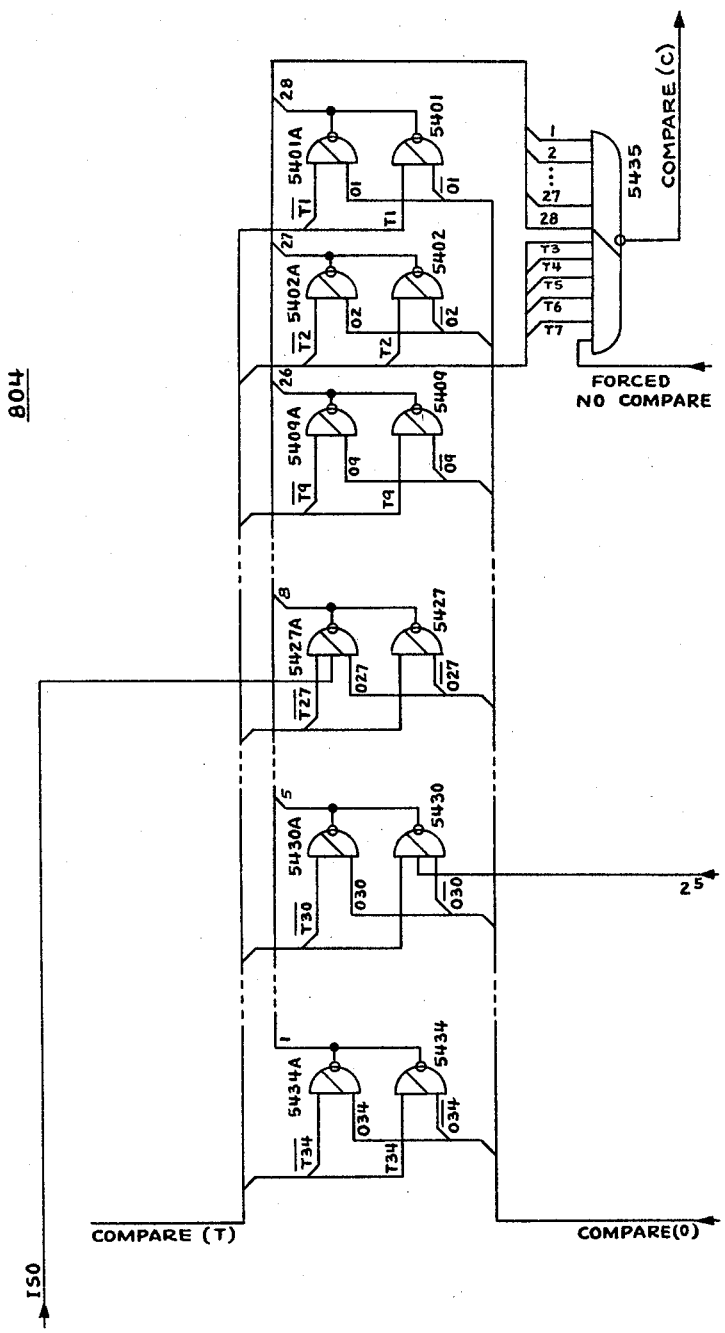
Figure 55:
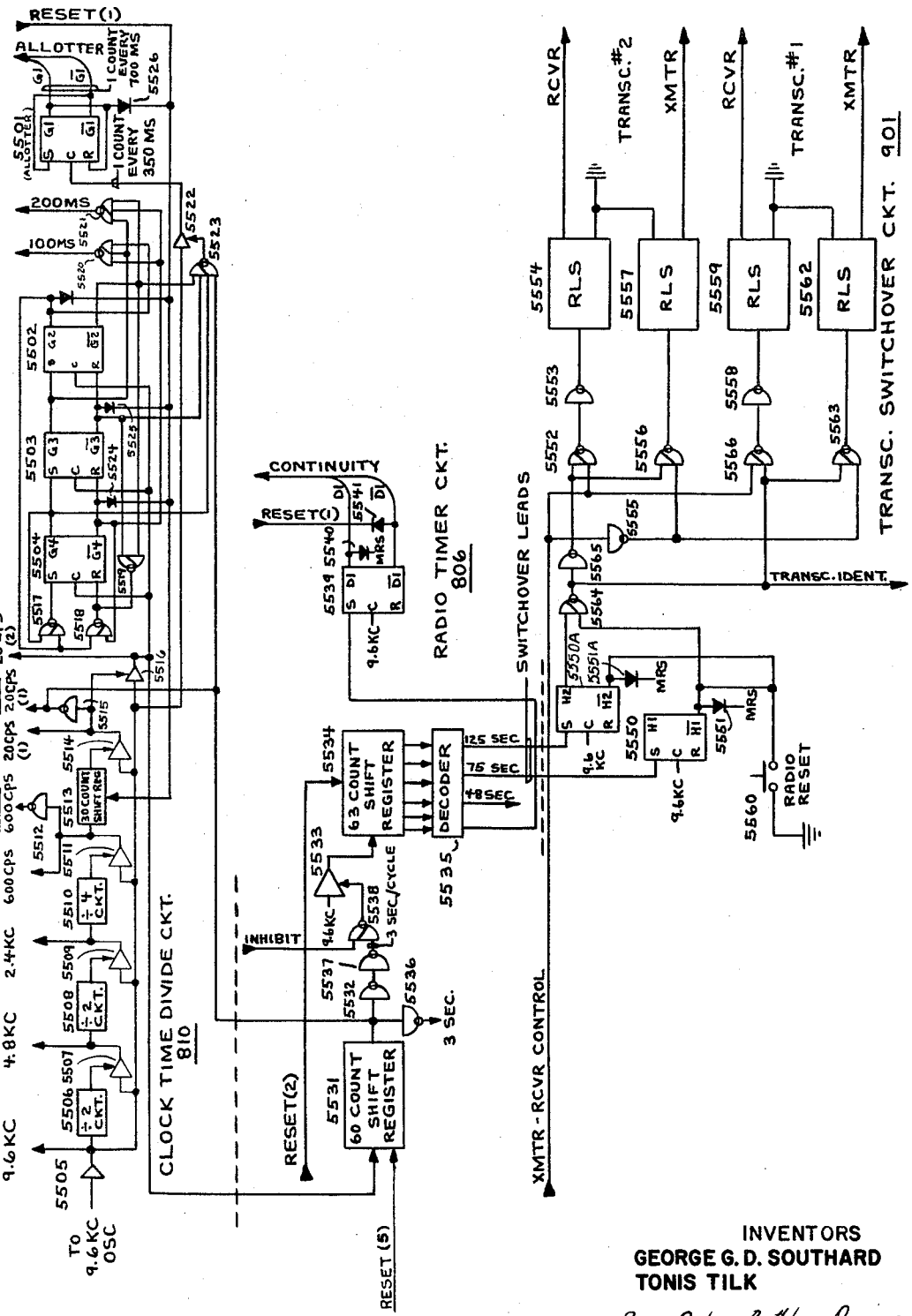
Figure 56:
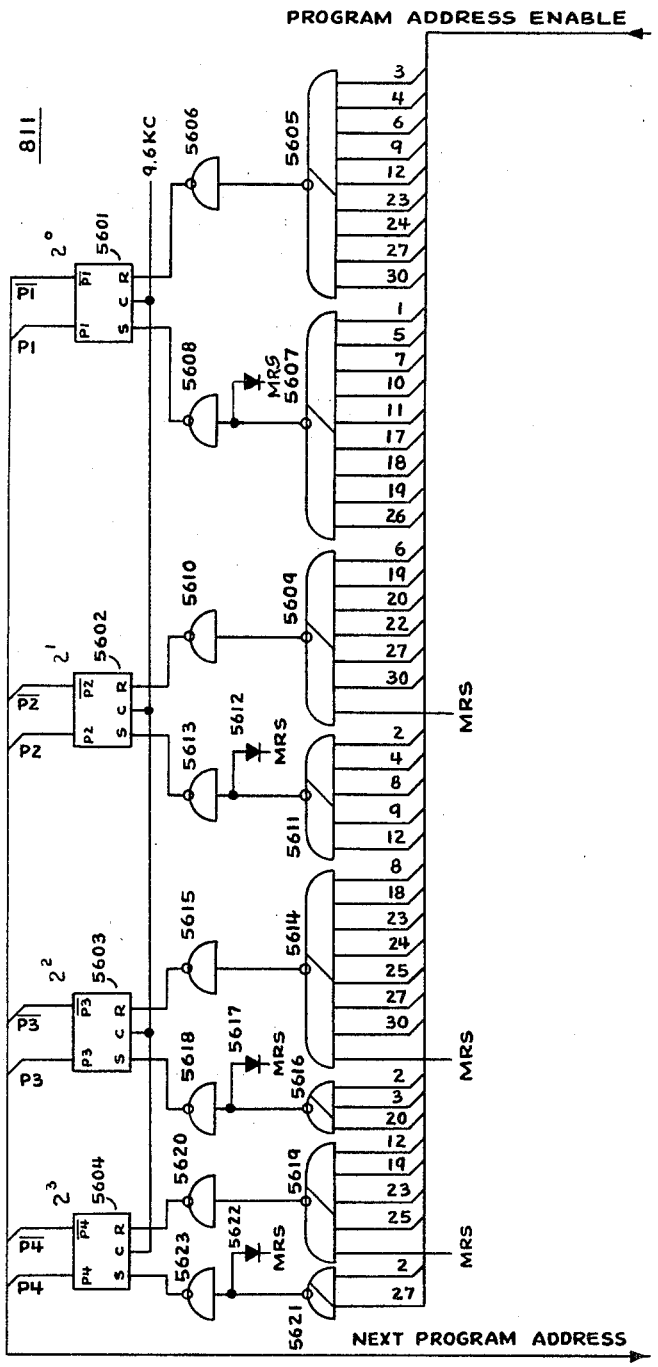
Figure 61:
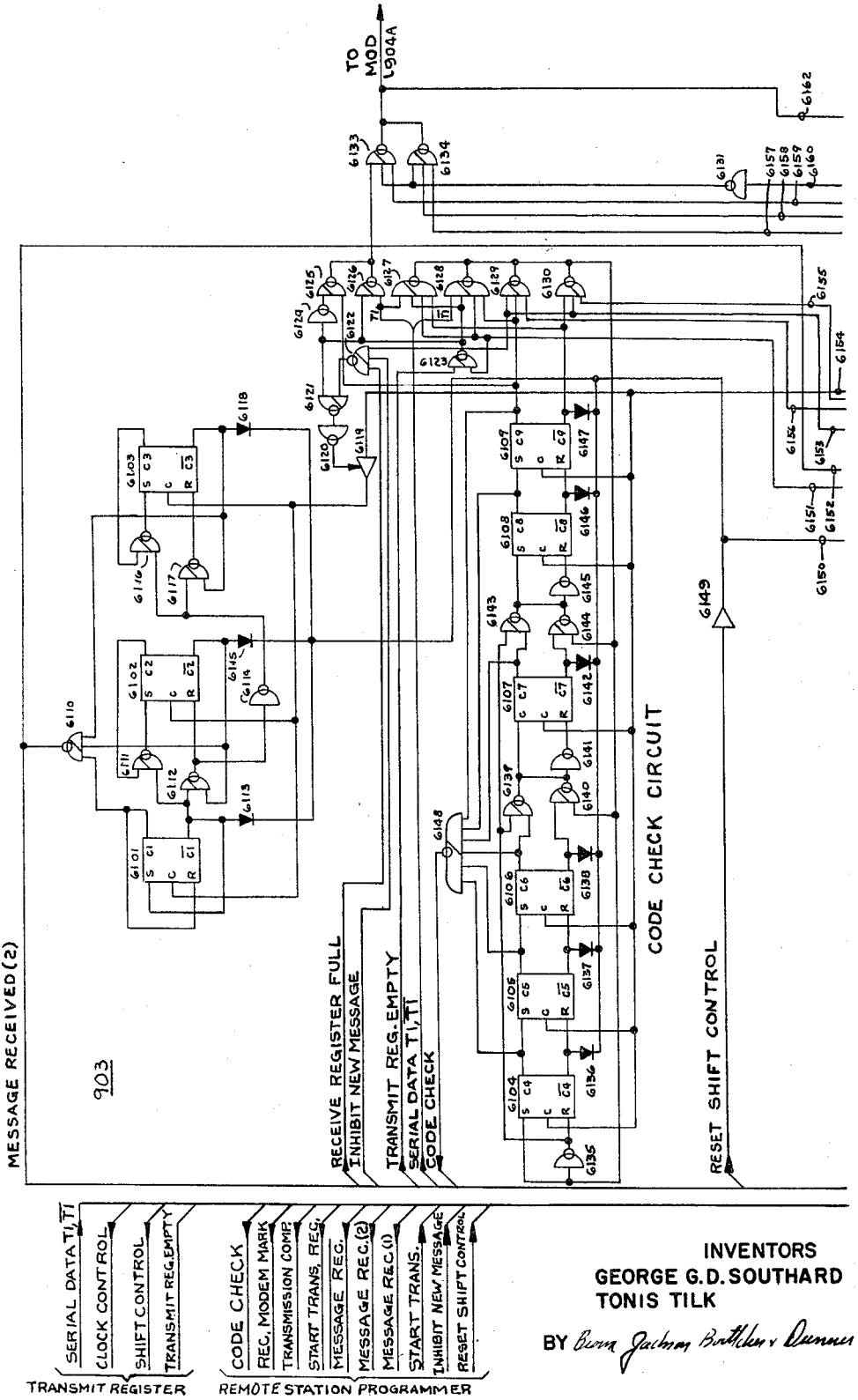
Figure 62:
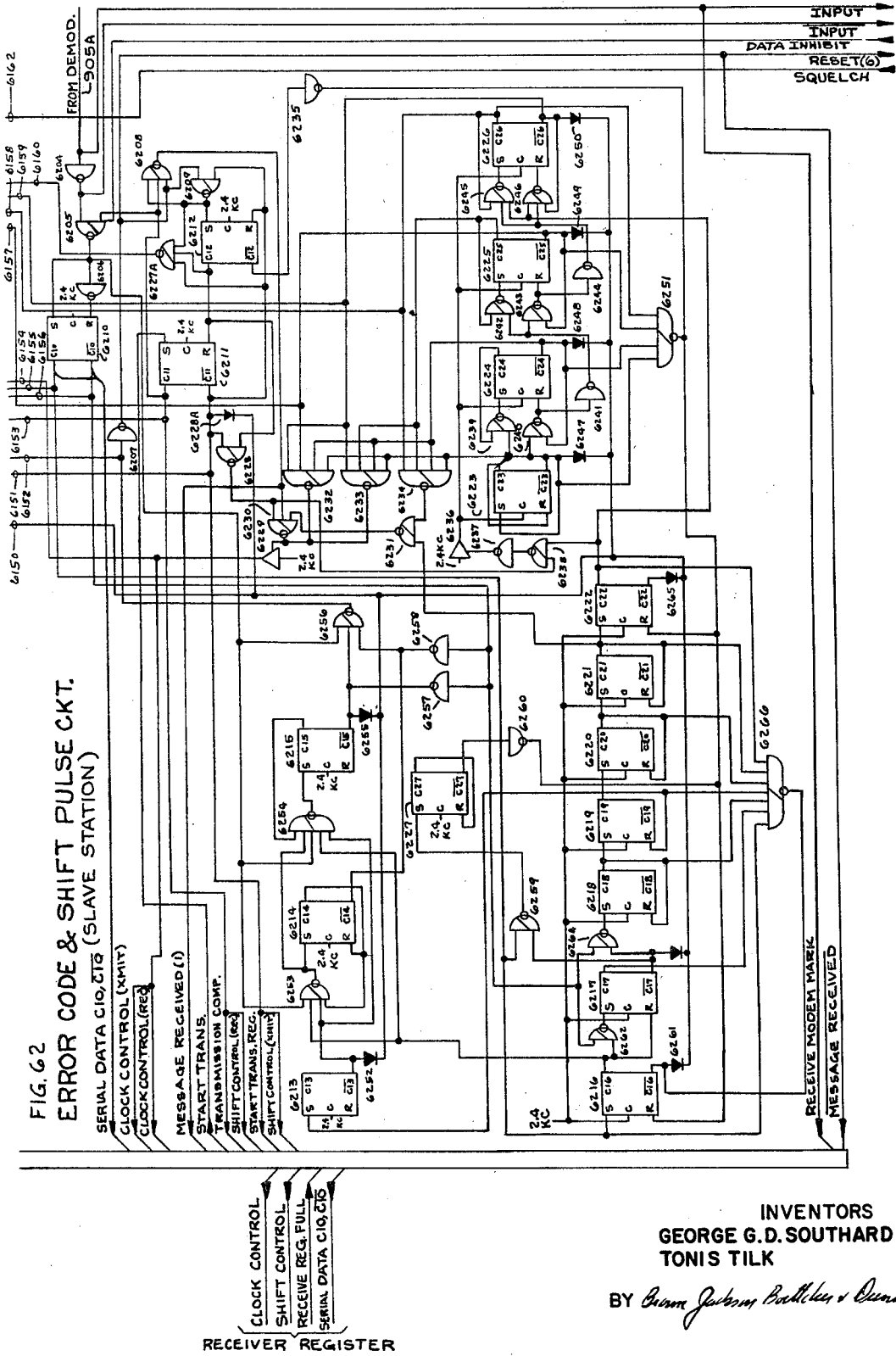
Figure 63:
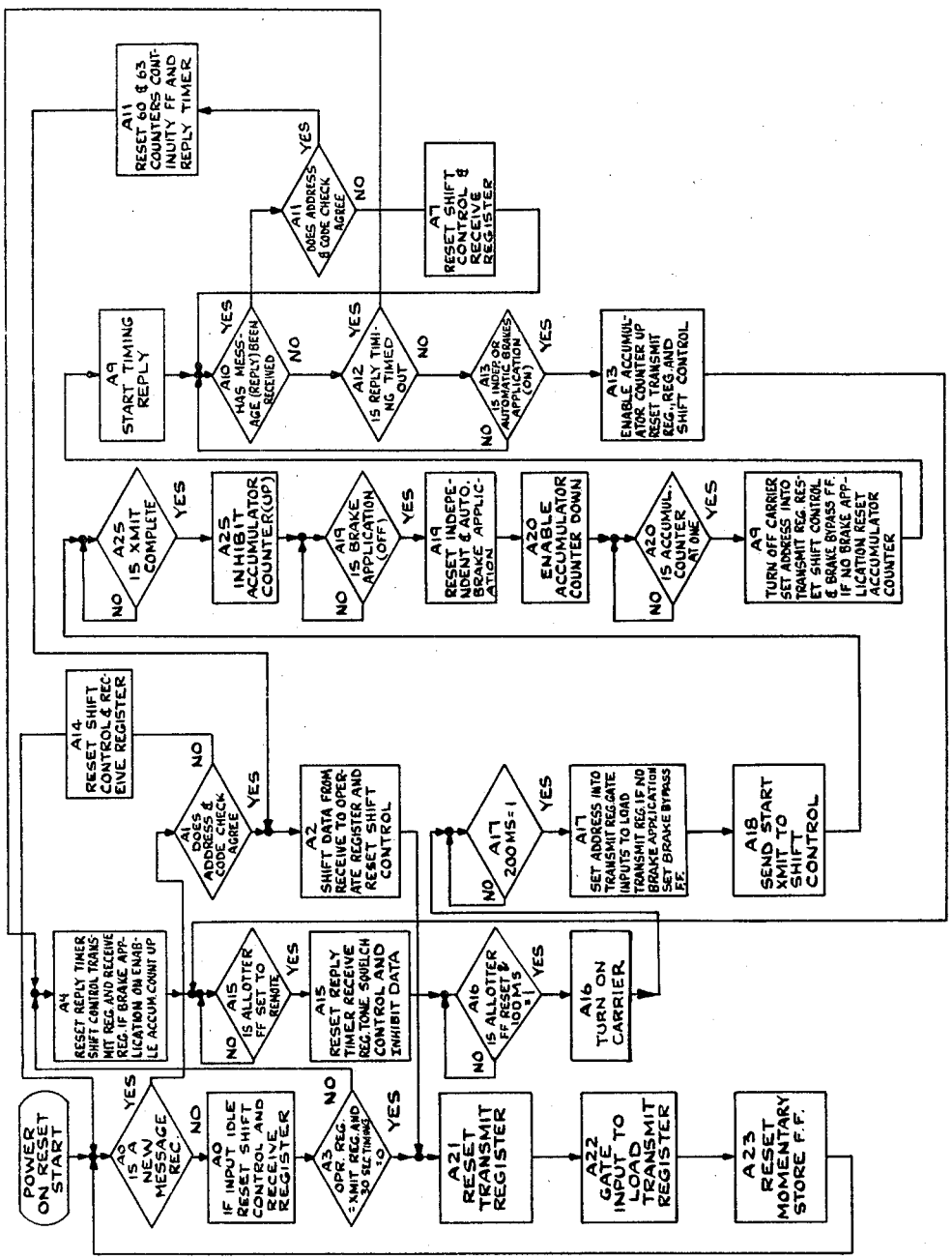
Figure 64:
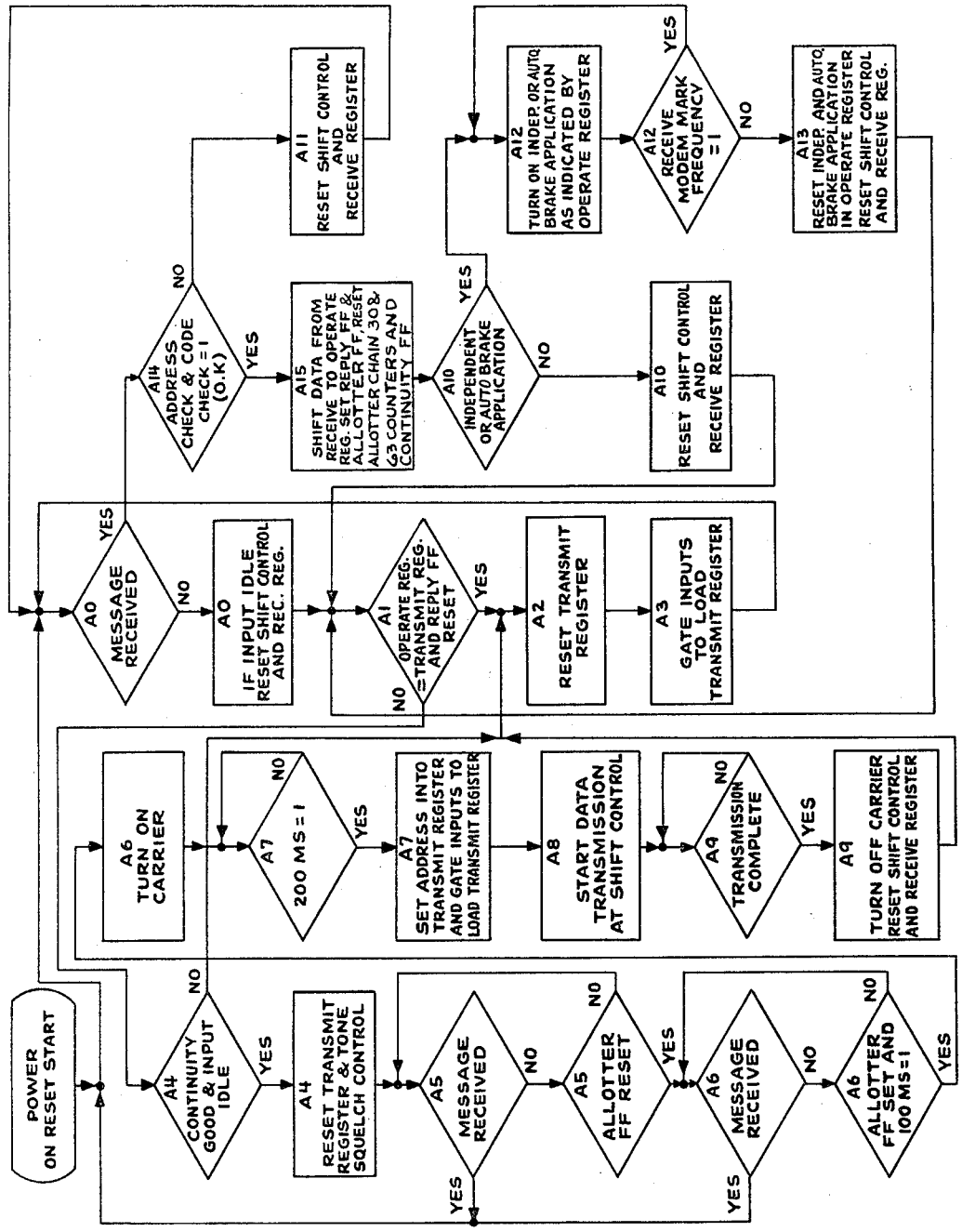
Figure 34:
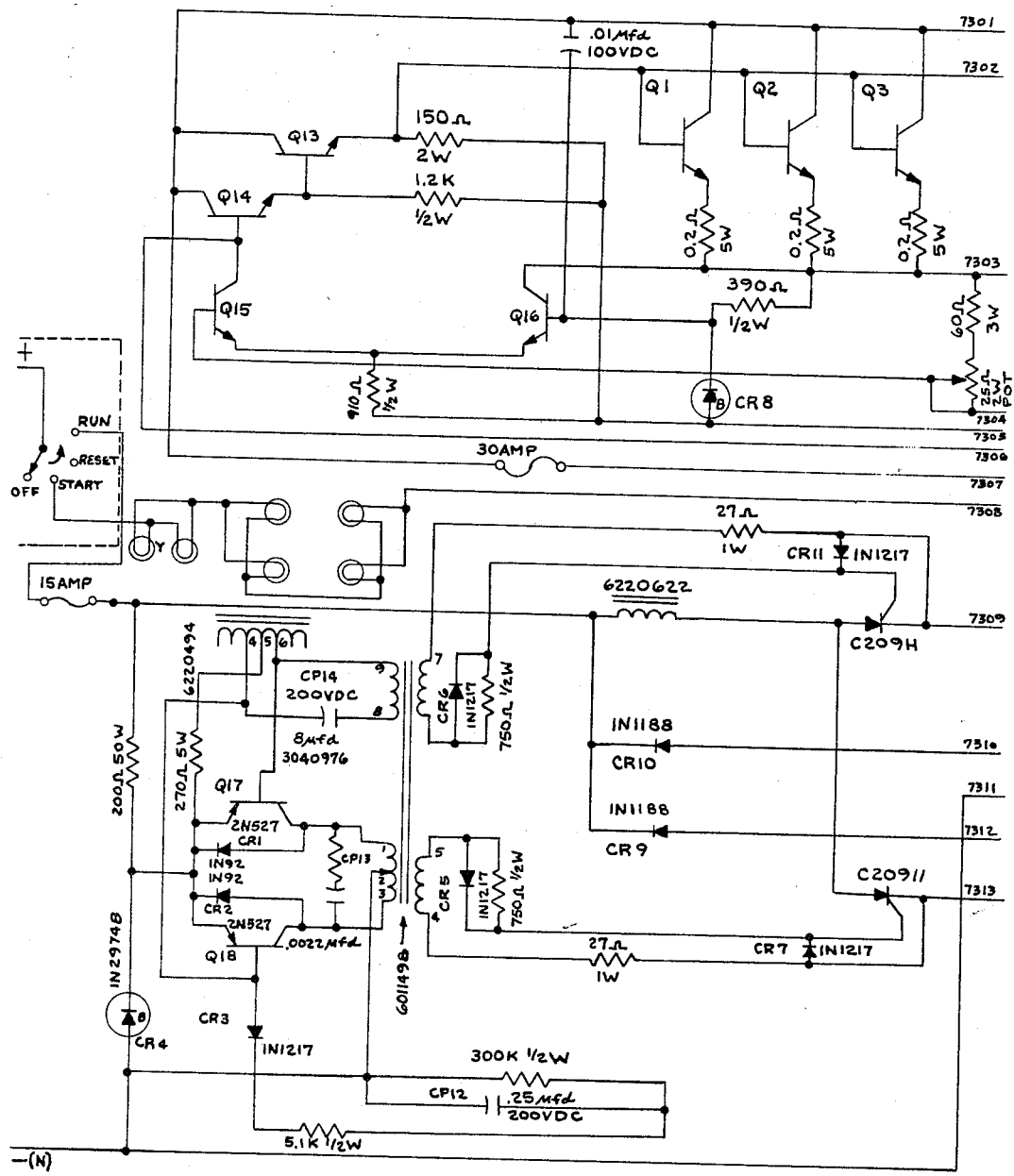

FIGURES 24–25 set forth a logic diagram of the master station logic interlock and entry gates found in FIGURE 4, which are to be assembled as shown in FIGURE 70;

FIGURE 26 comprises a circuit diagram of the isolating relay driver circuit found in FIGURES 25, 27 and elsewhere in the system;

FIGURE 27 is a logic diagram of the alarm control circuit shown in FIGURE 4;

FIGURE 28 sets forth a logic diagram of the master station transmit register shown in FIGURE 5;

FIGURE 29 comprises a logic diagram of the master station receive register shown in FIGURE 5;

FIGURE 30 is a logic diagram of the master station operate register shown in FIGURE 5;

FIGURE 31 is a logic diagram of the master station comparator shown in FIGURE 5;

FIGURES 32–33 comprise a logic diagram of the lamp driver circuit shown in FIGURE 4, which are to be assembled as shown in FIGURE 68;

FIGURE 34 comprises a logic diagram of the brake accumulator circuit shown in FIGURE 5;

FIGURE 35 is a logic diagram of the reply timer and a circuit schematic of the address switch shown in FIGURE 5;

FIGURE 36 comprises a logic diagram of the clock time divide circuit and radio timer circuit shown in FIGURE 5 and the transceiver switch over circuit shown in FIGURE 6;

FIGURE 37 comprises a logic diagram of the master station program register;

FIGURES 38–41 set forth a logic diagram of the master station programmer, which are to be assembled as shown in FIGURE 66;

FIGURE 42 is a logic diagram of the squelch timer;

FIGURES 43–44 comprise a logic diagram of the code generator and check logic including primitive polynomial circuit which are to be assembled as shown in FIGURE 69;

FIGURES 45–46 comprise a logic diagram of the slave station logic interlock and entry gates, which should be assembled as shown in FIGURE 71;

FIGURE 47 comprises a box and logic diagram of the isolated relay drivers;

FIGURES 48–50 comprise a box and logic diagram of the slave up/down throttle and brake counter which should be assembled as shown in FIGURE 72;

FIGURE 51 comprises a logic diagram of the slave station transmit register;

FIGURE 52 is a logic diagram of the slave station receive register;

FIGURE 53 is a logic diagram of the slave station operate register;

FIGURE 54 sets forth a logic diagram of the slave station comparator;

FIGURE 55 is a logic diagram of the slave station clock time divide counter circuit, the radio timer circuit, and the transciever switch over circuit;

FIGURE 56 comprises a logic diagram of the slave station program register;

FIGURES 57–60 comprise a logic diagram of the slave station programmer, which should be assembled as shown in FIGURE 67;

FIGURES 61–62 comprise a logic diagram of the code generator and check logic including primitive polynomial circuit;

FIGURE 63 is a master station flow chart;

FIGURE 64 is a slave station flow chart;

FIGURE 65 is an assembly diagram for the system of FIGURES 4–9;

FIGURE 66 is an assembly diagram for the master station programmer of FIGURES 38–41;

FIGURE 67 is an assembly diagram for the slave station programmer of FIGURES 57–60;

FIGURE 68 is an assembly diagram for the lamp driver circuit of FIGURES 32–33;

FIGURE 69 sets forth an assembly diagram for the code generator and check logic circuit of FIGURES 43 and 44;

FIGURE 70 comprises an assembly diagram for the logic interlock and entry gates (master station) of FIGURES 24–25;

FIGURE 71 comprises an assembly diagram for the logic interlock and entry gates (slave station) of FIGURES 45–46;

FIGURE 72 comprises an assembly diagram for the up/down throttle and brake counter of FIGURES 48–50; and FIGURES 73–74 comprise a circuit diagram of the power supply 2213 shown in FIGURE 22.

GENERAL DESCRIPTION

With reference now to FIGURE 1, the novel control system of the invention is schematically shown thereat, as included in a train having a plurality of power sources including at least one master and one slave locomotive.

The train, as illustrated in FIGURE 1 comprises mechanically coupled together: a master engine 1, slave engine 2, a plurality of regular cars, the first two of which are identified by numerals 3 and 4, radio car 5, slave engine 6, slave engine 7, and a plurality of regular cars, the first of which is identified by numeral 8. These units are coupled together by conventional mechanical couplers. An air hose AH for controlling the air brakes on each of the units extends between the units for the whole length of the train as is well known.

The lead "consist" comprises a master locomotive or engine 1 which electrically control its local slave locomotive or engine 2 over a plural lead or conductor train line TL1 as is well known. The special equipment for the master station of the system is housed in the slave locomotive 2 as will be shown.

The remote slave "consist" comprises the radio car 5, the slave engine 6 and the slave engine 7.

The radio car 5 controls the slave engines 6 and 7 in the rear "consist" over a plural lead or conductor train line TL2. Thus, the radio car 5 acts as a "locomotive" in controlling its slaves. However, the electrical power for the radio car 5 is provided over a power cable PC from slave locomotive 6.

An antenna 9 is mounted on the master locomotive 1, and an antenna 10 is mounted on the radio car 5. The remote control and supervision equipment of the master locomotive 1 operates with the remote control and supervision equipment in the radio car 5 and are linked by the radio channel 11 which is provided via antennas 9 and 10.

Referring now to FIGURE 2A, the normal locomotive controls as found in master locomotive are shown thereat. Thus, manual equipment 2A1 includes movable lever 2A2 having a rotatable handle 2A11 which together control the throttle and dynamic brake for the train. At this point, it is briefly noted that in operation of a diesel locomotive, the diesel engine operates a generator which operates a motor for each wheel and provides power for all other electrical equipment. In dynamic braking, the motor connections are adjusted so that the motors become generators driven by the wheels. The output of these wheel generators is then dissipated as heat through huge resistors in the roof of the locomotive.

When handle 2A11 is in the counter-clockwise rotated position, controller 2A1 is a throttle control, and controls the throttle to various conditions represented by the lever 2A2 in its various positions TH1–TH8. To change controller 2A1 to dynamic braking, lever 2A2 must be moved to the "idle" position and then to the "change" position, in which position handle 2A11 is then turned clockwise. Thereafter, lever 2A2 may be turned to the "idle" position, then continuously through various dynamic brake positions. The dynamic brake positions are not linear and do not correspond to the throttle positions indicated on the control lever.

Lever 2A3 is manually pivoted to the left from the illustrated normal position to apply the locomotive air brakes called "independent brake application" (IBA). To release the independent air brakes, the lever 2A3 is returned to the normal position.

Lever 2A4 is manually pivoted to the left from the illustrated normal position to lower the pressure in the main brake pipe and thus apply the train brakes on the locomotives and all of the cars. This is termed "automatic brake application" (ABA). To release the ABA air brakes, lever 2A4 is returned to normal position.

Lever 2A5 is manually pivoted to the left from the illustrated normal position to drop the pressure abruptly. This causes all other cars and locomotives to also drop their pressure abruptly and set the air brakes abruptly. This is designated "emergency brake application" (EBA). To release the EBA air brakes, the ABA brakes must be applied and then released.

Lever 2A6 is pivoted to the left from the illustrated normal position to apply sand to the wheels. To cease applying sand, lever 2A6 is returned to normal. Non-locking push-button 2A8 when depressed resets the locomotive of ground reset relay GRR.

Non-locking push-button 2A9, when depressed, turns off the alarm bell as actuated by an alarm condition in the lead consist.

Lever 2410 is pivoted to the illustrated position to cause the locomotive to run in the forward direction (FD). It is pivoted to the position RV to cause the locomotive to run in the reverse direction.

Referring now to FIGURE 2B, auxiliary locomotive controls are there shown which are added to the lead locomotive at the engineer's position to enable manual remote control and supervision of the remote slave or consist.

More specifically, controller 2B1 comprises a gang-switch (see also FIGURE 23) controlled by manually operable lever 2B2 to eight throttle and dynamic brake positions corresponding to those shown in FIGURE 2A. If the controller 2A1 is in the throttle conditions, the controller 2B1 will operate in throttle control. If controller 2A1 is in dynamic braking mode, controller 2B1 will operate in the dynamic braking mode. Adjacent each of these positions is a square lamp, the upper part of which lights and illuminates the letters TH for throttle, or the lower part of which lights and illuminates the letters DB for dynamic braking.

In the positions 1–8, the switch 2B1 allows the engineer to operate the slave engine at a different throttle or dynamic position than the lead engine.

If lever 2B2 is moved to the "multiple unit" position (MU) the light 2B13 lights. In this position, the engineer operates lever 2A2 and handle 2A11 which via the radio system controls together both the local master locomotive consist and the remote slave consist.

In the idle position, the IDLE lamp 2B12 lights and slave locomotives coast or sit still, but communication over the radio system is in effect.

If lever 2B2 is placed in the isolate position (ISO) lamp 2B11 lights. In this position, communication over the radio system is in effect but the lead locomotive does not control the slave with respect to throttle, dynamic braking, and ground relay reset, although the slave can report alarm conditions to the master locomotive.

The engineer uses non-locking push-buttons 2B3–2B5 (IBA, ABA, EBA) and (IBR and ABR) instead of levers IBA, ABA, and EBA. This controls the local master locomotive consist air brakes and the remote slave locomotive consist air brakes over the radio system together.

Operation of toggle switch 2B6 to the ON and OFF positions controls sanding (MS) at the remote slave over the radio system. The local sanding lever 2A6 must be operated to control local sanding.

Operation of toggle switch 2B7 controls the air brake feed valve (ABFV) at the remote slave.

If the engineer depresses the non-locking push-button 2B8, ground relay reset (GRR) occurs at the remote slave. Reset of the local ground relay must be effected, if necessary, by means of push-button 2A8.

If the engineer depresses the non-locking push-button 2B9, the alarm bell which has been operated incident to an alarm from the slave received over the radio system is silenced.

The console power switch 2B10 in the OFF position provides means for stopping the master station programmer and also disables the push-button controls 415.

In the overall control system (as shown in FIGURE 4) the controls which have been described are represented by the box labeled "regular locomotive controls." The push-buttons IBA, ABA, EBA, IBR and ABR described above, are labeled "push-button control for air brakes" in FIGURE 4. The switch 2B1, toggle switches 2B6, 2B7, 2B10 and push-buttons 2B8 and 2B9 are labeled "console" in FIGURE 4 and are further shown in FIGURE 23.

*Signalling pattern*

At this point the signalling patterns which are used over the radio channel 1A11 or 1B11 to effect the desired control are set forth in more detail.

Normally with the train moving along the track with lever 2B2 (FIG. 2B) of switch 2B1 in the MU position, and no change in controls initiated at the master locomotive and no alarm condition at the remote slave "consist," the master station transmits a single word message comprising a comprehensive recapitulation of all controls every thirty seconds to the remote slave station which, upon receipt and checking thereof, compares the control indications with the status of such controls at the remote station.

Normally, no discrepancy will be found to exist. The remote station replies by sending back to the master station a single word message comprising a comprehensive recapitulation of all status conditions at the remote station. This signal transmission "out and back" provides a means for maintaining the master station informed as to the continuity or lack of continuity of the radio channel, a means for the master station to constantly verify conditions at the remote station, and a means for the remote station to have its controls constantly verified.

If the report back from the slave station shows that a discrepancy exists between the condition the master station requests and the slave station shows, the master station will repeat its word every three seconds. The blinking "transmit" light XMIT on the console (FIGURE 23) draws the attention of the engineer to such condition, and the engineer then surveys his other lights to ascertain the reason for the discrepancy.

When a change of conditions occurs at the master station as a result of a manual control performed by the engineer (see the box designated "regular locomotive controls" in FIGURE 4), or as a result of an automatic control (not shown) which marks the leads of the plural lead train line TL1, the master station breaks into the thirty second routine, and transmits a single word comprising a comprehensive updating of all controls to the slave station, including the change in control requested. The slave station effects the change control, and transmits back to the master station a single word comprising a comprehensive updating of the status of controls and alarms at the slave station including the changed status of the requested control.

If an alarm condition arises at the slave station as a result of an alarm condition at any locomotive in the slave "consist," the slave station breaks into the thirty second routine, and transmits a single word comprising a comprehensive updating of the status of controls and alarms as found at the slave station to the master station including the instant alarm condition. No automatic transmission back from the master station occurs as a result thereof.

If the engineer determines from the received alarm that action is necessary, the appropriate remote control is initiated by the engineer. For example, if the alarm received indicates that wheels in the remote consist are slipping (i.e., the wheel slip lamp WS in FIGURE 23 lights), a remote sanding operation is initiated by operating the toggle switch 2B6, whereby the master station sends a single word containing the sanding control. When the remote station sanding equipment functions, the remote station sends a single word as a result thereof, lighting the MS lamp in FIGURE 23. When the wheels stop slipping, the remote station sends a single word which extinguishes the WS lamp. The engineer flicks the switch 2B6 to the off position as a result of which the master station sends a single word including the instruction to turn the sanding equipment off at the remote station. Thereupon the remote station returns a single word extinguishing the MS lamp.

If the remote station fails to receive a transmission from the master station for 48 seconds, and a flow of air toward the lead locomotive is detected in the air line, the remote station disables the air brake feed valve (ABFV) and shuts down the dynamic brake or throttle placing the remote "consist" in the idle (i.e. coasting) condition. The slave will remain in this condition until continuity is regained.

Signalling between the antennas 9 and 10 is accomplished at the master station or slave station by means of tone signals modulating a carrier. The carrier frequency is in the industrial band and in one embodiment a 160 megacycles per second frequency was used. The tone signals are generated by a 2200 c.p.s. oscillator which shifts ±250 cycles. Thus the lower tone used for signalling is 1950 c.p.s. and the higher tone 2450 cycles. The oscillator is normally running with shift control maintaining the tone at either 1950 c.p.s. or 2450 c.p.s. The bandwidth of the channel is 3.5 kc. having a frequency response variation of ±3 db. The carrier is turned on and off for signalling. The tone may be shifted simultaneously with application of the carrier and during application of the carrier.

Referring now to FIGURES 6 and 9, signalling is accomplished at the master station 600 by transceiver #1 and its standby, transceiver #2; and at the slave station 900 by transceiver #1 and its standby, transceiver #2. Each transceiver comprises a narrow band FM radio which operates in the indusrtial band. The radios are operated on a half duplex basis (i.e. at a given time it either transmits or receives but not both at the same time). Because the operation is half-duplex, signalling between the master station and remote station operate on a single radio carrier frequency using the same modulating tones. Furthermore, each word includes an address or identity code, allowing other trains to operate in the same area on the same radio carrier frequency with the same tones.

Selection of the data modulation scheme was based on system response time, channel characteristics, reliability, error checking, and economies. The scheme chosen was that of medium speed (600 baud) frequency shift keying. The scheme is similar to that of a normal FSK Teletype channel but the speed is considerably higher.

A code checking scheme is used to give security to the system. This scheme is based upon W. Wesley Peterson's book "Error Correcting Codes," MIT Press, copyright 1961, chapters 4 and 6. The chance of undetected single and multiple bit errors or bursts is very small.

The system must provide fast acting commands and high speed feedback response to the operator and must do so with negligible degradation of the signal. The system must be fail-safe and provide protection against false operations.

The basic elements of transmitted signals are shown in FIGURES 15–18. As shown in FIGURE 15, a primary sync signal comprises a 92.05 millisecond shift from low tone to high tone plus an immediate 7.95 millisecond period of low tone. As shown in FIGURE 16, a secondary sync signal comprises a 1.6 millisecond period of low tone, followed immediately by a 1.6 millisecond period of high tone. FIGURE 17 shows that ligic "0" comprises a 1.6 millisecond period of low tone. Logic "1" is shown in FIGURE 18 comprises a 1.6 millisecond period of high tone. Thus a secondary sync signal comprises a logic "0" bit immediately follow by a logic "1" bit.

Referring now to FIGURE 3C, a single word such as may be transmitted by master station or remote station is shown to comprise an assemblage of the elements shown in FIGURES 15–18. More specifically, with time considered from left to right, the transmission of a word comprises the transmission of a primary sync signal followed by a plurality of secondary sync signals and logic "0" and/or logic "1" signals. This plurality comprises a group of information or message bits transmitted next after the primary sync signal, followed by a group of address bits and lastly, error bits. Then, incidentally, a 9.2 millisecond period of low tone follows.

The 92.05 ms. (millisecond) part of the primary sync signals constitutes a transmitter squelch signal. A secondary sync signal always precedes two information bits, there being 34 message bits, 4 address bits, and six error bits. The message bits, in general, each convey a discrete bit of information. However, in two cases a combination of two message bits are used to convey a discrete bit of information. The use of secondary sync signals is considered to be a unique feature of the invention allowing a type of signaling which is a compromise between the speed of the non-return-to-zero type and the security of the return-to-zero type.

Address bits 35 and 36 (FIG. 3C) are used in combination to provide $2^2=4$ combinations. Similarly address bits 37 and 38 (FIG. 3C) are used in combination to provide 4 combinations. The first four combinations are used in conjunction with the last four to provide 4 times 4 or 16 addresses.

Each master station (i.e., different trains having different master stations) contains an address switch by means of which that master station may be selectively assigned any one of sixteen addresses 0–15 so that different trains using the same carrier and the same tones will be non-interfering.

As the thirty-eight bits, message and address, are transmitted, a code checking circuit divides the thirty-eight term polynomial represented by these bits plus six zeros by the generator primitive polynomial 1011001 in modulo 2 to derive six error checking bits which are thereafter transmitted. As the thirty-eight message and address bits and six error checking bits are received at the receiving end, a code checking circuit divides these bits by the same primitive polynomial in modulo 2. If the remainder is zero, the transmission is considered to be error free. We shall assume that the address of the illustrated train is 00 which would be represented by address bits 0000.

Bits 1–38 of the message and address transmitted from the master station and remote slave station are as follows, for example:

| Master Station | | Remote Slave Station | |
|---|---|---|---|
| Bit | Information | Bit | Information |
| 1 | Spare. | 1 | Spare. |
| 2 | Do. | 2 | Do. |
| 3 | Do. | 3 | WS (Wheel Slip). |
| 4 | Do. | 4 | BW (Brake Warning). |
| 5 | Do. | 5 | OS (Low Oil). |
| 6 | Do. | 6 | TS (Hot Engine). |
| 7 | Do. | 7 | SG (No Power). |
| 8 | Do. | 8 | Radio Identification. |
| 9 | Do. | 9 | DB8. |
| 10 | $2^5$ (Idle, ISO, or Console power Off). | 10 | $2^5$ (Up/Down Counter Position). |
| 11 | DV (Engine Stopped). | 11 | DV (Engine Stopped). |
| 12 | Idle. | 12 | Idle. |
| 13 | Spare. | 13 | Spare. |
| 14 | FV (ABFV). | 14 | FV (ABFV). |
| 15 | ISO. | 15 | ISO. |
| 16 | ISO. | 16 | ISO. |
| 17 | EBA. | 17 | EBA. |
| 18 | EBA. | 18 | ABA. |
| 19 | ABR. | 19 | ABR. |
| 20 | ABA. | 20 | ABA. |
| 21 | IBR. | 21 | IBR. |
| 22 | IBA. | 22 | IBA. |
| 23 | GRR. | 23 | GRR. |
| 24 | MS. | 24 | MS. |
| 25 | RE. | 25 | RE. |
| 26 | FO. | 26 | FO. |
| 27 | ER. | 27 | ER. |
| 28 | BG. | 28 | BG. |
| 29 | B. | 29 | B. |
| 30 | $2^3$ (GF). | 30 | $2^3$ (GF). |
| 31 | $2^2$ (BV) DB/TH. | 31 | $2^2$ (BV) DB/TH. |
| 32 | $2^1$ (CV. DV=1) DB/TH. | 32 | $2^1$ (CV. $\overline{DV}$=1) DB/TH. |
| 33 | $2^0$ (AV) DB/TH. | 33 | $2^0$ (AV) DB/TH. |
| 34 | Spare. | 34 | Spare. |
| 35 | $2^3$ (ADDRESS). | 35 | $2^3$ (ADDRESS). |
| 36 | $2^2$ (ADDRESS). | 36 | $2^2$ (ADDRESS). |
| 37 | $2^1$ (ADDRESS). | 37 | $2^1$ (ADDRESS). |
| 38 | $2^0$ (ADDRESS). | 38 | $2^0$ (ADDRESS). |

Referring now to FIGURE 3A, the functioning of the master station allotter flip-flop 3601 (FIGURE 36) is shown thereat. As indicated, this flip-flop changes between the logic "1" and the logic "0" states every 350 ms. The master station is conditioned for transmission only when flip-flop 3601 is in the logic "0" state, i.e. reset.

The functioning of the remote station allotter flip-flop 5501 (FIGURE 55) is shown in FIGURE 3G. As indicated, this flip-flop also changes between the logic "1" and the logic "0" states every 350 ms. The remote station is conditioned for transmission only when flip-flop 5501 is in the logic "1" state, i.e., set.

It should be observed, however, that during the 350 ms. period in which the master station is conditioned for transmission, the remote station is not conditioned for transmission and vice versa.

Synchronism between the allotter flip-flops at the master and remote stations is maintained by circuitry at the remote station which in response to cessation of reception from the master station (about 9.2 ms. before the end of the 350 ms. interval) sets the remote allotter flip-flop to the logic "1" state after a delay of approximately .2 ms. As transmission from the master station to the remote station occurs at intervals not longer than 30 seconds, any drift which occurs is slight relative to 350 ms.

As will become more apparent hereinafter, if the master station transmits in a given 350 ms. interval, the slave station cannot reply until the third 350 ms. interval thereafter. However, if the remote station reports an alarm during a given 350 ms. inerval, the master station can initiate transmission in the very next 350 ms. interval.

It should be observed also that, although the allotter flip-flops condition the stations for transmission, transmission does not occur unless requested.

Referring now to FIGURE 3B, if the master station is calling for transmission when the allotter flip-flop begins the 350 ms. transmit interval, a wait period of 100 ms. occurs. After the expiration of this 100 ms. period, transmission of the word occurs during the remaining 250 ms. period. A similar procedure obtains at the remote station as shown by FIGURE 3H. An expanded and more detailed showing of the conditions at the master station or remote station during the 250 ms. period is shown in FIGURE 3C.

If the engineer depresses the ABA brake button 2B4 (FIGURE 2B) or the IBA button 2B3 at the point labeled A in FIGURE 3D, the up-down binary counter in the brake accumulator circuit (FIGURE 34) starts counting up.

Pushing of either the ABA or IBA buttons causes the master station to call for transmission of a logic "1" as the 20th bit or 22nd bit respectively. As shown in FIGURE 3F, with the master station calling for transmission when the allotter flip-flop allows, the primary sync signal starts and the word ensues. At the end of the transmission of the word indicated at I, the master station stops the accumulator count up. This point is labeled D in FIGURE 3E. The master station also causes transmission of the higher tone (see FIGURE 3F following error bits).

When the engineer releases ABA or IBA brake pushbutton at point B (FIGURE 3D), wait period EF of the accumulator is ended and the accumulator starts countdown at the point labeled G in FIGURE 3E. The accumulator count-down GH is just as long as the accumulator count-up CD.

When the accumulator has finished counting down as indicated at point H of FIGURE 3E, the master station ceases sending the higher tone as indicated by point J in FIGURE 3F.

Thus the air pressure is lowered as a function of time at the master station during the interval AB in FIGURE 3D. Similarly as a result of transmission of the higher tone by the master station during the period indicated IJ in FIGURE 3F and reception thereof by the remote station, the air pressure is lowered as a function of time during the period IJ of FIGURE 3F. It can be demonstrated that these two periods of time are of the same length as follows: $AB=CD+EF=EF+GH=IJ$. The lowering of air pressure at the remote station is, at most, 700 ms. later than the release at the main station and may be sooner. This provides faster response than direct response through the air line.

*Modifications for cooperation with the invention*

Other modifications which are useful with the novel system of the invention are briefly described hereat. First, due to the remote location of slave locomotives, it is desirable to enable the engineer at the lead locomotive to reset the ground relay, which operates to prevent an arc over between the generator and its frame, and disconnects the generator. Accordingly, at the remote "consist" an auxiliary circuit to the ground relay of each locomotive through a rectifier (provided to prevent feedback) is connected to a train line conductor GRR which connects each locomotive to the radio car, whereby a reset signal from the radio car can reset each ground relay.

In a further modification, push-button air brake controls and certain cooperating auxiliary pneumatic equipment are installed in the lead locomotive. The push-button controls via the auxiliary pneumatic equipment control the air brakes of the master station "consists," and give commands to the supervisory control system for controlling the air brakes of the remote station consists. Similar equipment installed in the radio car converts electrical commands by the supervisory control system to air brake operation. Relays take the place of push-buttons. The brake equipment installed in the radio car cause the radio car to operate as a locomotive in this respect.

Other modifications include installation of directional sand control piping in the radio car; providing a train line connector between the radio car and the adjoining locomotive; connecting a power cable between the radio car and the adjoining locomotive; installation of relays (interlocked for safety purposes in much the same way as the regular engineer's controls) in the radio car to function in place of the engineer's controls, and the provision of an air supply to the radio car from compressors in the slave engines via an auxiliary hose.

*Locomotive to system interfacing*

The system to locomotive interface must be very carefully constructed. All of the electrical circuits in a locomotive are isolated from the frame. The locomotive circuits are very noisy and contain, at times, transients ranging up to 5 kv. It is necessary to keep the system isolated galvanically from the locomotive power and control circuits.

At the slave and master stations, the system power is derived from the locomotive power. Due to the inherent noise, transients, and voltage variations in the locomotive electrical system, appropriate filtering, over-voltage protection, and power supply equipment is provided. FIGURE 22 illustrates power supply equipment generally designated 2200, one such supply being located at the master station and another such supply being located at the slave station. FIGURES 73 and 74 comprise a detailed circuit diagram of the power supply 2213 which is part of 2200.

Referring to FIGURE 22, the 72 v.±20 v. train power supply passes through power switch 2202 to a very efficient filter 2201 which effectively reduces the transients to an acceptable level. As the potential of the train power supply can vary as much as ±20 v., an over-voltage protection circuit 2215 is provided which protects the power supply 2213 and the various other control equipment to which the filtered 72 v. is distributed. Switch 2214 is used to start power supply 2213 in the correct sequence, and comprises a one direction rotatable switch, as indicated by the arrow, which is moved in sequence from OFF to START to RESET to RUN positions. This insures that power supply 2213 will start and run in the correct sequence. The power supply 2213 itself is a DC to DC converter followed by series voltage regulators which provide +12 v. DC and —12 v. DC to the station equipment. The —10 v. DC, see FIGURE 74, for the modulators and demodulators is obtained by voltage dropping diode equipment as shown. This power is completely isolated from the locomotive power by the AC coupling of the DC/DC converter.

*Mechanical packaging*

The mechanical packaging of the system is also of significance since locomotives at times are subject to transverse coupling shocks of at least 3 G, and have inherent vibrations of at least .032 inch double amplitude at approximately 14 c.p.s.

SYSTEM DESCRIPTION

A description of the system is now set forth using the block diagrams of FIGURES 4–6.

With reference to FIGURE 4, the equipment designated thereat by numeral 400 generally comprises the input equipment at the master station; the equipment in FIGURE 5 designated 500 generally comprises the registers and logic control equipment at the master station; and the equipment designated 600 in FIGURE 6 generally comprises the code generating and checking logic, and transmitting and receiving equipment at the master station.

Referring again to FIGURE 4, rectangle 401 as noted heretofore represents the normal locomotive control equipment which was set forth in more detail in FIGURE 2A and which is conventionally manually controlled by the engineer.

As shown in FIGURE 4, the regular controls 401 include pneumatic path 411 for controlling the air brakes of the air brake system 404, a pneumatic path 413 which controls the sanding control 406 which in turn controls the sander 407, electrical path 401C for controlling the dynamic brake system 408 (which gives a BC indication to the train line as shown) and an electrical path 401B, comprising a plurality of conductors for controlling the train line.

The train line 414 comprises a cable extending between the locomotives of a consist, whereby the lead locomotive controls the local slaves and the local slaves report to the lead locomotive.

Various functions controlled or conditions reported over the train line include dynamic brake and throttle operations, engine run, forward and reverse, reset of the ground control relays in the local slaves, alarms indicating no power, brake warning, wheel slip, hot engine, and low oil.

Auxiliary equipment including push-button controls for air brakes 415, switching relays 416, and pneumatic control equipment 417 enables the engineer in the lead locomotive to exercise control of the air brakes of the lead consist and of the remote slave consist by push-button control. Briefly, push-button control 415 contains the push-buttons 2B3, 2B4, 2B5, 2B11 and 2B12 shown in FIGURE 2B and described hereinabove. As operated, push-button control 415 operates relays 416 which obtain operating potential from the train line negative conductor N, as shown, and, in turn, operate pneumatic control equipment 417 which exercises control over the air brake system 404.

Isolating sensor circuits 418–422 sense the condition of the relays 416 via leads IBA . . . EBA from contacts of these relays, and report these conditions to the logic interlock entry gates 437 via the leads IBA . . . EBA.

More specifically, circuit 418 senses independent brake application (application of the locomotive air brakes) and reports the same over lead IBA; circuit 419 senses "independent brake release" and reports the same over conductor IBR; circuit 420 senses "automatic brake application" (application of the air brakes of the train other than the locomotive air brakes); circuit 421 senses the air brake release, and reports the same over conductor ABR and circuit 422 senses "emergency brake application" and reports the same over conductor EBA. Emergency brake application comprises the abrupt full application of the locomotive and train air brakes.

Leads AV, BV, CV and DV from train line 414 which provide engine speed functions are sensed by isolating sensor circuits 423–426, lead AV being a 75 r.p.m. increase in speed; BV being a 300 r.p.m. increase in speed; CV being a 150 r.p.m. increase in speed and DV being a 150 r.p.m. decrease in speed. This signal alone causes stopping of the engine. In the idle condition, i.e., 275 r.p.m., the AV, BV, CV, DV, and GF signals are absent.

The outputs of isolating sensor circuits 423–426 are fed to recorder 434 which recodes these inputs into binary weighted values of $2^0$, $2^1$ and $2^2$ which are inputs to console manual control and display 435. An additional function engine stop is generated by recorder 434 which is sent to logic interlock and entry gates 437 over lead DV.

Lead GF from train line 414 which is used with the other conditions is sensed by isolating sensor circuit 427 and the output GF (i.e., $2^3$) is sent to logic interlock and entry gates 437. Lead B and BG which are concerned with dynamic brake functions coming from train line 414 are sensed by isolating sensor circuits 428 and 429 and are sent to logic interlock and entry gates 437. Lead ER from train line 414 which is concerned with engine run is sensed by isolating sensor circuit 430 and is sent to logic interlock and entry gates 437.

Leads FO and RE from train line 414 which are concerned with train direction (forward and reverse respectively) are sensed by isolating sensor circuits 431 and 432 and are sent to logic interlock and entry gates 437. Lead BC from train line 414 is the analog voltage signal input to the A to D dynamic brake converter 433, and lead B from train line 414 is a reference voltage input to the dynamic brake A to D converter 433.

Dynamic brake A to D converter 433 converts the analog voltage input BC into eight discrete dynamic brake conditions which input leads DB1–DB8 to encoder 436. Encoder 436 encodes these inputs into three binary weighted values which are conducted over leads $2^0$, $2^1$ and $2^2$ to logic interlock and entry gates 437. Additionally another DB8 lead from 433 extends from FIGURE 4 to FIGURE 5, and thence to comparator 504 to enable comparison between this brake condition and the condition in the operate register 503.

Console manual control and display 435 has the following outputs which go to logic interlock and entry gates 437: GF, AV, BV and CV and DV which are concerned with throttle and dynamic brake functions; ISOL which is an isolation control condition; IDLE which is an idle condition; MU which is multiple unit condition control; STBY which is the console of "power-off" condition to disable the auxiliary control via the standby lead from logic interlock and entry gate 437 to relay 416; and via the program stop lead to the master station programmer (FIGURE 5). Actually the master station sends one transmission including $2^5$ to the slave and receives $2^5$ back, which from the operate register 503 (FIG. 5) to interlock circuit 437 enables final disablement. Console manual control and display 435 also includes output MS which is manual sand; ABFV which controls the air brake feed valve of the slave station; and GRR which controls resetting of the ground relay. One additional output, AR, goes to alarm control circuit 439. This is an alarm reset control.

Logic interlock and entry gates 437 are used in interlocking functions coming from console manual control and display 435 and encoder 436. Logic interlock and entry gates 437 also control the parallel data input over the twenty-two leads to transmit register 501 (FIGURE 5) under control of the entry control lead from master station programmer 512.

Referring back to the GF input to circuit 437, an input thereon results from the engineer's control 2A1 being in a throttle position. As a result thereof, lead GF (i.e. $2^3$) will carry an input to console 435 which through the MU position of switch 2B1 results in a GF(c) output from the console to circuit 437 which as inhibit 1 to encoder 436 causes the encoder to disregard the dynamic brake signals DB1–DB8.

Also as a result of the GF input from 427 to circuit 437, circuit 437 provides an interlocked input on lead GF ($\overline{B}+\overline{BG}$) to console 435 which through any one of the eight TH1–TH8 positions of switch 2B1 results in the same GF(c) output.

Referring back to encoder 436, inhibit 2 path enables the encoder to disregard the dynamic braking in the isolate or idle condition. Additionally, path $2^0$(AV), $2^1$(CV.$\overline{DV}$), and $2^2$(BV) enter and go back out over $2^0$(E), $2^1$(E) and $2^2$(E) to the transmit register 501 via circuit 437 and the parallel data path. A "Brake" path conveys certain brake information to 437 and path $2^3$GF(E) conveys certain information to the encoder relative to the throttle. Path BGA cooperates with BG as an input to 437, and path $\overline{2^5}$ incoming inhibits $2^0$(E), $2^1$(E) and $2^2$(E) output.

Transmit register 501 is used to store and hold data prior to transmission thereof to a slave station. Data is entered into this register over the previously mentioned parallel data path input from logic interlock and entry gates 437. Station address is entered into transmit register 501 by the path labeled "address" from address switch 507. Data being held in transmit register 501 is sent to comparator 504 via path labeled "compare."

Comparator 504 is an exclusive OR circuit which compares the data held in the transmit register 501, and the data held in operate register 503. The result of this comparison is sent to master station programmer 512. Furthermore signals over leads IBR, ABR and GRR from comparator 504 to 437 indicate success as a result of the completion of the corresponding control operation at the slave consist.

If a no compare condition is present, master station programmer 512 will initiate a transmit cycle. Transmitter-receiver control lead from master station programmer 512 via transceiver switchover 601 will turn on carrier at transceiver 1 (606). A signal from 512 over the lead "TIME LOOMS" will cause squelch timer 602 to start counting, and circuit 602 will send out a 100 millisecond squech tone via lead labelled "squelch" to code generating and check logic circuit 603. Data in transmit register 501 will now be shifted serially to code generating and check logic 603 via leads serial data T1 and $\overline{T1}$. Code generating and check logic circuit 603 will generate the sync 0 and sync 1 pulses and attach the six error code check bits to the end of the word. The word is sent via data modulator 604 to transceiver 1 (606) for transmission over the radio channel to the slave station.

Reply from the slave station over the antenna 1A9 will enter transceiver 1 designated 606; pass through data demodulator 605; and enter code generating and check logic 603. Code generating and check logic 603 will shift data serially to receive register 502 and check that the data received is error-free. When receive register 502 is filled, a signal on the lead labeled "receive register full" will indicate to error code and shift pulse circuit 603 that a word has been received. A signal over the "shift control" lead to receive register 502 stops the shifting.

The station address of the new word is checked by path labeled "address" through address switch 507. The address switch 507 output lead labeled "address check" goes to master station programmer 512 where the incoming address is checked. If both address and code check are good, data is shifted from receive register 502 to operate register 503 via the path labeled "parallel shift."

Newly received data in operate register 503 is now sent to comparator 504 via the compare path for comparison with the data presently in transmit register 501. The data in operate register 503, which is to be displayed on console 435, is sent to lamp drivers 438 via path labeled "displays." Output of lamp drivers 438 will then light indicated lamps on console 435. Any alarm data contained in operate register 503 will be sent to alarm control circuit 439 over the path labeled "alarms." An output signal by alarm control circuit 439 will ring alarm bell 440.

Brake accumulator 505 is used in conjunction with an independent brake application or an automatic brake application. It is used to record the length of time that the independent brake application button or the air brake application button is pushed and held. This is accomplished over the leads up, down, reset, and count 1.

Radio timer 506 is used to indicate conditions of continuity and no continuity via lead "continuity" to the lamp driver circuit 438, and also to switch over from regular transceiver 1 to standby transceiver 2, via lead "switchover."

Reply timer 508 is used in timing the reply received from the slave station. Program register 511 is used to advise the master station programmer 512 as to the successive functions to be performed. Clock time divide counter circuit 510, the output leads "allotter," "200 milliseconds," and "100 milliseconds" are used in timing functions for a transmission by the master station programmer 512. Other outputs of the clock time divider circuit 510 comprise various frequencies used throughout the control logic of the master station. In addition, master station programmer via lead "clear register" causes the transmit register to clear its shift register, and the error code and shift pulse circuit 603 over leads "start transmitting," "reset shift control," and "keep tone one."

Error code and shift pulse circuit 603 signals master station programmer circuit 512 over leads "message received," "transmission complete" and "start transmission received" and signals transient register circuit 501 over leads "clock control," and "shift control." Transient register circuit 501 signals circuit 603 over lead "transmit register empty."

The master station programmer 512 cooperates with the squelch timer over conductors "input busy," "reset input FF," "time 100 MS," and "reset," and the error code and shift pulse circuit 603 cooperates with the squech timer via leads "input, $\overline{input}$," "reset input FF," "squelch," and "reset."

The block diagrams of the master station (FIGS. 4–6) and slave station (FIGS. 7–9) are very similar. The functions of the various blocks within the block diagrams are also of a similar nature, and it is only necessary to describe the basic differences between the slave station and the master station.

With reference to FIGURE 7, the equipment 700 there shown generally comprises input equipment at the slave station. In FIGURE 8, the equipment designated 800 generally comprises registers and logic control equipment at the slave station, and the equipment in FIGURE 9 designated 900 generally comprises code generating and checking logic circuitry and transmitting and receiving equipment at the slave station.

Information received by antenna 1A11 (FIGURE 9) over the radio channel is transmitted to the receive register 802, and is transferred over the parallel shift path to the operate register 803, which via the parallel data path to the isolated relay drivers circuit 813, controls these drivers. Operate register 803 also over path TH/DB controls the up/down throttle and brake counter 814 as a result primarily of $2^0$, $2^1$, $2^2$, $2^3$(GF), $2^5$, B, BG, DV, signals transmitted over the radio channel.

Isolated relay drivers 813 via path labeled 754 and 755 drive relays in circuit 703 which in turn perform various functions, provide potentials to the train line inputs, and provide inputs to isolating sensor circuits 723–732 and 739–752. Isolated relay drivers 813 also drive relays via paths 754 and 756, which in turn activate relays in slave control braking system 716. System 716 provides signals to pneumatic control equipment 717 which in turn controls the air brake system 704, and also provide outputs to isolating sensor circuits 718–722.

Isolating sensor circuits 733–738 receive their inputs directly from the train line and include the five alarm signals comprised of brake warning, wheel slip, hot engine, low oil and no power. The isolating sensor circuits provide inputs to logic interlock and entry gates 737 as shown. These inputs are the same as previously described with the exceptions that the lead designated LS3 from isolating sensor circuit 739 is activated when a forward air flow is detected in the slave air line; the leads designated ISO1 and ISO2 from isolating sensor circuits 741 and 742 are activated to put the slave engines in an isolated condition, and the leads designated DB8 through DB1 from isolating sensing circuits 745–752 are the eight varying degrees of dynamic braking.

Comparator 804 of the slave station differs from the comparator of the master station in the addition of the lead designated "forced no compare." This lead is activated upon receipt of a word from the master station, and causes the slave station programmer to initiate a transmit cycle, and send a reply back to the master station.

The up/down throttle and brake counter 814 receives inputs from operate register 803 via lead designated TH/DB as before described. Counter 814 causes throttle and dynamic brake conditions to be changed at a 3-second per step rate, and is also used to step the slave station locomotives down to an idle position during the loss of radio continuity condition if lead designated LS3 from logic interlock and entry gates 737 is activated.

Various outputs from up/down throttle and brake counter 814 are sent to isolated relay drivers 813 over path designated TH/DB.

Operate register 803 as a result of information received over the radio channel also sends outputs to isolated relay drivers 813 over path labeled "parallel data." Isolated relay drivers 813 supply power to drive relays 703 and 715 as previously described.

Lead designated 753 from train line to isolated relay drivers 813 is "battery negative potential."

The remaining blocks of the slave station block diagram in general perform functions similar to those already described for the master station.

DETAILED DESCRIPTION

As an aid to an understanding of the following detailed description, a chart of the flip-flops including location and output is first set forth.

| Circuit | Flip-Flop Outputs | Figures |
|---|---|---|
| Alarm Control | A and Ā | 27 |
| Brake Accumulator | B and B̄ | 34 |
| Error Code & Shift Pulse | C and C̄ | 43-44, 61-62 |
| Radio Timer | D and D̄ | 36, 55 |
| Encoder | E and Ē | 19 |
| Reply Timer | F and F̄ | 35 |
| Clock Time Divide | G and Ḡ | 36, 55 |
| Transceiver Switch-Over | H and H̄ | 36, 55 |
| Isolated Relay Drivers | I and Ī | 47 |
| Slave Station Programmer | K and K̄ | 57, 60 |
| Logic Interlock and Entry Gates | L and L̄ | 24-25, 45-46 |
| Master Station Programmer | M and M̄ | 38-41 |
| Operate Register | O and Ō | 30, 53 |
| Program Register | P and P̄ | 37, 56 |
| Receive Register | R and R̄ | 29, 52 |
| Squelch Timer | S and S̄ | 42 |
| Transmit Register | T and T̄ | 28, 51 |
| Up/Down Throttle & Brake Counter | U and Ū | 48-50 |

The following abbreviated descriptions are used for certain of the flip-flops to minimize the description:

| Name Tag | Meaning | Flip-Flops | Figures |
|---|---|---|---|
| ALLOTTER | Allotter | 3,601, 5,501 | 36, 55 |
| BRAKE-BY-PASS | Brake-by-Pass | 4,093 | 40 |
| EA UP | Enable Accumulator Counter Up | 4,096 | 40 |
| ERT | Enable Reply Timer | 4,091 | 40 |
| IB | Input Busy | 4,201 | 42 |
| MRS | Power on Reset | 4,124 | 41 |
| RAC | Reset Accumulator Counter | 4,092 | 40 |
| RC&C | Reset Counters & Continuity | 3,802 | 38 |
| REPLY | Reply | 5,913 | 59 |
| RRR | Reset Receive Register | 3,930, 6,022 | 39, 60 |
| RRT | Reset Reply Timer | 4,094 | 40 |
| RSC | Reset Shift Control | 3,931, 5,723 | 39, 57 |
| RTR | Reset Transmit Register | 3,801, 5,809 | 38, 58 |
| SAITR | Set Address Into Transmit Register | 4,095, 5,721 | 40, 57 |
| STR | Set Transmit Register | 4,120, 5,725 | 41, 57 |
| TOC | Turn On Carrier | 4,090, 5,727 | 40, 57 |

Power on at master station

After the train has been assembled with lead and slave consists, power is turned on at the master station and the slave station.

More specifically, referring to FIGURE 2B, at the time of turning power on, lever 2B2 would be in the isolate (ISO) position. Referring to FIGURE 22, switches 2202 and 2214 would be turned on and +12 v. −12 v. and filtered 72 v. are distributed to all required points of the control equipment.

Slave station power supply equipment is like that of the master station, and the corresponding switches at the slave station would also be turned on to supply power to the slave equipment.

As power is turned on "clock time divide circuit" (FIGURE 36) is energized, and the 9.6 kc. crystal controlled oscillator will now be supplying pulses to amplifier 3605 which, in turn, supplies 9.6 kc. pulses to all points in the master station labeled 9.6 kc., and feeds divider circuit 3606 which divides this frequency by two, resulting in 4.8 kc. pulses which gate amplifier 3607 which is also fed by 9.6 kc. output from amplifier 3605. Amplifier 3607 supplies pulses to all points labeled 4.8 kc. and feeds circuit 3608 which divides this frequency by two, resulting in 2.4 kc. pulses for gating amplifier 3609 which is fed by 9.6 kc. Amplifier 3609 supplies pulses to all points labeled 2.4 kc. and feeds circuit 3610, which divides this frequency by four, resulting in 600 c.p.s. for gating amplifier 3611 which is fed by 9.6 kc. Amplifier 3611 supplies pulses to all points labeled 600 c.p.s., and also feeds inverter 3612 which supplies pulses to all points labeled 600 c.p.s. Amplifier 3611 also feeds circuit 3613, a 30-count shift register, which divides this frequency by 30, resulting in 20 c.p.s. which gates amplifier 3614 fed by 9.6 kc.

Amplifier 3614 supplies pulses to all points labeled 20 c.p.s. (1) and feeds inverter 3615 which supplies pulses to all points labeled 20 c.p.s. (1). Amplifier 3614 also gates amplifier 3616 fed by 9.6 kc. Amplifier 3616 supplies pulses to all points labeled 20 c.p.s. (2) and provides an input to the "C" terminal of flip-flops 3604, 3603 and 3602. All of the above mentioned frequencies are available wherever needed throughout the master station as indicated in FIGURE 36.

In the master station programmer (FIGURES 38-41), when power is initially turned on capacitor 4123 (FIGURE 41) is found discharged holding the input to inverter 4116 at a logic 1, with the output of inverter 4116 accordingly being logic 0. Each time 20 c.p.s. (1) goes to a logic 1 level, the output of inverter 4114 goes to a logic 0 level. NOR circuit 4117 now having two logic 0 inputs will supply a logic 1 to the set side of flip-flop 4124.

When 20 c.p.s. (2) goes to the logic 1 level simultaneously with the logic 1 input to 4124 from 4117, flip-flop 4124 will be set. The logic 1 output of 4124 is fed to amplifier 4125 whose logic 1 output is "power-on reset" designated MRS which resets various elements of the master station having MRS inputs.

After condenser 4123 has charged to +12 v. (i.e., logic 0) in the order of 10 ms., logic 0 input to inverter 4116 results in logic 1 output therefrom to NOR gate 4117 whereby gate 4117 gives out a logic 0 as an input to NOR gate 4115. Thereafter each time 20 c.p.s. (1) goes to logic 1, inverter 4114 gives out logic 0 to NOR gate 4115 which gives out logic 1 to the reset R terminal of flip-flop 4124. When 20 c.p.s. (2) goes to the logic 1 level simultaneously with the logic 1 input to 4124 from 4115, flip-flop 4124 will be reset to effect the resets now described.

The isolate flip-flops 3015 and 3016 (FIGURE 30) will be set to the logic 1 condition. This insures that the system will be in an isolated condition immediately following power turn on.

Flip-flop 3638 (FIG. 36) will be set to a logic 1 condition, and flip-flop 3650 will be set to a logic 0 condition. Such condition insures that the primary transceiver (i.e., transceiver 1) will be used for the first transmission. Circuits 3631 and 3634 will reset via amplifier 3637. Flip-flop 4121 (FIG. 41), flip-flops 4090, 4091 and 4096 (FIG. 40), and flip-flops 3930 and 3931 (FIG. 39) will all reset to the logic 0 condition.

Flip-flops 3801 (FIG. 38) will be reset to the logic 0 condition, and flip-flops 4201, 4203, and 4206–4211 (FIG. 42) and flip-flops 3701–3705 (FIG. 37) will be reset to the logic 0 condition. The resetting of these last five flip-flops insures that master station programmer 512 will begin its program at address 0.

*Power on at slave station*

With power on, the clock time divide circuit (FIG. 55) at the slave station will send out frequencies to the points indicated in FIG. 55 in the same manner as the divide circuit at the master station described above.

Figure 60:
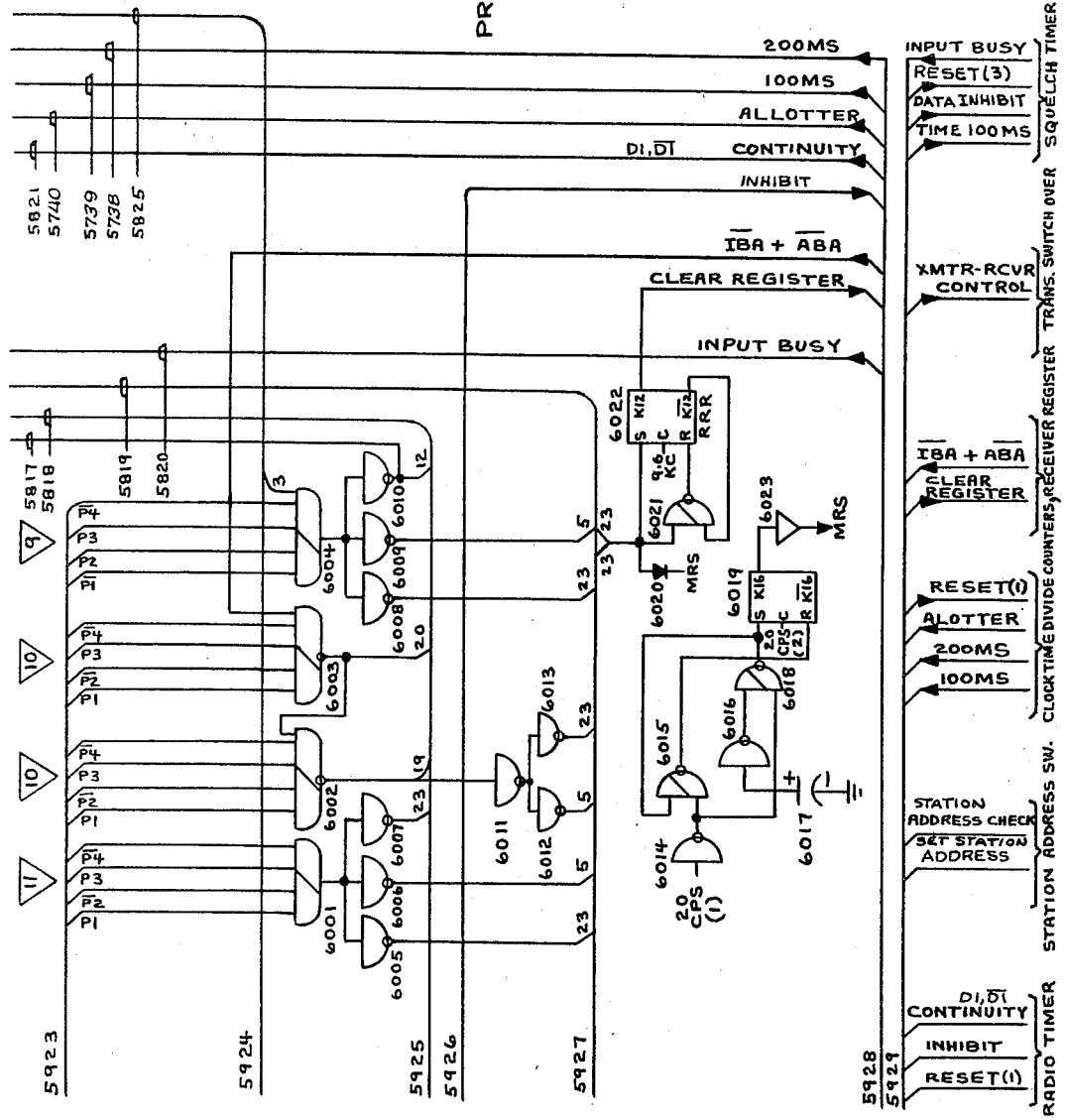

Referring now to FIGURE 60, slave station programmer, capacitor 6017 will result in the setting of flip-flop 6019 in the manner described for the master station, and flip-flop 6019 will be reset in a similar manner.

The logic 1 output of flip-flop 6019 is sent to amplifier 6023 and its logic 1 output is labeled MRS (power-on reset) which resets various elements of the slave system as now described. Flip-flop 5539 (FIG. 55) is set to the logic 1 condition, and flip-flops 5550A and 5550 (FIG. 55) would both be reset to a logic 0 condition to insure that the primary transceiver will be used for the first transmission. The flip-flops in the squelch timer (FIG. 42) will be reset the same as previously described for the master station.

Flip-flops 5315 and 5316 (FIG. 53) will be set to the logic 1 condition, to insure that the slave station will be in the isolate condition after initial power turn on.

Flip-flop 4908 (FIG. 49) will be set to the logic 1 condition and flip-flop 5809 (FIG. 58) will be reset to the logic 0 condition.

Figure 57:
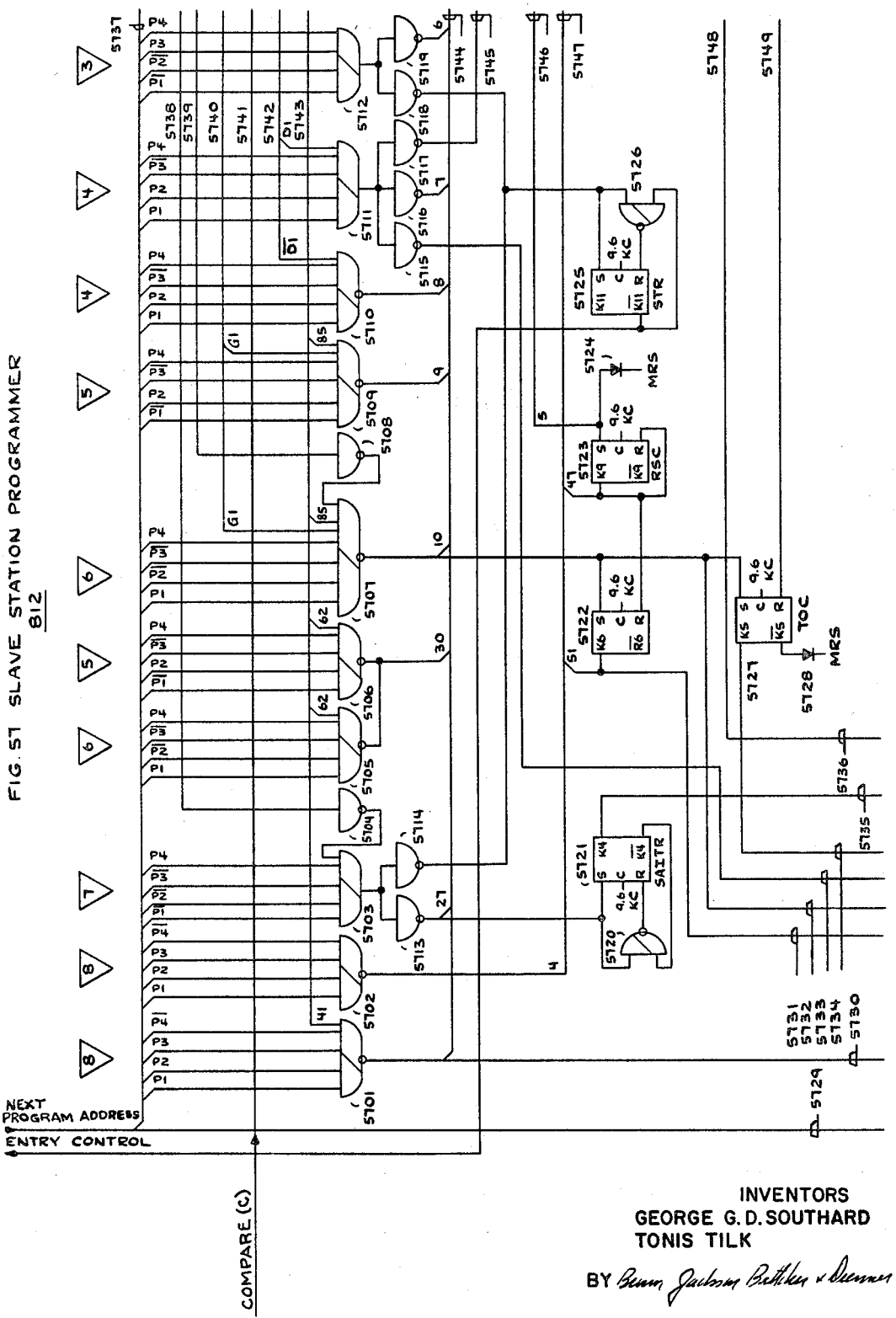

Referring to FIGURE 57, flip-flop 5727 will be reset to the logic 0 condition, and flip-flop 5723 will be set to the logic 1 condition as long as MRS through 5724 is at a logic 1 level, the logic 1 output of flip-flop 5723 goes out on path 47 to lead 5747 and the lead designated "reset shift control" (FIG. 61).

This logic 1 level is amplified by amplifier 6149 which in turn resets flip-flops 6101–6109. This signal also goes over lead 6150 to reset flip-flops 6211, 6213, 6215, 6216, 6217, 6222, and 6223–6226.

Referring back to FIGURE 57, when the MRS signal to diode 5724 returns to logic 0 level, flip-flop 5723 will be reset by the wrap-around lead from K9 to reset. Flip-flop 5913 (FIG. 59) will be reset to the logic 0 condition.

The MRS logic 1 level will pass through diode 6020 (FIG. 60) to the set input of flip-flop 6022. This will cause flip-flop 6022 to be set to the logic 1 condition at the next 9.6 kc. clock pulse.

The logic 1 output of flip-flop 6022 goes via the "clear register" lead (FIG. 52) through amplifier 5243 to reset flip-flops 5200–5238 to set flip-flop 5238A. Flip-flop 5238A is a mark flip-flop used to signal the code generating and check circuit 903 that the receive register is full.

When the MRS signal returns to logic 0 level, as noted above, the output of NOR gate 6021 (FIG. 60) will go to logic 1 level resetting flip-flop 6022, and flip-flop 5601–5604 (FIG. 56) will be reset to a logic 0 condition. The resetting of these flip-flops insures that slave station programmer 812 will start out in program address 0.

The time constant of capacitor 6017 (FIG. 60) and the input resistance of inverter 6016 is of a sufficient value to enable flip-flop 6019 to be set for a sufficient period of time to enable power-on reset of all required functions as thus described.

REGULAR 30-SECOND COMMUNICATION

*Transmission by master station*

The procedure normally followed by the train engineer after power-on would include moving lever 2B2 (FIG. 2B) to MU position; switch 2A10 (FIG. 2A) to forward position; setting lever 2A2 to change position, and rotating handle 2A11 to a throttle control condition. Lever 2A2 would then be moved to the various throttle positions depending upon the amount of power desired by the train engineer.

For exemplary purposes, it is assumed that the engineer has moved lever 2A2 to the throttle 8 position, and that the train is traveling along the track under normal operating conditions. It is further assumed that there have been no changes in control conditions initiated by the master station, and no reporting of alarms initiated by the remote station for a period of several minutes. In such operation, transmissions between the master station and the remote station have occurred at a regular 30 second intervals, and one of these transmissions comprising a master transmission and a slave reply will now be described.

The operation is best set forth in the Master Station Logic Flow Chart (FIGS. 63, 64). It should first be noted that each of the blocks within the flow chart has an address identification number, such as A15, A2, A17, etc., which numbers correspond directly to the numbers shown within the various triangle in FIGURES 38–41. These are the actual program addresses which the master station programmer 512 may be acting upon at any given instant, and are generated by program register 511.

Under the conditions just described, the master station programmer would be in the small loop A0, A3, A21, A22, A23, A0, A3, A21, etc. Initial entry to this loop is the result of block labeled "power on reset start" which was previously described as having placed program register 511 in address 0 or 1 condition.

*Address 0*

Figure 39:
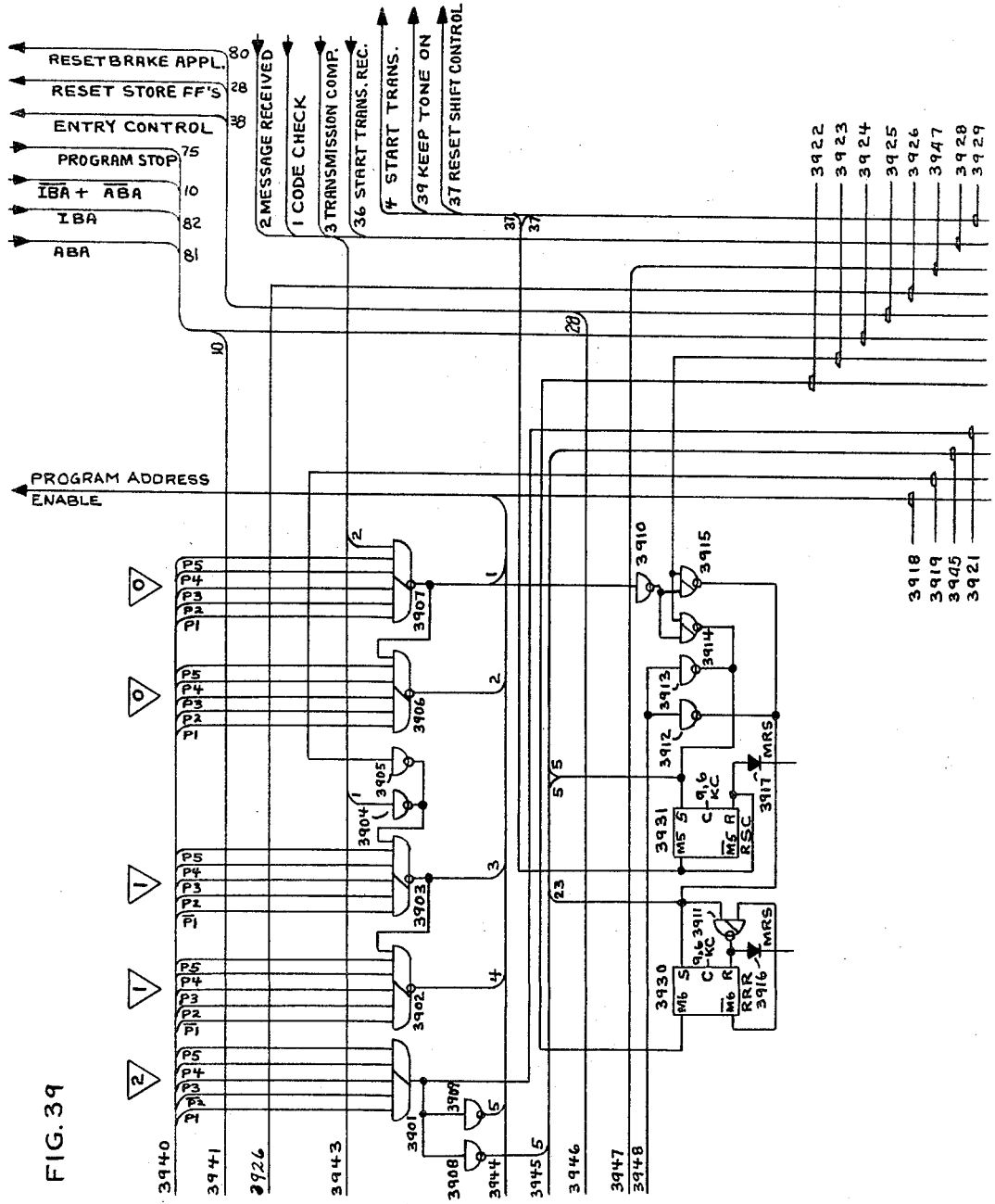

Referring now to FIGURE 39, leads labeled "P1–P5" going to NOR gates 3906 and 3907 would all be at logic 0 conditions as flip-flops 3701–3705 of FIGURE 37 are all in the reset condition, determining address 0.

It should be observed that flip-flops 3701–3705 are binary weighted $2^0$–$2^4$. Thus address 0, as stated, is determined by 3701–3705 all being reset giving 0's from the P1 side thereof to gates 3906 and 3907 (FIG. 39).

Digressing, address 1 would be represented by 3701 being set and 3702–3705 being reset, whereby 3701 gives out a "0" from the $\overline{P1}$ terminal thereof and gates 3702–3705 give out 0's from the P2, P3, P4, and P5 sides thereof to gates 3902 and 3903 in FIGURE 39. Similarly flip-flop 3702 would be set to represent address "2"; flip-flops 3701 and 3702 would be set to represent address "3"; etc. At this time, it is assumed that the equipment is in address 0.

Since no new word has been received, the conductor 2 labeled "message received" in FIGURE 39 will be at a logic 0 level, and the output of NOR gate 3907 is a logic 1. This output, in turn, keeps the output of NOR gate 3906 at a logic 0. The logic 1 output of NOR gate 3907 goes to inverter 3910 which places a logic 0 on inputs to NOR gates 3914 and 3915.

As the input is idle at this time, lead 3923 which is the "input busy" lead will also be at a logic 0 level. This causes the output of NOR gates 3914 to be a logic 1 resulting in the setting of flip-flop 3931 with the next clock pulse. The logic 1 output of 3931 resets code generating and check logic circuit 603 via conductor 37 in the cable labeled "reset shift control."

The output of NOR gate 3915 will also be a logic 1 at this time and results in the setting of flip-flop 3930 with this same next clock pulse. The logic 1 output of flip-flop 3930 on lead 3922 which is the "clear register" lead goes to receive register 502 (FIG. 29) and resets it.

The logic 1 output of NOR gate 3907 also goes to FIGURE 37 via conductor 1 in the cable labeled "program address enable" to NOR gates 3708 and 3712 causing the outputs of these gates to be at the logic 0 level. The logic 0 output of NOR gate 3708 is fed to inverter 3709 causing its output to be logic 1, resulting in the setting of flip-flop 3701 with the next clock pulse. The logic 0 level of NOR gate 3712 is fed to inverter 3713 causing its output to be logic 1, resulting in the setting of flip-flop 3702 on the same clock pulse which set flip-flop 3701.

*Address 3*

The setting of flip-flops 3701 and 3702 determine the next program address of A3 which reads "operate register equals transmit register, and thirty second timing equals zero."

Since leads labeled "p1" and "P2" going to NOR gates 3906 and 3907 are now logic 1 level, the outputs of these two NOR gates will now be logic 0 levels. This forces the output of inverter 3910 to a logic 1 level in turn forcing the outputs of NOR gate 3914 and 3915 to logic 0 levels. As a result of this, at the next clock pulse, flip-flops 3930 and 3931 will be reset to the logic 0 condition.

The leads labeled P1, P2, P3, P4 and P5 going to NOR gates 3812 and 3813 (FIG. 38) will now all be at the logic 0 level because of the setting of flip-flops 3702 and 3701 in program register S11 (FIG. 37). Referring now to FIGURE 31, the 28 inputs to NOR gate 3137 will all be at logic 0 levels as the operate register (FIG. 30) equals the transmit register (i.e., the contents of the operate register in the same as the contents of the transmit registers). The output of NOR gate 3137 will be a logic 1 and goes to master station programmer 512 via lead labelled "compare (C)," and specifically to inverter 3814 (FIG. 38) whose output will now be a logic 0.

Lead 3929, which is the "30 second" lead from the radio timer, will also be at a logic 0 level at this time as 30 seconds has not elapsed since the last receipt of a word from the slave station.

With all inputs at a logic 0 level, NOR gate 3813 will have a logic 1 output which holds the output of NOR gate 3812 at a logic 0 level. The logic 1 output of NOR gate 3813 goes over the "program address enable" path to cause the output of NOR gate 3710 to be a logic 0 forcing the output of inverter 3711 to be a logic 1, resulting in reset of flip-flop 3702 at the next clock pulse. The logic 1 output of NOR gate 3813 also causes the outputs of NOR gates 3717 and 3727 to be logic 0's and the outputs of inverters 3718 and 3728 to be logic 1's, resulting in the setting of flip-flops 3703 and 3705 and this same clock pulse.

*Address 21*

Thus, after this next clock pulse, flip-flops 3701, 3703, and 3705 will be found set and flip-flops 3702 and 3704 will be found reset resulting in the next program address of A21 (reset transmit register—FIG. 63).

With reference to the master station programmer 512 (FIG. 38) the leads labelled "P1, P2, P3, and P5" input to OR gate 3806 will all be at logic 0 levels causing the output of gate 3806 to be a logic 0 which in turn cause the outputs of inverters 3813 and 3819 to be logic 1's. The logic 1 output of inverter 3818 results in the setting of flip-flop 3801 at the next clock pulse. The M1 output of flip-flop 3801 will be logic 1 which over the lead (XMIT) clear register, resets transmit register 501.

The logic 1 output of inverter 3819 goes to FIGURE 37 over lead 26 in the cable labelled "program address enable." The logic 1 output of inverter 3819 causes the output of NOR gate 3706 to be a logic 0 which causes the output of inverter 3707 to be a logic 1, resulting in the resetting of flip-flop 3701 at the next clock pulse. The logic 1 output of inverter 3819 also causes the output of NOR gate 3712 to be a logic 0 and the output of inverter 3713 to be a logic 1, resulting in the setting of flip-flop 3702 at the next clock pulse.

*Address 22*

Thus after this next clock pulse, flip-flops 3702, 3703, and 3705 will be found set and flip-flops 3701 and 3704 will be found reset, resulting in the next address of A22 (gate input to load transmit register).

Referring again to the master station programmer 512 (FIG. 38) the four inputs to OR circuit 3804 will all be at a logic 0 level forcing the output of 3804 to be a logic 0 feeding the inputs of inverters 3816 and 3817 causing the outputs thereof to be at logic 1.

Figure 41:
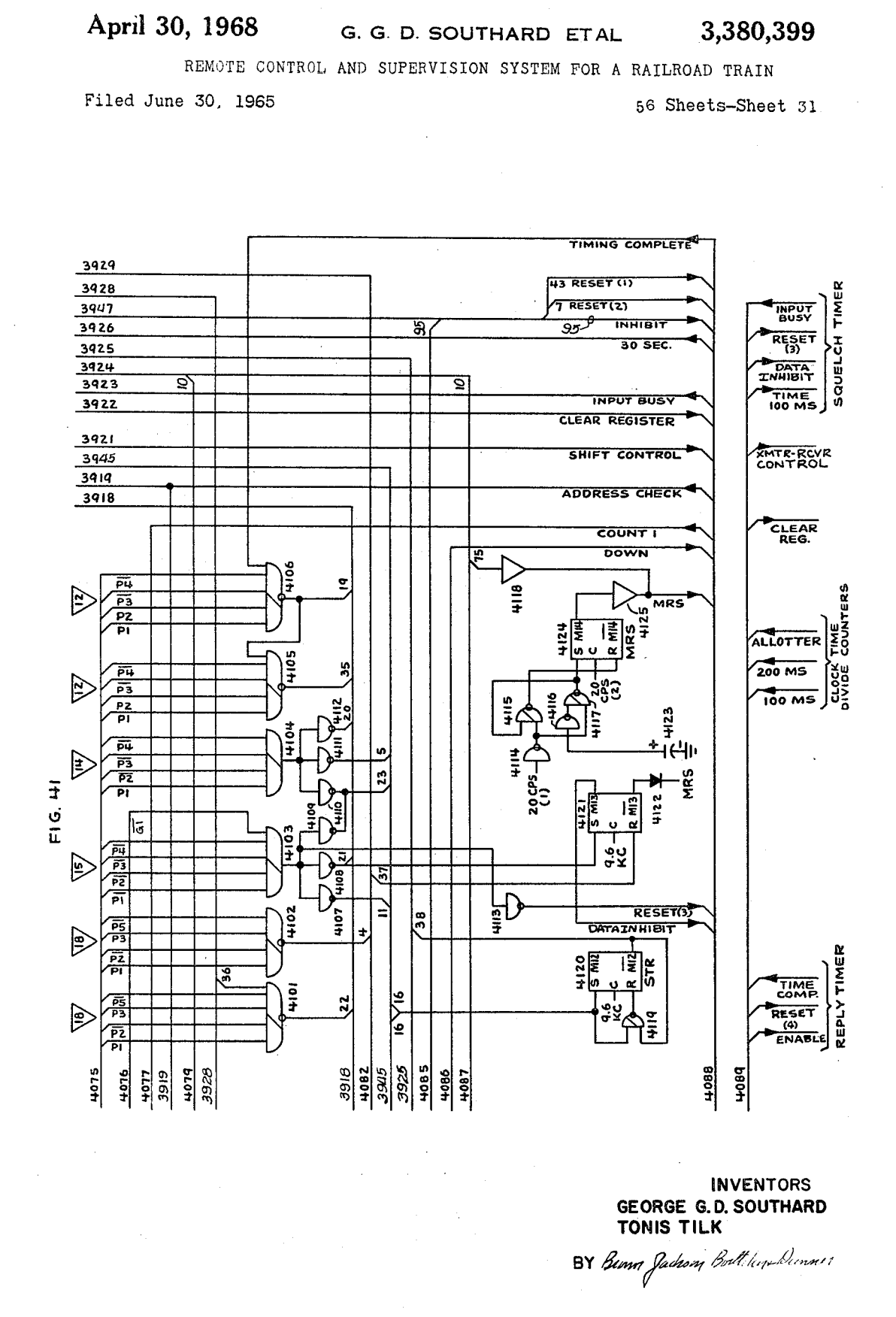

The logic 1 output of inverter 3816 over conductor 16 via cable 3945 through FIGURE 39 into FIGURE 41 results in the setting of flip-flop 4120 at the next clock pulse. The setting of flip-flop 4120 results in logic 0 output to lead 38 which via cable 3925 and the conductor "entry control" to logic interlock and entry gates 437 (FIGS. 24, 25) enables entry control therein.

The logic 0 level on this input lead labelled "entry control" enables all of the NOR gates feeding the "parallel entry" path. This results in the latest status of all control conditions being loaded into the transmit register 501 of FIGURE 28.

Referring back again to the master station programmer 512 (FIG. 38), the logic 1 output of inverter 3817 goes via lead 29 in the cable labelled "program address enable," causing NOR gate 3708 to have a logic 0 output which in turn causes inverter 3709 to have a logic 1 output, resulting in the setting of flip-flop 3701 at the next clock pulse.

*Address A23*

After this next clock pulse, flip-flops 3701, 3702, 3703 and 3705 will all be found set resulting in the next program address of A23 (FIG. 63—reset momentary store flip-flop).

Referring to the master station programmer 512 (FIG. 38), the four inputs to NOR gate 3803 will all be at a logic 0 level resulting in an output of a logic 1. The logic 1 output of NOR gate 3803 is fed to inverter 3815 whose output is now a logic 0 to interlock and entry gates 437 (FIGS. 24–25) via lead 38 labelled "reset store flip-flops." This results in the resetting of momentary store flip-flops 2431, 2439, and 2448 on the next clock pulse if they had previously been set.

The logic 1 output of NOR gate 3803 also goes to FIGURE 37 via lead 30 in the cable labelled "program address enable," causing the output of NOR gates 3706, 3710, 3715, 3720 and 3725 to be a logic 0. These outputs in turn cause the outputs of inverters 3707, 3711, 3716, 3721, and 3726 to be a logic 1 resulting in the resetting of flip-flops 3701–3705 on the next clock pulse.

*Address 0*

With these flip-flops in the reset condition, the system is now back at the beginning of the loop previously described and is again at address A0. Assuming now that 30 seconds has elapsed since the last receipt of a reply from the slave station the system which previously progressed via A0, A3, A21, A22, A23, now progresses over a new sequence including A0, A3, A4, etc., as will be shown. More specifically, the "thirty seconds" input lead 3926 to NOR gate 3813 labelled "30 seconds" in the master station programmer 512 (FIG. 38) will now be a logic 1 and this forces the output of NOR gate 3813 to a logic 0 level.

Address 3

When program register 511 reaches address 3 (operate register equals transmit register and thirty second timing equals zero), the other five inputs to NOR gate 3812 will also be at a logic 0 level resulting in a logic 1 level out of NOR gate 3812. The logic 1 output of NOR gate 3812 goes to FIGURE 37 via lead 7 in cable labelled "program address enable." This causes flip-flops 3701 and 3702 to reset and flip-flop 3703 to set at the next clock pulse, making the next program address A4 (reset reply timer receive register tone squelch control and inhibit data).

Address 4

At the master station programmer 512 (FIG. 38) the five inputs to OR gate 3811 will now be at a logic 0 level, making the outputs of inverters 3822, 3833 and 3834 logic 1. Logic 1 output of inverter 3834 will set flip-flop 4094 of FIGURE 40 via lead 11, via cable 3945 at the next clock pulse.

The M9 logic 1 output of flip-flop 4094 goes to FIGURE 35 via lead labelled "reset (4)," goes to amplifier 3528 (FIG. 35) and as amplified results in the resetting of flip-flops 3501-3506, thus resetting the reply timer.

Figure 40:
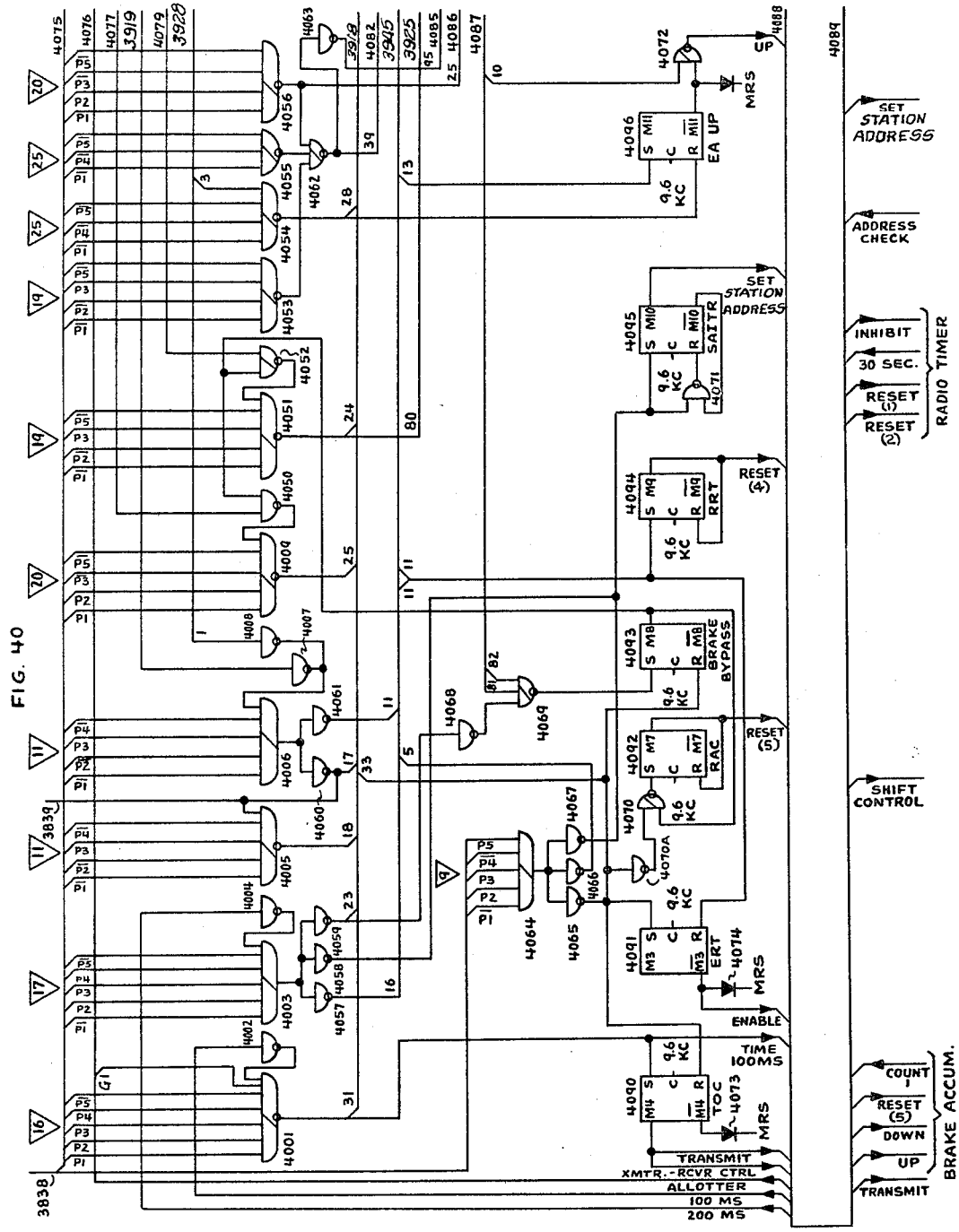

The logic 1 output of inverter 3833 goes to NOR gate 3836 resulting in a logic 0 output to force inverter 3837 to a logic 1 output which via lead 13 in cable 3945 will set flip-flop 4096 of FIGURE 40 at the next clock pulse. The $\overline{M11}$ logic 0 output of flip-flop 4096 goes to NOR gate 4072.

If the other input to NOR gate 4072 via lead 10 which is the lead labelled $\overline{IBA}+\overline{ABA}$ is a logic 0, indicating that there is a brake application, the output of NOR gate 4072 would be a logic 1 to the "up" lead enabling brake accumulator 505 of FIGURE 34 to begin counting up. In the transmission now being described there is no brake application, and lead 10 to NOR gate 4072 would therefore be a logic 1, inhibiting the output of NOR gate 4072.

The logic 1 output of inverter 3833 in FIGURE 38 also goes to NOR gate 3835 resulting in a logic 0 output which goes to inverters 3912 and 3913 via lead 3948. The logic 1 outputs of inverters 3912 and 3913 result in the setting of flip-flops 3930 and 3931 at the next clock pulse which, in turn, resets the code generating and check circuit 603 and receive register 502 (FIG. 29).

At the next clock pulse the logic 1 output of inverter 3822 will set flip-flop 3801 and the M1 logic 1 output of flip-flop 3801 will reset transmit register 501 (FIG. 28).

The logic 1 output of inverter 3833 also via conductor 8 via cable labelled "program address enable" sets flip-flops 3701, 3702 and 3704 (FIG. 37) at the next clock pulse to advance to the next program address A15 (FIG. 63) which reads reset reply time, receive register tone, squelch control and inhibit data.

Address 15

In the master station programmer 512 (FIG. 41), the four input leads to OR circuit 4103 labeled $\overline{P1}$, $\overline{P2}$, $\overline{P3}$ and $\overline{P4}$ will all be at a logic 0 level. The fifth input to OR circuit 4103 labeled $\overline{G1}$ is the allotter $\overline{G1}$ signal which comes from clock time divide circuit 510 (FIG. 36) via the allotter cable. As there shown, the output of gated clock amplifier 3616 which is 20 c.p.s. (2) is the clocking input to the allotter chain composed of flip-flops 3602, 3603 and 3604, which comprises a seven-count shift register.

At a count of 011, NOR gate 3623 will go to a logic 1 output gating on gated clock amplifier 3622. The clock output of 3622 occurs every 350 milliseconds causing the allotter flip-flop 3601 to cycle once every 700 milliseconds. With the elapse of 100 milliseconds after the clock pulse to the allotter flip-flop 3601, NOR gate 3620 will be a logic 1, and 200 milliseconds after the clock pulse to the allotter flip-flop, NOR gate 3621 will be a logic 1. These two outputs are labeled "100 milliseconds" and "200 milliseconds" respectively.

Referring again to the master station programmer (FIG. 41), the lead labeled $\overline{G1}$ will be a logic 0 when the allotter flip-flop 3601 is set. At this time, the output of OR gate 4103 which is a logic 0, causes the output of inverter 4107 to be a logic 1 which in turn, via path 11 causes flip-flop 4094 (FIG. 40) to be set at the next clock pulse. The M9 logic 1 output of flip-flop 4094 via reset path 4 resets reply timer 508 (FIG. 35).

The logic 0 output of OR circuit 4103 will cause the output of inverter 4109 to be a logic 1 which via path 23 will set flip-flop 3930 (FIG. 39) at the next clock pulse. The M6 logic 1 output of flip-flop 3930, via clear register path, will reset receive register 502 (FIG. 29).

The logic 0 output of OR circuit 4103 also causes inverter 4113 to have a logic 1 output which over reset lead 3 resets squelch timer 602 (FIG. 42), by operating flip-flop 4205 which provides a logic 1 input to a non-inverting power amplifier 4227 which jam resets the counter to the all zero state. The logic 1 on lead "reset 3" will be removed at the shift to the next address whereby flip-flop 4205 will be reset by the next clock pulse. The logic 0 output of OR circuit 4103 also causes the output of inverter 4108 to be a logic 1 which in turn sets flip-flop 4121 at the next clock pulse. The logic 1 output of flip-flop 4121 via the data inhibit lead goes to squelch timer 602 (FIG. 42).

With reference to the squelch timer circuit 602 (FIG. 42) the logic 1 output of flip-flop 4121 passes through OR gate 4213, and via data inhibit lead goes to error code and shift pulse circuit 603 (FIG. 44).

With reference to circuit 603 (FIG. 44), the logic 1 input on the "data inhibit" lead goes to the base input of NOR circuit 4405 holding its output at a logic 0. As this system uses DTL logic all inputs which go straight into a gate pass through a diode before reaching the base of the transistor. In this specific instance where the "data inhibit" lead enters NOR gate 4405 from the side, the signal does not go through a diode before reaching the base of the transistor. This avoids having two diodes in series and thus eliminating any excessive voltage drop which might result. The output of inverter 4406 will now be a logic 1 which causes flip-flop 4410 to be reset at the next clock pulse. Any incoming data from data demodulator and filter is now inhibited from entering the flip-flop 4410.

In the master station programmer 512 (FIG. 41) the logic 1 output of inverter 4108 also goes to program register 511 (FIG. 37) via lead 21 in the program address enable cable to reset flip-flops 3701-3704 and set flip-flop 3705 at the next clock pulse. This results in the next program address A16 (Is allotter flip-flop reset and 100 ms.=1) being sent to master station programmer 512 via the "next program address" lead.

Address 16

In the master station programmer 512 (FIG. 40) input leads to NOR circuit 4001 labeled P1, P2, P3, P4 and $\overline{P5}$ will all be at a logic 0 level at this time.

Input lead labeled "G1" will be a logic 0 when allotter flip-flop 3601 resets, and lead labeled "100 milliseconds" (the input to inverter 4002) will still be at a logic 0 level holding the output of inverter 4002 at a logic 1 level. After 100 milliseconds have elapsed subsequent to the resetting of allotter flip-flop 3601, the lead labeled "100 milliseconds" will go to a logic 1 condition causing the output of inverter 4002 (FIG. 40) to be a logic 0 enabling NOR gate 4001 to have an output logic 1. This logic 1 sets flip-flop 4090 at the next clock pulse.

The M4 logic 1 output of flip-flop 4090 goes to transceiver switch-over circuit 601 (FIG. 36) the "transmitter receiver control" lead, to cause the output of NOR circuit 3652 to be a logic 0, and the output of inverter 3653 to be a logic 1. It will also cause the output of inverter 3655 to be a logic 0.

Transceiver switch-over flip-flop 3650 will still be reset at this time as radio timer circuit 506 (FIG. 36) has not reached the 99-second count. NOR circuit 3656 will now have both inputs at a logic 0 level resulting in a logic 1 output.

Radio level shifter circuits 3654 and 3657 will now both be biased "ON" causing receiver 1 to be turned off and transmitter 1 to be turned on. This results in the FM carrier being sent out over the radio channel. The $\overline{H1}$ logic 1 output of flip-flop 4090 (FIG. 40) also goes to lamp drivers 438 (FIG. 32) via the transmit lead and is amplified by current driver 3216 and sent to console 435 (FIG. 23) via the lead labelled "XMIT" and as a result of this logic 1 input on lead labelled "transmit" the light labelled "transmit" will now be lit.

Referring again to the master station programmer 512 (FIG. 40) the logic 1 output of NOR gate 4001 also goes to squelch timer 602 (FIG. 42) via the "time 100 milliseconds" lead.

With reference to the squelch timer circuit (FIG. 42) and assuming that the squelch timer has been reset, i.e., flip-flops 4201, 4203–4311 are in the reset condition, a logic 1 input on lead labelled "time 100 milliseconds" will set flip-flop 4204 at the next clock pulse. This is the same signal which sets "turn on carrier" flip-flop 4090 in the master station programmer 512 (FIG. 40). The logic 0 from the not side of flip-flop 4204, i.e., output $\overline{S4}$ is inverted by inverter 4214 and sent to error code and shift pulse circuit 603 (FIGS. 43–44) as a logic 1 via lead labelled "squelch." This logic 0 also feeds inverter 4219 and NOR gate 4217. The logic 1 output, i.e., output S4, inhibits NOR gate 4215 which is used in the detection mode.

Referring now to the error code and shift pulse circuit (FIGS. 43 and 44) the logic 1 signal on the squelch lead goes directly to the data modulator 604 (FIG. 6) via leads 4362 and 604A which results in the high tone of 2450 c.p.s. modulating the carrier and being sent out over the radio channel which is the preliminary long portion of the primary sync signal (see FIG. 3C).

Inverter 4219 in the squelch timer 602 inverts the logic 0 to give a logic 1 output to NOR gate 4220 which inhibits this gate from setting flip-flop 4205. The logic 0 output from the not side of flip-flop 4204 also goes to NOR circuit 4217. The other input to NOR circuit 4217 is $\overline{600}$ c.p.s. This causes the output of NOR circuit 4217 to pulse at a 600 c.p.s. rate (i.e., 1⅔ ms. per pulse) to the input of NOR circuit 4218, which in turn, causes the output of NOR circuit 4218 to pulse out logic 0 at this rate to drive inverter 4224, which in turn, pulses out logic 1 at this rate to gated clock amplifier 4223 which will thus put out one clock pulse each time at a 600 c.p.s. rate.

The output of clock pulse amplifier 4223 drives a 63-count shift counter composed of flip-flops 4206–4211 and NOR gates 4225 and 4226 at a rate of 1⅔ milliseconds per step. A truth table listing the possible states of the 63 count counter is now set forth, it being noted that when the counter is reset, it is in the all zero state.

TRUTH TABLE

| State→ Count ↓ | FF 4206 | FF 4207 | FF 4208 | FF 4209 | FF 4210 | FF 4211 | |
|---|---|---|---|---|---|---|---|
| 1 | 0 | 0 | 0 | 0 | 0 | 0 | |
| 2 | 1 | 0 | 0 | 0 | 0 | 0 | |
| 3 | 0 | 1 | 0 | 0 | 0 | 0 | |
| 4 | 1 | 0 | 1 | 0 | 0 | 0 | |
| 5 | 0 | 1 | 0 | 1 | 0 | 0 | |
| 6 | 1 | 0 | 1 | 0 | 1 | 0 | |
| 7 | 0 | 1 | 0 | 1 | 0 | 1 | |
| 8 | 0 | 0 | 1 | 0 | 1 | 0 | |
| 9 | 1 | 0 | 0 | 1 | 0 | 1 | |
| 10 | 1 | 1 | 0 | 0 | 1 | 0 | |
| 11 | 0 | 1 | 1 | 0 | 0 | 1 | |
| 12 | 0 | 0 | 1 | 1 | 0 | 0 | |
| 13 | 1 | 0 | 0 | 1 | 1 | 0 | |
| 14 | 0 | 1 | 0 | 0 | 1 | 1 | |
| 15 | 0 | 0 | 1 | 0 | 0 | 1 | |
| 16 | 0 | 0 | 0 | 0 | 0 | 1 | |
| 17 | 1 | 0 | 0 | 0 | 1 | 0 | |
| 18 | 0 | 1 | 0 | 0 | 0 | 1 | |
| 19 | 0 | 0 | 1 | 0 | 0 | 0 | |
| 20 | 1 | 0 | 0 | 1 | 0 | 0 | |
| 21 | 0 | 1 | 0 | 0 | 1 | 0 | |
| 22 | 1 | 0 | 1 | 0 | 0 | 1 | |
| 23 | 1 | 1 | 0 | 1 | 0 | 0 | |
| 24 | 0 | 1 | 1 | 0 | 1 | 0 | |
| 25 | 1 | 0 | 1 | 1 | 0 | 1 | |
| 26 | 1 | 1 | 0 | 1 | 1 | 0 | |
| 27 | 0 | 1 | 1 | 0 | 1 | 1 | |
| 28 | 0 | 0 | 1 | 1 | 0 | 1 | |
| 29 | 0 | 0 | 0 | 1 | 1 | 0 | |
| 30 | 1 | 0 | 0 | 0 | 1 | 1 | B |
| 31 | 1 | 1 | 0 | 0 | 0 | 1 | |
| 32 | 1 | 1 | 1 | 0 | 0 | 0 | |
| 33 | 0 | 1 | 1 | 1 | 0 | 0 | |
| 34 | 1 | 0 | 1 | 1 | 1 | 0 | |
| 35 | 0 | 1 | 0 | 1 | 1 | 1 | |
| 36 | 0 | 0 | 1 | 0 | 1 | 1 | |
| 37 | 0 | 0 | 0 | 1 | 0 | 1 | |
| 38 | 0 | 0 | 0 | 0 | 1 | 0 | |
| 39 | 1 | 0 | 0 | 0 | 0 | 1 | |
| 40 | 1 | 1 | 0 | 0 | 0 | 0 | |
| 41 | 0 | 1 | 1 | 0 | 0 | 0 | |
| 42 | 1 | 0 | 1 | 1 | 0 | 0 | |
| 43 | 0 | 1 | 0 | 1 | 1 | 0 | |
| 44 | 1 | 0 | 1 | 0 | 1 | 1 | |
| 45 | 1 | 1 | 0 | 1 | 0 | 1 | |
| 46 | 1 | 1 | 1 | 0 | 1 | 0 | |
| 47 | 0 | 1 | 1 | 1 | 0 | 1 | |
| 48 | 0 | 0 | 1 | 1 | 1 | 1 | |
| 49 | 1 | 0 | 0 | 1 | 1 | 1 | |
| 50 | 1 | 1 | 0 | 0 | 1 | 1 | |
| 51 | 1 | 1 | 1 | 0 | 0 | 1 | |
| 52 | 1 | 1 | 1 | 1 | 0 | 0 | |
| 53 | 0 | 1 | 1 | 1 | 1 | 0 | |
| 54 | 1 | 0 | 1 | 1 | 1 | 1 | |
| 55 | 1 | 1 | 0 | 1 | 1 | 1 | |
| 56 | 1 | 1 | 1 | 0 | 1 | 1 | A |
| 57 | 1 | 1 | 1 | 1 | 0 | 1 | |
| 58 | 1 | 1 | 1 | 1 | 1 | 0 | |
| 59 | 0 | 1 | 1 | 1 | 1 | 1 | |
| 60 | 0 | 0 | 1 | 1 | 1 | 1 | |
| 61 | 0 | 0 | 0 | 1 | 1 | 1 | |
| 62 | 0 | 0 | 0 | 0 | 1 | 1 | |
| 63 | 0 | 0 | 0 | 0 | 0 | 1 | |
| 1 | 0 | 0 | 0 | 0 | 0 | 0 | |

As the sixty-three count shift counter 4206–4211 reaches count 30, NOR gate 4215 decodes the count. However, gate 4215 is inhibited by the logic 1 on its input from flip-flop 4204 (S4) and thus gives no output.

At the 56th step, NOR circuit 4234 will have a logic 1 output resetting flip-flop 4204 at the next 9.6 kc. clock pulse. The resetting of flip-flop 4204 results in the termination of the 92.05 portion of the primary sync signal (i.e., the long squelch signal) which has been sent out for a period of 92.05 milliseconds, and also stops shifting of squelch timer shift register by applying a logic 1 to NOR gate 4217 to stop the 600 c.p.s. clock from enabling clock pulse amplifier 4223.

At the master station programmer 512 (FIGURE 40) the logic 1 output of NOR gate 4001 also goes via lead 31 in the cable labelled "program address enable" to program register 511 (FIGURE 37).

After transmission is complete, the squelch timer logic will become reset to the idle state by a signal over the lead "reset 6" from the error code and shift pulse circuit.

*Address 17*

In the program register 511, this logic 1 input causes flip-flop 3701 to be set at the next clock pulse resulting in the next program address of A17 (200 ms.=1) as shown in FIGURE 63.

In the master station programmer 512 (FIGURE 40), the five input leads to OR circuit 4003 labelled "$\overline{P1}$, P2, P3, P4 and $\overline{P5}$" will now all be at logic 0 levels. The input to inverter 4004 labeled "200 milliseconds" will go to a logic 1 level 200 milliseconds after the resetting of the allotter flip-flop 3601. This causes the output of inverter 4004 to be a logic 0, resulting in a logic 0 at the output of OR circuit 4003.

Inverter 4058 will now have a logic 1 output which will set flip-flop 4095 at the next clock pulse. The M10 logic 1 output of 4095 goes over the lead "set station address" to address switch 507, FIGURE 35, via cable labeled "set address," and passes through current driver to gang switch 3551 which would be set in the address 1 position for this example. The two top blanks of this switch are used for encoding relative to transmitting whereas the bottom two banks are used for decoding during reception. At the right side of FIGURE 35 it will be seen that one group of leads $2^0$, $2^1$, $2^2$, and $2^3$ go to the reply timer whereas another group of leads $2^0$, $2^1$, $2^2$, and $2^3$ go to the transmit register of FIGURE 28 and more specifically to the respective four address flip-flops 2838–2835 which being reset place +12 v. on these leads. Thus it is only necessary for the station address switch to connect ground to the ones of these leads which should set flip-flops. With the gang switch set in the station 1 address position as shown, the logic 1, i.e., OV. or ground, is connected only to the $2^0$ lead.

This logic 1 results in the setting of flip-flop 2838 (FIG. 28) indicating that the master station is in the address 1 position.

Referring to the master station and remote slave station bit information chart at this time, the bits 26, 27, 30–33 and 38 in the transmitted message would be in the logic 1 condition, 26, 27, 30–33, and 38 and the remaining bits (31) will all be a logic 0.

At the master station programmer (FIG. 40) the output of inverter 4057 will also be a logic 1 which via lead 16 in cable 3945 results in the setting of flip-flop 4120 (FIG. 41). The logic 0 output from the not side of flip-flop 4120 goes to logic interlock and entry gates 437 (FIG. 44) via lead 38 in cable 3925 labelled "entry control."

The logic 0 input on cable labelled "entry control" to logic interlock and entry gate 437 will now enable each of the NOR gates feeding the cable labelled "parallel entry." The functions AV, BV, CV, GF, ER and FO from train line 414 (FIG. 4) will be energized at this time and as a result the outputs of isolating sensor circuits 423, 424, 425, 427, 430 and 431 will be a logic 0. The logic 0 outputs of isolating sensor circuits 427, 430 and 431 go directly to logic interlock and entry gates 437 as shown in FIG. 24.

Input leads to FIG. 24 labelled FO and ER will both be a logic 0 enabling the outputs of NOR gates 2454 and 2456 to be logic 1. The lead labelled "$2^3$ GF" causes the output of inverter 2464 to be a logic 1 which goes to console manual control and display 435 (FIG. 23) via the cable labelled "$2^3$ GF."

With reference to console 435 (FIG. 23) gang switch 2B1 will be in the MU position, and the logic 1 output of inverter 2464 enters on input leads labelled "$2^3$ GF," passes through gang switch 2B1 on deck 1 and goes to logic interlock and entry gates 437 (FIG. 25) via lead labelled GF(C). The logic 1 input on lead labelled GFC passes through OR circuit 2520 causing the output of inverter 2521 to be a logic 0, and this logic 0 output of 2521 enables NOR gate 2522 to have a logic 1 output.

The logic 0 outputs of isolating sensor circuits 423, 424 and 425 go directly to recorder 1100 (FIG. 11) and the logic 0 inputs on leads labelled "AV and BV" cause the outputs of inverters 1101 and 1102 to be logic 1's. The logic 0 input on lead labelled "CV" causes the output of inverter 1103 to be a logic 1, causing the output of inverter 1104 to be a logic 0. Input lead labelled "DV" will be a logic 1 at this time, causing the output of inverter circuit 1106 to be a logic 0. NOR gate 1108 has both inputs at logic 0 levels, causing the output to be a logic 1. Output leads labelled "$2^0$, $2^1$, and $2^2$" are now all at the logic 1 level and go directly to console manual control and display 435 (FIG. 23).

In this console 435, (FIG. 23) the logic 1 inputs on leads labelled "$2^0$, $2^1$, and $2^2$" will pass through gang switch 2B1 which is in the MU position, and go to the logic interlock and entry gates 437 (FIG. 25) via leads labelled "AV, $2^0$ (C)", (CV, and $\overline{DV}$)+($\overline{CV}$ and DV), $2^1$ (C) and BV $2^2$ (C). As there shown, the logic 1 input on lead labelled "$2^0$ (C)" causes the output of NOR circuit 2507 to be a logic 0. The logic 1 input on lead labelled "$2^1$ (C)" causes the output of NOR circuit 2505 to be a logic 0. The logic 1 input on lead labelled "$2^2$ (C)" causes the output of NOR circuit 2467 to be a 0. The outputs of these three NOR circuits go to encoder 436 (FIG. 19) via leads labelled "$2^0$, $2^1$ and $2^2$."

In the encoder 436 (FIG. 19), the logic 0 inputs on input leads labelled "$2^0$, $2^1$, and $2^2$" go to NOR circuits 1922, 1923, and 1924. Input lead labelled "inhibit 2" will be a logic 0 at this time as gang switch 2B1 (FIG. 23) is not in the isolate or idle position. Input lead labelled "inhibit 1" will be at a logic 1 level at this time holding the outputs of NOR circuits 1915–1921 at the logic 0 level. As all inputs to NOR circuits 1922, 1923, and 1924 are now at logic 0 levels, the three outputs labelled "$2^0$, $2^1$ and $2^2$" will be at logic 1 level. These three outputs go directly to logic interlock and entry gates 437 (FIG. 25), and as there shown, these three inputs labelled "$2^0$ (E), $2^1$ (E) and $2^2$ (E)" cause the outputs of inverters 2527, 2529, and 2531 to go to the logic 0 level. These logic 0 outputs cause the outputs of NOR circuits 2528, 2530 and 2532 to be at the logic 1 levels. The outputs of NOR circuits 2454, 2456, 2522, 2528, 2530, and 2532 will now all be at the logic 1 level and these six outputs (T26, T27, T30, T33, T32, and T31 respectively) all go to transmit register 501 (FIG. 28) via cable labelled "parallel entry" (FIG. 28).

The logic 1 outputs of these NOR inputs to FIG. 28 via leads T26, T30, T33, T32 and T31 result in the setting of flip-flops 2826, 2827, and 2830–2833 of which only 2833 is shown. Transmit register 501 now contains the correct data to be sent to the slave station in this transmission.

At this point, reference to Table 1 shows how the various throttle and brake functions are coded to get the eight varying degrees of throttle and brake conditions.

TABLE 1

GF = Generator Field (i.e. $2^3$).
AV = 75 r.p.m. Increase in Diesel Engine Speed (i.e. $2^0$).
BV = 300 r.p.m. Increase in Diesel Engine Speed (i.e. $2^2$).
CV = 150 r.p.m. Increase in Diesel Speed (i.e. $2^1$).
DV = 150 r.p.m. Decrease in Diesel Engine Speed (i.e. $2^1$).
IDLE = 275 r.p.m.; GF, AV, BV, CV, and DV Not Effective.

| | R.p.m. of Diesel Engine [1] | Traction Motor Power | B | BG | GF $2^3$ | BV $2^2$ | CV & DV $2^1$ | AV $2^0$ | DV | CV | $2^1$ |
|---|---|---|---|---|---|---|---|---|---|---|---|
| TH8 | 800 | Yes | 0 | 0 | 1 | 1 | 1 | 1 | 0 | 1 | 1 |
| TH7 | 725 | Yes | 0 | 0 | 1 | 1 | 1 | 0 | 0 | 1 | 1 |
| TH6 | 650 | Yes | 0 | 0 | 1 | 1 | 0 | 1 | 1 | 1 | 0 |
| TH5 | 575 | Yes | 0 | 0 | 1 | 1 | 0 | 0 | 1 | 1 | 0 |
| TH4 | 500 | Yes | 0 | 0 | 1 | 0 | 1 | 1 | 0 | 1 | 1 |
| TH3 | 425 | Yes | 0 | 0 | 1 | 0 | 1 | 0 | 0 | 1 | 1 |
| TH2 | 350 | Yes | 0 | 0 | 1 | 0 | 0 | 1 | 0 | 0 | 0 |
| TH1 | 275 | Yes | 0 | 0 | 1 | 0 | 0 | 0 | 0 | 0 | 0 |
| IDLE | 275 | NO | 0 | 0 | 0 | 0 | 0 | 0 | 0 | 0 | 0 |
| DB1 | (²) | NO | 1 | 1 | 0 | 1 | 1 | 1 | 0 | 1 | 1 |
| DB2 | (²) | NO | 1 | 1 | 0 | 1 | 1 | 0 | 0 | 1 | 1 |
| DB3 | (²) | NO | 1 | 1 | 0 | 1 | 0 | 1 | 1 | 1 | 0 |
| DB4 | (²) | NO | 1 | 1 | 0 | 1 | 0 | 0 | 1 | 1 | 0 |
| DB5 | (²) | NO | 1 | 1 | 0 | 0 | 1 | 1 | 0 | 1 | 1 |
| DB6 | (²) | NO | 1 | 1 | 0 | 0 | 1 | 0 | 0 | 1 | 1 |
| DB7 | (²) | NO | 1 | 1 | 0 | 0 | 0 | 1 | 0 | 0 | 0 |
| DB8 | (²) | NO | 1 | 1 | 0 | 0 | 0 | 0 | 0 | 0 | 0 |

[1] Three seconds per step.
[2] Some increase.

In the present transmission, we have function GF, $2^2$, $2^1$ and $2^0$ in the logic 1 condition, and a throttle eight condition obtains which is 800 r.p.m.

Referring again to FIGURE 40, the output of inverter 4059 will also be a logic 1 at this time, causing the output of inverter 4068 to be a logic 0. As there is no brake application at this time, cables 81 and 82 labelled "ABA and IBA" will both be at a logic 0 level. As the three inputs to NOR circuit 4069 are at logic 0, the output will now be a logic 1 setting the brake by-pass flip-flop 4093 at the next clock pulse. The M8 logic 1 output of this flip-flop goes to NOR gates 4050 and 4052 holding their outputs at a logic 0.

Looking ahead, when master station programmer 512 reaches program step A19, it will step immedaitely to step A20 and then immediately to step A9. This is the result of the brake by-pass flip-flop being set at this step. If there is a brake application, brake-by-pass flip-flop 4093 would not be set, thereby allowing master station programmer 512 to wait at step A19 until the brake application is off and then to wait at step A20 until the accumulator counter reaches count 1. Such is not the case however in the present example of a regular 30-second transmission.

Referring to FIGURE 40, the logic 1 output of inverter 4059 also goes to program register 511 (FIG. 37) via lead 23 in the cable labelled "program address cable."

In the master station program register (FIG. 37) this logic 1 input will reset flip-flop 3701 and set flip-flop 3702 resulting in our next program address of A18.

*Address 18*

Referring to FIGURE 41, the four inputs to NOR circuit 4102 will now all be at a logic 0 level resulting in a logic 1 output. The logic 1 output of NOR circuit 4102 goes to error code and shift pulse circuit 603 of FIGS. 43–44 via lead 4 in cable labelled "start transmission," and the logic 1 input on the start transmission lead results in the setting of flip-flop 4411 at the next clock pulse. The $\overline{CII}$ logic 0 output of this flip-flop from the not side now goes back to the master station programmer 512 via lead labelled "start transmission received."

In the master station programmer 512 (FIG. 41), a logic 0 input on lead labelled "start transmission received" enters NOR circuit 4101 via lead 36 of cable 3928.

The other four inputs to NOR circuit 4101 are also logic 0 at this time enabling the output of NOR circuit 4101 to be a logic 1. The logic 1 output of NOR circuit 4101 goes to program register 511 (FIG. 37) via lead 22 in cable labelled "program address enable" and this logic 1 input will reset flip-flop 3702 and set flip-flops 3701 and 3704 giving the next program address of A25.

*Address 25*

As a result of the "start transmission" signal having been received in the error code and shift pulse circuit 603, as previously stated, circuit 603 proceeds to transmit what is found in the transmit register 501. Preliminary to a description of this transmission, the error code and shift pulse circuit 603 is generally described, after which sequence of transmission from the master station is once more set forth.

*Error code and shift pulse circuit*

The communication equipment of the system can essentially be considred as three main equipment groups:

Group 1—Transmit and receive registers 501 and 502 respectively at the master station and 801 and 802 at the slave station respectively.
Group 2—Shift pulse circuit shown in FIGURE 44 of the master station and shown in FIGURE 62 of the slave station.
Group 3—Error code circuit shown in FIGURE 43 of the master station and shown in FIGURE 61 of the slave station.

With initial reference to Groups 2 and 3, information exchange follows the pattern of having a secondary sync signal followed by two information bits. The sync signal comprises a space bit "0" followed by a sync bit "1" as here shown:

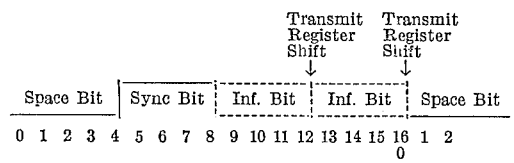

It should be noted that the 16 divisions are determined by the 2.4 kc. timing from the circuit 510 of FIGURE 36 and circuit 810 of FIGURE 55. The pattern repeats until all information has been transmitted.

The transmission channel operates over data modems, the speed of which is 600 bauds.

As the frequency of the clock pulses feeding this part of the system, i.e., the circuits 603 and 903 is 2400 c.p.s., a division by the factor four (4) is performed to attain proper transmission speed when transmitting. During the receiving cycle, the sync bit preceding the two information bits is used to start a timing circuit which enables reading out the information bits from the modems at a time closest to the middle point of each information bit. By this method, synchronism between the master and remote stations is maintained even if the clock frequencies deviate slightly.

The manner in which transmission is performed with regard to the shift pulse circuit of FIG. 44 is now set forth. The "start transmission" signal sets flip-flop 4411 (the symbol FF is used herein for flip-flop to abbreviate the description). The C11 output of FF 4411 will inhibit incoming data by feeding a "1" to the input of gate 4405. Moreover, $\overline{C11}$ of FF 4411 gives a 0 output meaning "start transmission order received."

The inputs to gate 4428 are now both zeros as FF 4411 is set and FF 4412 is reset. Logic 1 output from gate 4428 provides a 1 input to gate 4438 which via inverter 4437 enables the clock amplifier 4436. This clock amplifier feeds the 16 step binary counter, consisting of FF 4423, 4424, 4425, and 4426 with associated gates.

As the 16 step binary counter, comprising FF 4423–4426 and associated gates, counts from zero to 15 the clock pulse numbers are used to identify the input to the data modulator, the pattern shown in column 30 being followed in such operation. Between clock pulses 0 and 1 the following conditions are valid. If the transmission is not completed, there will be a logic 1 output from gate 2843 (FIG. 28) via the "transmit register empty" lead which keeps the gate 4323 output at logic 0. Thus, gate 4324 has a 1 output, causing a 0 output from gate 4325. Gate 4326 is also fed from gate 4323 with a 0, and will therefore give an output that is the complement of the serial data from the transmit register. The upper lead input to gate 4333 represents the complement of the serial data. The middle lead input is 0 when transmitting, coming from gate 4427A via inverter 4331. The lower lead is a 1 when the 16 counter is counting clock pulses between 0 to 8. At the 8th clock pulse, the input to the lower lead turns to a 0, which remains until the 16th or 0th clock pulse. This input is coming from the reset side of the $2^3$ flip-flop FF 4426 of the 16 counter.

The upper input to gate 4334 is a 0 when transmitting, the middle one is a 0 when the counter is counting between 0 and 8, the signal being provided by the set side of the $2^3$ flip-flop 4426 of the 16 counter, and the lower input which comes from the reset side of the $2^2$ flip-flop 4425 of the 16 counter, is a logic 1 during the 0th to the 4th and 8th to the 12th clock pulses.

Gate 4332 furnishes a 0 output when transmitting as all inputs to inverter 4407 are 0's until gate 4310 gives a logic 1 output which condition occurs when the complete transmission is over. Moreover, gates 4333 and 4334 give out logic 0 to lead 604A to the data modulator 604.

The following additional conditions obtain at this time:

Clock pulse 1: FF 4423 will be set.

Clock pulse 2: FF 4424 will be set; FF 4423 will be reset; Input to data modem: 0.

Clock pulse 3: FF 4423 will be set. When FF 4423 is set, the gate 4434 gives a 1 output, causing a logic 1 coming from gate 4431 to appear at the input of gate 4430. However, gate 4428 gives a 1, thus, the output from gate 4430 remains at 0.

Clock pulse 4: FF 4425 will be set; FF 4424 will be reset; FF 4423 will be reset. When FF 4425 has been set the logic 1 from FF 4425 ($\overline{C25}$) going to gate 4334 input ceases and the output from this gate becomes a 1, which is supplied to the data transmitter. Thus from clock pulse 0 until clock pulse 4, there has been a logic 0 input to the data modem. At clock pulse 4, the input to the modem becomes a 1 indicating the discussed sync bit.

Clock pulses 5, 6, and 7: The counter assumes the states 5, 6, and 7 respectively; the output to the transmitter is 1.

Clock pulse 8: The counter assumes the eighth position which is: FF 4423 reset; FF 4424 reset; FF 4425 reset; FF 4426 set. By resetting FF 4425, the output 1 to the transmitter, furnished by gate 4334 ceases as the corresponding input assumes the logic 1. Moreover, the output from C26 of FF 4426 will keep gate 4334 inhibited until FF 4426 is reset which occurs at clock pulse 16 (or 0). The output $\overline{C26}$ of FF 4426, which until FF 4426 becomes set, has been a logic 1 and has inhibited gate 4333, will assume a logic 0 value and the output from gate 4333 will conform with the serial data from the transmit register. As no shift in the transmitting shift register has taken place, the output from gate 4333 is the output from FF 2801. This output may be traced over serial data lead T1 from FF 2801 (FIG. 28) input to FIG. 43 in the cable designated "serial data T1, T2," through cable 4363, out of cable 4363, and lead T1 input to gate 4326. If a logic 1 is on T1, a logic 1 will be output from 4333. Thus, at clock pulse 8, transmission of the first information bit starts.

Clock pulses 9 and 10: The 16 counter changes its state.

Clock pulse 11: The counter will assume the state corresponding the 11-position. This causes the gate 4433 to give a 1 output, enabling clock amplifier 4429 to pass clock pulse 12.

Clock pulse 12: The position of the counter will change to the 12-state. As mentioned under the clock pulse 11 paragraph, a clock pulse will pass to the transmitting shift register causing it to step one step. At clock pulse 12, the output from the gate 4333 will thus be the second information bit.

As FF 4425 is now set again, the lower input to gate 4334 will again be a logic 0. However, the middle input lead from C26 FF 4426 will inhibit a 1 output from that gate.

Clock pulses 13 and 14: Changes only in the state of the counter to the 13 and 14 states respectively.

Clock pulse 15: The counter assumes a state corresponding to count 15, causing the gate 4432 to give a 1 output which will keep the clock amplifier 4429 enabled to pass clock pulse 16.

Clock pulse 16 (or 0): The counter will assume the state 0000. The transmit shift register will be stepped one step forward by a clock pulse from clock amplifier 4429. Gate 4333 will be inhibited by the output $\overline{C26}$ of FF 4426. Gate 4334 will be inhibited by $\overline{C25}$ of FF 4425. Consequently the output to the data transmitter will again be a logic 0 signal.

The whole 16-count cycle restarts. By shifting the shift register clock pulse 16 i.e. 0, the new information bit will appear at the data modem when, as a result of the new clock pulse 8, the gate 4333 lets the information bit pass.

The following table will illustrate the transmission part of the shift pulse circuit:

| Immediately After Clock Pulse | FF 4423 | FF 4424 | FF 4425 | FF 4426 | Gate 4333 Output | Gate 4334 Output | Remarks |
|---|---|---|---|---|---|---|---|
| 0 | 0 | 0 | 0 | 0 | 0 | 0 | |
| 1 | 1 | 0 | 0 | 0 | 0 | 0 | |
| 2 | 0 | 1 | 0 | 0 | 0 | 0 | |
| 3 | 1 | 1 | 0 | 0 | 0 | 0 | |
| 4 | 0 | 0 | 1 | 0 | 0 | 1 | |
| 5 | 1 | 0 | 1 | 0 | 0 | 1 | |
| 6 | 0 | 1 | 1 | 0 | 0 | 1 | |
| 7 | 1 | 1 | 1 | 0 | 0 | 1 | |
| 8 | 0 | 0 | 0 | 1 | (1) | 0 | |
| 9 | 1 | 0 | 0 | 1 | (1) | 0 | |
| 10 | 0 | 1 | 0 | 1 | (1) | 0 | |
| 11 | 1 | 1 | 0 | 1 | (1) | 0 | Clock ampl. 4429 enabled. |
| 12 | 0 | 0 | 1 | 1 | (2) | 0 | One step shift in register. New inform. bit appears. |
| 13 | 1 | 0 | 1 | 1 | (2) | 0 | |
| 14 | 0 | 1 | 1 | 1 | (2) | 0 | |
| 15 | 1 | 1 | 1 | 1 | (2) | 0 | Clock ampl. 4429 enabled. |
| 16-0 | 0 | 0 | 0 | 0 | 0 | 0 | One step shift in the register. New inform. bit appears. |

[1] 1st Inform. bit.
[2] 2nd Inform. bit.

Reviewing, when the 16 step binary counter counts to 11, gate 4433 strobes the 2.4 kc. clock pulse amplifier 4429 so that the 12th clock pulse shown earlier herein can cause the transmit register of FIG. 28 to shift via the lead clock control (XMIT). When the counter counts to 15, gate 4432 strobes 4429 to cause the transmit register (FIG. 28) to shift on the 16th clock pulse. Also reviewing, flip-flop 4411 becomes set at the beginning of transmission, and flip-flop 4412 becomes set at the end of transmission. On the next clock pulse flip-flop 4411 becomes reset. Looking forward, upon receiving flip-flops 4411 and 4412 both remain reset.

Assume now, for the sake of explanation, that information bits 1 1 0 1, for example, are part of a received word. The input from the demodulator on lead 605A will be:

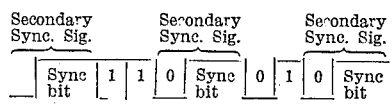

The same pulses will appear at the output of gate 4405 if the FF 4411 is in the receive mode. (A logic 0 at the C11 output.)

The relation between the incoming data to FF 4410 and the 2.4 kc./s. clock pulse is shown in the figure below.

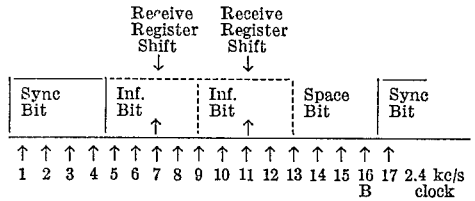

Due to the ratio between the data bit stream speed and the 2.4 kc./s. clock, the first clock pulse indicated in the figure above must occur within the first 25% of the sync bit.

With the clock pulses designated as in the figure above, the following description is valid:

Before clock pulse 1 all the flip-flops are reset in accordance with FIGURE 44. The shift pulse generator is not normally running. It is started by a secondary sync mark bit which precedes two information bits. Roughly speaking, during the reception mode, flip-flops 4410, 4417, 4418, 4419, 4420, 4421 and 4422 provide a shift counter to count to 7, flip-flop 4416 being an auxiliary flip-flop. To extend the count, flip-flops 4423, 4424, and 4425 count in binary fashion from count 8 to count 15. An output from 4421 causes 4429 to be strobed so that the 7th clock pulse can cause the receive register of FIGURE 29 to shift via the lead clock control (REC). Output from 4434 on the tenth count causes 4429 to be strobed so that the 11th clock pulse can cause the receive register to shift. Flip-flop 4413 becomes set on the fifth clock pulse to prepare the circuit comprising flip-flops 4414, 4415, and gate 4456 so that if the point is reached where a new sync mark is to be expected and doesn't arrive and receive shift register is not filled, at clock pulse 17 gate 4456 gives logic 1 output which signals the station programmer which detects the same and resets the station. This is illustrated in the following chart:

| Immediately After Clock Pulse | FF 4410 | FF 4416 | FF 4417 | FF 4418 | FF 4419 | FF 4420 | FF 4421 | FF 4422 | FF 4423 | FF 4424 | FF 4425 | FF 4413 |
|---|---|---|---|---|---|---|---|---|---|---|---|---|
| 1 | 1 | 0 | 0 | 0 | 0 | 0 | 0 | 0 | 0 | 0 | 0 | 0 |
| 2 | 1 | 1 | 1 | 0 | 0 | 0 | 0 | 0 | 0 | 0 | 0 | 0 |
| 3 | 1 | 1 | 0 | 1 | 0 | 0 | 0 | 0 | 0 | 0 | 0 | 0 |
| 4 | 1 | 1 | 0 | 0 | 1 | 0 | 0 | 0 | 0 | 0 | 0 | 0 |
| 5 | INF | 1 | 0 | 0 | 0 | 1 | 0 | 0 | 0 | 0 | 0 | 0 |
| 6 | INF | 1 | 0 | 0 | 0 | 0 | 1 | 0 | 0 | 0 | 0 | 1 |
| 7 | INF | 1 | 0 | 0 | 0 | 0 | 0 | 1 | 0 | 0 | 0 | 1 |
| 8 | INF | 1 | 0 | 0 | 0 | 0 | 0 | 1 | 1 | 0 | 0 | 1 |
| 9 | INF | 1 | 0 | 0 | 0 | 0 | 0 | 1 | 0 | 1 | 0 | 1 |
| 10 | INF | 1 | 0 | 0 | 0 | 0 | 0 | 1 | 1 | 1 | 0 | 1 |
| 11 | INF | 1 | 0 | 0 | 0 | 0 | 0 | 1 | 0 | 0 | 1 | 1 |
| 12 | INF | 1 | 0 | 0 | 0 | 0 | 0 | 1 | 1 | 0 | 1 | 1 |
| 13 | 0 | 1 | 0 | 0 | 0 | 0 | 0 | 1 | 0 | 1 | 1 | 1 |
| 14 | 0 | 1 | 0 | 0 | 0 | 0 | 0 | 1 | 1 | 1 | 1 | 1 |
| 15 | 0 | 0 | 0 | 0 | 0 | 0 | 0 | 0 | 0 | 0 | 0 | 1 |
| 16 | 0 | 0 | 0 | 0 | 0 | 0 | 0 | 0 | 0 | 0 | 0 | 1 |

If a sync bit is incoming before the 16th clock pulse, flip-flops 4414 and 4415 will not be set and the counter will be restarted. This is an unusual case, but does not stop recycling. If a sync bit is incoming before the 17th clock pulse, flip-flop 4414 will be caused to be set and the counter will be started. This is the normal case.

If a sync bit is not incoming before the 17th clock pulse, flip-flop 4415 will be set, flip-flop 4414 will be reset and gate 4456 will give a logic 1 output which enables the station programmer to check and reset the system. More specifically:

At clock pulse 1: FF 4410 will be set.

At clock pulse 2: FF 4416 will be set. The inputs to gate 4462 are both 0's and consequently FF 4417 will be set. A logic 1 will appear at gate 4466 causing a logic 0 output from that gate. This gate is added to reset FF 4416 in case FF 4417 would be set to a 1 and 4416 set to 0.

At clock pulse 3: FF 4416 stays at 1. FF 4417 will be reset from the output C16 of FF 4416. The outputs from gate 4464 will set FF 4418.

Assuming that the incoming secondary sync bit was a proper bit which means it did not appear as a piece of a bit caused by noise, the output from gate 4459 is 0 as the upper incoming lead should remain a logic 1 until after clock pulse 4. However, if noise had caused the shifting circuit to start, it is assumed that the noise would not have represented a logic 1 output from the data modem for as long as 3 clock periods. In this case the output from gate 4459 would have been a 1, causing the FF 4427 to be set at the third clock pulse. This would have reset FF 4416 at the fourth clock pulse via inverter 4460 and the shifting circuit would after that reset have been ready for reception of new data.

At clock pulse 4: FF 4410 is still set. FF 4416 is still set. FF 4417 is reset. FF 4418 will be reset by its own output C18 at clock pulse four. FF 4419 will be set.

At clock pulse 5: FF 4420 will be set. FF 4419 will be reset. FF 4413 will be set.

At clock pulse 6: FF 4421 will be set. FF 4420 will be reset.

The output C21 of FF 4421 feeds a logic 1 to gate 4431 which consequently presents a zero output to gate 4430. The other inputs to this gate are zeros as one of the inputs coming from gate 4428 with one of the inputs to this gate being a 1 from $\overline{C11}$ of FF 4411. The other input to gate 4430 is coming from gate 4408 which has a logic 1 input from gate 4407. Gate 4407 gets logic 0 input from gate 4456 as FF 4415 is still reset. Thus a 1 appears at the gate of clock amplifier 4429, after clock pulse 6 and enables the clock amplifier when clock pulse 7 occurs.

Clock pulse 7: FF 4421 will be reset by its own output C21. FF 4422 will be set.

The clock amplifier 4429 is enabled to pass the clock pulse to clock amplifier 2941 (FIG. 29) via the clock control lead, which is enabled as the input to the gate 2940 is a 0 from FF 2900 until receive register is full and a 0 from C11 of FF 4411 via the lead "shift control (REC)." Thus the clock pulse passes the clock amplifier 2941 and causes the receive register to shift one step (FIG. 29). Previous to this, the receive register of FIG. 29 had been conditioned by a signal over the "clear register" lead whereby flip-flops 2900–2938 were "jam reset," thus storing 0's therein and flip-flop 2938A was "jam set" thus storing a "1" therein whereby if the "1" moves to the right and is found in flip-flop 2900, a means of knowing when the receive register is full is provided. The mark bit FF 2938A which was set by the "clear register" order, moves 1 step, and the information bit (a 1 in this example) is read into the receiver register flip-flop 2938A. The clock pulse output from 4429 is also fed to the code generator and check logic (FIG. 43). However, the same shift logic is continued at this point and the code logic part will be explained in a subsequent paragraph.

Clock pulse 7 is the first pulse that is fed to the receiving shift register circuit of FIG. 29 and code check circuit of FIG. 43. Moreover, FF 4422 (FIG. 44) is set by clock pulse 7 providing a logic 1 to gate 4438, which through inverter 4437 enables clock amplifier 4436.

The logic circuitry consisting of FF 4423, 4424, 4425, 4426, and the associated gates has a configuration similar to a 16-counter except that a mark output from C22 of FF 4422 can inhibit FF 4426 from participating in the counting process.

Clock pulse 8: FF 4422 remains set. FF 4423 will be set.

Clock pulse 9: FF 4423 will be reset by its own C23 output. FF 4424 will be set.

Clock pulse 10: FF 4423 will be set. FF 4424 remains set.

This counter combination gives all 0's at the input of the gate 4434 which thus provides a 1 output, causing a 0 output from gate 4431. The input leads to gate 4430 have the same logic setting as after clock pulse 6. Thus, due to the inherent delay in flip-flops, the clock amplifier 4429 is activated when clock pulse 11 occurs.

Clock pulse 11: This clock pulse will constitute a shift pulse for the receive register of FIG. 29 and code check circuit and the second information bit is read into the receiving shift register. FF 4423 will be reset. FF 4424 will be reset. FF 4425 will be set.

Clock pulse 12: FF 4423 will be set.

Clock pulse 13: FF 4423 will be reset. FF 4424 will be set.

Clock pulse 14: FF 4423 will be set. This combination gives a 1 output from gate 4451.

Clock pulse 15: This clock pulse must occur during the space bit of the data modem output even if the clocks are poorly synchronized. The output from gate 4451 will reset FF 4416 since a mark on the set side of that flip-flop cannot exist. Also FF 4422 will be reset. The counter flip-flops 4423, 4424, 4425 will be reset by their own outputs. FF 4426 will not be set at the moment of the clock pulse the output from FF 4422 inhibited setting of FF 4426. FF 4413 was set by the fifth clock pulse from FF 4419 output, and has remained set.

Clock pulse 16: The inputs to gate 4453 are all 0's FF 4414 will be set.

The 16-counter will not restart because FF 4422 has been reset ceasing to activate clock pulse amplifier 4436.

Clock pulse 17: When this clock pulse occurs a new sync bit should be present at FF 4410; and a cycle similar to the one being described should restart.

The operation when the shift register has been filled up (which means all information has been received), will be described later. However, if a new sync pulse does not appear and the register has not obtained all of the information, an error has occurred. In this case, all inputs to gate 4454 are 0's causing the FF 4415 to be set and to give the last required zero input to gate 4456. The other inputs include the output of gate 4405, which is the incoming data taken in front of FF 4410 to compensate for delay in case the sync bit would be slightly delayed, and the output from gate 4458 which is the same as the output from C10 of FF 4410.

Assuming that none of the inputs is a 1, the gate 4456 will present a logic 1 output which introduces a logic 0 output from inverter 4407 to cause gate 4408 to assume a logic 1 output. A logic 1 signal appears consequently on the message received lead. At this order, the master programmer will detect that the address information is not right, the address bits of any word arriving after the information bits, and that a logic 1 has not been received over the code check lead from the output of gate 4348 which would be the case of a good word received. The shift pulse and error code circuit will be reset and the received word neglected.

Until now the error code part of the system has been neglected, since an earlier explanation of this part would have complicated the description. However, the error code logic can now be described simply by disregarding the shift pulse.

The basic error code concept involves transmitting of a certain number of check bits along with the message bits and address bits. At the transmitter, the message bits and address bits are divided by a number called the generating function, and the remainder of the division is tacked onto the end of the word as check bits and becomes part of the word transmitted. At the receiver, the message bits and address bits plus the remainder are divided by the same generating function, and if the remainder obtained at the receiving side is 0 then it can be assumed that no error has occurred during transmission.

The generating function in this case is $$G(x) = x^6 + x^4 + x^3 + 1$$

Division is accomplished by implementing the generation function by means of a shift register with the rule that where there is a "1" in $g(x)$, a flip-flop is used; where there is a "0" in $g(x)$, an exclusive OR and a flip-flop are used. A "1" or "0" is referred to the case that the generating function $g(x) = x^6 + x^4 + x^3 + 1$ is written as 1011001.

In the present form of the error checking circuit, the exclusive OR gates are constructed with two NOR gates and an inverter, such as gates 4339, 4340, and inverter 4341. The common output of NOR gates 4339 and 4340 will be a logic 0 if the logic level on the common input conductor going to the SET side of FF 4304 is the same as the logic level output of FF 4306. If the logic levels are different, one or the other of the NOR gates 4339 and 4340 will cause a logic 1 at the common output. The inverter 4341 provides the complement of the common output to control the succeeding FF 4307. Signal lead from the inverter 4335 output is the logic complement of the previously mentioned common input conductor.

It will be recalled that when the error code circuit is utilized for transmission purposes, the output logic level 1 from the transmit flip-flop 4411 inhibits the NOR gates 4330 and 4329. Thus, the gates 4327 and 4328 together with the inverter 4335 constitute the primary exclusive OR gate in transmission mode. During reception the gates 4327 and 4328 are inhibited by the logic 1 output from $\overline{C11}$ of FF 4411. In this case, the gates 4329, 4330 together with the inverter 4335 constitute the primary exclusive OR gate.

It will be recalled that the flip-flop 4301–4303 and 4304–4309 are reset before any transmission and reception.

It will be recalled that the shift pulses for the error checking circuit are generated in a manner described previously and occur simultaneously with the shift pulses for the transmitting shift register and the receiving shift register.

The following flip-flops and gates constitute the different terms of the generating function:

$x^0$ FF 4309
$x^1$ FF 4308—Together with the gate 4434, 4344, and inverter 4345.
$x^2$ FF 4307—Together with the gate 4339, 4340, and the inverter 4341.
$x^3$ FF 4306
$x^4$ FF 4305
$x^5$ FF 4304—Together with the gates 4327, 4328 and the inverter 4335 when transmitting, and the gates 4329, 4330 and inverter 4335 when receiving.
$x^6$ FF 2801—When transmitting and FF 4410 when receiving.

Returning from the digression in which the description now continues with the illustrative example in which it was assumed that the train was operating in the throttle eight position, and a normal 30-second transmission from the master station to the remote station is to be performed.

The preliminary sync signal is transmitted by the carrier being on with the high tone transmitting a logic 1 for approximately 92.05 ms. during which time possible incoming data is inhibited by a logic 1 input to gate 4405 over the data inhibit lead from gate 4213 of FIG. 42, followed by a 7.95 ms. long transmission by the low tone of a logic 0. After that time, the order "START TRANSMITTING" is provided to the shift control circuitry from the master station programmer. The order "DATA INHIBIT" remains as a logic 1 during the whole transmission. All flip-flops are assumed to have been reset or set in accordance with the master reset.

The order "START TRANSMITTING" sets FF 4411. The $\overline{C11}$ output of that flip-flop assumes a logic 0 that indicates "START TRANSMITTING RECEIVED" to the master station programmer. Moreover, this logic 0 level supplies a 0 input to gate 2842 via the shift control (XMIT) lead. As the output from gate 2839 is also a 0, gate 2842 enables clock amplifier 2841. The clock pulses supplied to that amplifier will now pass and step the transmit shift register.

The logic 1 output from C11 of FF 4411 adds an inhibit on gate 2940 over the lead shift control (REC.) Thus, no shift pulses will step the receive register. The three inputs to gate 4427A are all logic 0's and the gate 4331 exhibits a logic 0 output.

The inputs to gate 4428 are both logic 0's. Therefore, the output of gate 4429 is a logic 0. However, the logic 1 output of 4428 enables clock amplifier 4436 through the gate 4438 and inverter 4437. The gates 4408 and 4409 are inhibited by a logic 1 from inverter 4407 as the output of the gate 4456 and the gate 4310 are logic 0's.

The logic 0 output from $\overline{C11}$ of FF 4411 breaks the inhibit that was supplied to the gates 4327 and 4328 by the same flip-flop output in the receive mode, and the logic 1 from C11 of FF 4411 inhibits the gates 4329, 4330. The gates 4327 and 4328 constitute together with the inverter 4335 the exclusive OR gate set forth above in the description relating to the error code circuitry when the system is transmitting. The other gates 4329, 4330, are utilized when the system is receiving.

The logic 1 output from C11 of FF 4411 furnishes also an inhibit to gate 4405 which inhibits incoming data.

In throttle position eight, all information bits in the transmit register are logic zeros except the following bits:

26—FO
27—ER
30—$2^3$ (GF)
31—$2^2$ (BV) DB/TH
32—$2^1$ DB/TH
33—$2^0$ (AV) DB/TH
38—$2^0$ ADDRESS which exhibit logic 1 levels.

Moreover, the address information bits are inserted into information bits 35 through 38. Assuming the address to be "address 1," the information bits 35, 36, and 37 are logic 0's and 38 is a logic 1.

As soon as the clock amplifier 4436 is activated by a logic 1, the 16-counter starts running. The transmission will be performed in the manner described in detail previously in the portion relating to obtaining shift pulses during transmission. The pattern of the outgoing data to the data transmitter is that shown hereinbefore.

The space and sync bits are provided by the shift pulse generator circuitry in the manner described above. The information bits are obtained from the transmit shift register, and the proper timing and duration of their transmission is supplied by the shift pulse circuitry.

In that the shift pulse generating circuitry has been explained in detail, only the clock pulses which shift the transmit register 501 (FIG. 28) will now be described.

The information bits to be transmitted are stepped out from the transmit shift register, and fed from the output of FF 2801 to the gates 4326, 4327 and 4328. The first gates 4326, 4327 are fed by the true output from FF 2801 and the gate 4328 is fed with the complement from flip-flop 2801. The transmit shift register of FIG. 28 consists of 39 flip-flops of which 38 are active for information transmission. Before transmission the last flip-flop is set to a logic 1 level which will never be transmitted, and is used only for the purpose of indicating when all the 38 information bits have been transmitted.

As illustrated previously, the content of FF 2801 is "exclusive OR-ed" with the simultaneous content of FF 4309 in order to compute the error code.

The shift pulses that step the transmit register are also supplied to error code circuitry and clock amplifier 4319. The clock amplifier 4319, however, is not enabled as the inputs to gate 4321 are logic 0's; the output from gate 4322 is a 0 because the input from C11 of FF 4411 is a logic 1, and the output from gate 4323 is a logic 0 as the input to that gate designated "transmit register empty" is a logic 1 until the transmit register is empty. The gate 4323 also provides a logic 0 to the inverter 4324, the output of which inhibits data from C9 of FF 4309 from passing through gate 4325 and appearing at the data modulator input terminal.

Thus, the shift pulses shift the data out from the transmit register 501, and the information bits that are being transmitted are also circulated in a certain pattern into the error code generating circuitry. This proceeds until the 38th bit that originally was located in FF 2838 has been shifted out from flip-flop 2801, the 38th pulse being shifted out at the moment the 38th shift pulse occurs. At that moment, the mark bit originally set into FF 2838A is shifted into the FF 2801 space. This means that all the flip-flops constituting the shift register are reset, and the logic 1 output appears at gate 2839. This logic 1 inhibits gate 2842, the output of which now becomes a logic 0. The clock pulse amplifier 2841 thus becomes deactivated.

Moreover, the output from gate 2843 becomes a logic 0 meaning that the transmit register is empty and the logic 0 causes a logic 1 output from gate 4323 as the other input to that gate remains at the logic 0 level. The output from gate 4323 provides an inhibit to the gates 4327 and 4328 which enables the error code circuitry to disregard the content of flip-flop 2801. The logic 1 output from gate 4323 will also inhibit gate 4326 from transmitting any more data from the transmit register.

The logic 1 output from gate 4323 will through the inverter 4324 break the inhibit gate 4325. The information in the error code flip-flops will thereafter be furnished to the data modulator via gate 4325. The logic 1 output from gate 4323 will also provide a logic 1 input to gate 4321, which through the inverter 4320 activates clock pulse amplifier 4319.

Flip-flops 4301, 4302, and 4303 are reset and FF 4301 will be set as the 39th shift pulse steps the error code shift register one step. The 40th shift pulse steps the error code shift register another step, FF 4302 becoming set and 4301 becoming reset. The 41st shift pulse steps the error code shift register and sets FF 4301. Shift pulse 42 steps the error code shift register, resets FF 4301 and 4302 and sets FF 4303.

Shift pulse 43 steps the error code shift register. The only information left in this register is the information that originally was stored in FF 4304, and this bit now appears in FF 4309. FF 4301 will be set.

Shift pulse 44 shifts out the last information from the error code shift register, and FF 4301 is reset and FF 4302 is set by this shift pulse. The inputs to gate 4310 are all logic 0's, and a logic 1 therefore appears at the gate output which is inverted by the inverter 4407. The logic 0 output from inverter 4407 enables gate 4332 with regard to the "KEEP TONE ON"—input and a logic 0 output is furnished on the "Reset 6" lead to the squelch timer, which logic 0 is inverted by inverter 4222 setting flip-flop 4205 on the next clock pulse. When the logic 0 disappears from lead "Reset 6," the following clock pulse resets flip-flop 4205.

To indicate correct timing it must be recalled that shift pulse 1 occurred simultaneously with the clock pulse 12 for the 16-counter, and shift pulse 2 coincides with clock pulse 16 which equals clock pulse 0. It should also be recalled that a space bit was transmitted between clock pulse 0 and 4.

Shift pulse 44 which is an even shift pulse number coincides with clock pulse 16 or 0, and consequently a space bit is now being transmitted which conforms with the transmission pattern.

The logic 0 level output of inverter 4407 causes the gate 4409 to give a logic 1 output as $\overline{C11}$ of 4411 is still at a logic 0 level. The output of gate 4409 inhibits gate 4427A which now assumes a logic 0 output. Through the inverter 4331, the gates 4333 and 4334 become inhibited.

Returning again to clock pulse numbers, the following operations occur:

Clock pulse 1—FF 4412 will be set. the $\overline{C12}$ of FF 4412 output present logic 1 level to the reset side of FF 4416 and FF 4422. The logic 1 level from C12 of FF 4412 causes a logic 0 output from gate 4428, which does not affect the gate 4430 as gate 4431 exhibits a logic 1 output, but affects the gate 4438 in such a way that the clock amplifier 4436 becomes deactivated, causing a 16-counter to stop in position 1.

Clock pulse 2—FF 4411 will be reset by the output from C12 of FF 4412. Resetting this flip-flop results in a logic 1 on "SHIFT CONTROL" (XMIT), inhibiting clock amplifier 2841. Clock amplifier 2841 is already inhibited by the output from gate 2839 (which now is a logic 1) but this last mentioned output ceases when new information is inserted into the transmit register. C11 presents a logic 0 level to the lead designated "TRANSMISSION COMPLETED." The same 0 logic level is provided to gate 2940, breaking the inhibit level on clock amplifier 2941, thus making the receive shift register ready for reception.

The gates 4327 and 4328 are inhibited by the $\overline{C11}$ logic 1 output, and the inhibit on the gates 4329 and 4330 is broken due to the C11 logic 0 output. This means that the exclusive OR gate pertinent to the error code logic is set to the receiver state. Gate 4323 becomes inhibited, gate 4427A will be inhibited by $\overline{C11}$ of FF 4411, and gate 4409 becomes inhibited by $\overline{C11}$ of FF 4411.

Thus, all inputs to gate 4408 are logic 0's. The logic 1 output of gate 4408 keeps gate 4430 inhibited until the flip-flops 4301, 4302, and 4303 are reset, which happens simultaneously with resetting of the whole shift pulse circuit.

The "RESET SHIFT CONTROL" order from the master station programmer follows the output "TRANSMISSION COMPLETED" to the programmer and consequently occurs after the second clock pulse.

Clock pulse 3—will reset FF 4412 as the input on the reset side is a logic 1 from $\overline{C11}$ FF 4411.

All information bits have now been transmitted with the error bits tacked onto the message bits and address bits. The shift control circuitry resumes the starting state, and the master station programmer switches the radio to the "RECEIVE" mode.

The derivation of the error code for a complete word during normal 30-second transmission with the locomotive control in throttle eight is illustrated by the following table.

|  | FF 2900 | Common Exclusive OR Gate Transmission | X⁵ FF 4304 | X⁴ FF 4305 | X³ FF 4306 | X² FF 4307 | X¹ FF 4308 | X⁰ FF 4309 | Remarks |
|---|---|---|---|---|---|---|---|---|---|
| Before Shift | 0 | 0 | 0 | 0 | 0 | 0 | 0 | 0 | Transmission starts. |
| After Shift: |  |  |  |  |  |  |  |  |  |
| 1 | 0 | 0 | 0 | 0 | 0 | 0 | 0 | 0 |  |
| 2 | 0 | 0 | 0 | 0 | 0 | 0 | 0 | 0 |  |
| 3 | 0 | 0 | 0 | 0 | 0 | 0 | 0 | 0 |  |
| As the first logic 1 appears in bit 26, there are no status changes between shift pulse 4 and 23 ||||||||||
| 24 | 0 | 0 | 0 | 0 | 0 | 0 | 0 | 0 |  |
| 25 | 1 | 1 | 0 | 0 | 0 | 0 | 0 | 0 |  |
| 26 | 1 | 1 | 1 | 0 | 0 | 1 | 1 | 0 | Bit 26 is shfited into FF 2900. |
| 27 | 0 | 1 | 1 | 1 | 0 | 1 | 0 | 1 |  |
| 28 | 0 | 0 | 1 | 1 | 1 | 1 | 0 | 0 |  |
| 29 | 1 | 1 | 0 | 1 | 1 | 1 | 1 | 0 |  |
| 30 | 1 | 0 | 1 | 0 | 1 | 0 | 0 | 1 |  |
| 31 | 1 | 1 | 0 | 1 | 0 | 1 | 0 | 0 |  |
| 32 | 1 | 1 | 1 | 0 | 1 | 1 | 0 | 0 |  |
| 33 | 0 | 0 | 1 | 1 | 0 | 0 | 0 | 0 |  |
| 34 | 0 | 0 | 0 | 1 | 1 | 0 | 0 | 0 |  |
| 35 | 0 | 0 | 0 | 0 | 1 | 1 | 0 | 0 |  |
| 36 | 0 | 0 | 0 | 0 | 0 | 1 | 1 | 0 |  |
| 37 | 1 | 0 | 0 | 0 | 0 | 0 | 1 | 1 |  |
| 38 | 0 | 1 | 0 | 0 | 0 | 0 | 0 | 1 | Last inf. bit from transmit register shifted out. Error code register connected to data transmitter. Exclusive OR gate inhibited. |

The error code is thus 100000. The error code flip-flops are shifted out from right to left during the six following shift pulses, which only step the error code shift register. The transmitted word comprises 25 zeros followed by 1100111100001100000.

Referring to FIGURE 40, the three input leads to NOR circuit 4055 will now all be at a logic 0 level because of the new address A25. The output of NOR circuit 4055 will now be a logic 1 causing the output of NOR circuit 4062 to be a logic 0 which in turn causes the output of inverter 4063 to be a logic 1. The logic 1 output of inverter 4063 goes to radio timer 506 (FIG. 36) via lead 95 labelled "inhibit."

Referring to FIGURE 36, this logic 1 is an input to inverter 3632, causing its output to be held at the logic 0 level preventing any further clock pulses from the gated clock amplifier 3633 which prevents the 63-count shift register from counting any further, thereby inhibiting transceiver switch over. The logic 0 output of NOR circuit 4062 also goes to error code and shift pulse circuit 603 via lead 39 labelled "keep tone on."

Referring to FIGURE 43, this logic 0 is an input to NOR circuit 4332 and if a brake application were present this logic 0 would keep the tone at the high level after the transmission of the last bit of a normal word.

Referring to FIGURE 40, the three inputs to NOR circuit 4054 labelled "P̄1, P̄4 and P̄5" will also be at the logic 0 levels at this time. When error code and shift pulse circuit 603 sends a logic 0 via lead labelled "transmission complete" (i.e., lead 3), the output of NOR circuit 4054 will go to a logic 1 level, and the output of NOR circuit 4054 will reset flip-flop 4096 at the next clock pulse. If there had been a brake application the reset of FF 4096 would stop brake accumulator 504 (FIG. 54) from counting any further in the up direction. The logic 1 output of NOR gate 4054 also goes to program register 511 (FIG. 37) via lead 28 in the cable labelled "program address enable."

*Address 19 to 20 to 9*

Referring to FIGURE 37, this logic 1 input will set flip-flop 3702 and reset flip-flop 3704 resulting in the next program address of A19 (FIG. 63) which reads "Reset independent and automatic brake application." At this point, the master station programmer 514 will immediately step through A19 and A20 to A9 because of the setting of the brake by-pass flip-flop as previously described.

Referring to FIGURE 40, the five inputs to OR circuit 4064 will now all be at the logic 0 level resulting in a logic 1 output from inverters 4065, 4066 and 4067. The logic 1 output of inverter 4065 will reset flip-flop 4090 at the next clock pulse. The logic 0 output of flip-flop 4090 turns off the carrier via lead labelled "transmitter receiver control" and turns off the transmit light via lead labelled "transmit." The logic 1 output of inverter 4067 will set flip-flop 4095 at the next clock pulse.

The logic 1 output of flip-flop 4095 will set the station address into transmit register 501 via address switch 507 as previously described. The logic 1 output of inverter 4066 via lead 5 will set flip-flop 3931 (FIG. 39) at the next clock pulse. The M1 logic 1 output of flip-flop 3931 will reset the error code and shift pulse circuit 603 via the reset shift control lead. The logic 1 output of inverter 4065 will also reset brake by-pass flip-flop 4093 at the next clock pulse so that the logic 0 output of flip-flop 4093 will now go to NOR circuit 4070. The logic 1 output of inverter 4065 also goes to inverter 4070A causing its output to be a logic 0.

NOR circuit 4070 now has two logic 0 inputs, giving a logic 1 output which will set flip-flop 4092 at the next clock pulse. The logic 1 output from flip-flop 4092 will reset brake accumulator 505 (FIG. 34) via lead labelled "reset (5)." The logic 1 output of inverter 4065 also goes to the set side of flip-flop 4091 which will set this flip-flop at the next clock pulse. The logic 0 output of this flip-flop goes to reply timer 508 (FIG. 35) via lead labelled "enable."

Referring to FIGURE 35, the logic 0 input on lead labelled "enable" causes the output of NOR gate 3527 to pulse at a 50-millisecond (i.e. 20 c.p.s.) rate. NOR circuit 3527 is the gating input to gated clock amplifier 3526. The reply timer which is a 64-step binary counter will now begin counting at a rate of 50-milliseconds per step. Flip-flop 3506 has previously been set during address 17 at the same time that the station address was set into the transmit register 501.

Referring again to FIGURE 40, the logic 1 output of inverter 4065 also goes to program register 511 (FIG. 37) via lead 33 in cable labelled "program address enable."

Referring to FIGURE 37, this logic 1 input on program address enable lead will reset flip-flop 3701 and set flip-flop 3702 generating the next program address of A10 which reads "Has message (reply) been received."

*Address 10*

The master station programmer 512 is now in the small loop A10, A12, A13, A10, A12, etc. It will stay in this loop until a reply from the slave station has been received or until reply timer 508 (FIG. 35) times out.

The remote station logic flow chart is shown in FIGURE 64, and reference is made thereto.

During the steps of a master station transmission which has just been described, the remote station programmer has been in the small loop A0, A1, A2, A3, A0, A1, etc. Initial entry into this loop is the result of block labelled "power on reset start" which was previously described as having placed program register 811 (FIG. 56) in the address 0 condition. In describing the slave station programmer, it will be assumed that the address 0 position has just been reached in the loop.

*Address 0*

Figure 58:
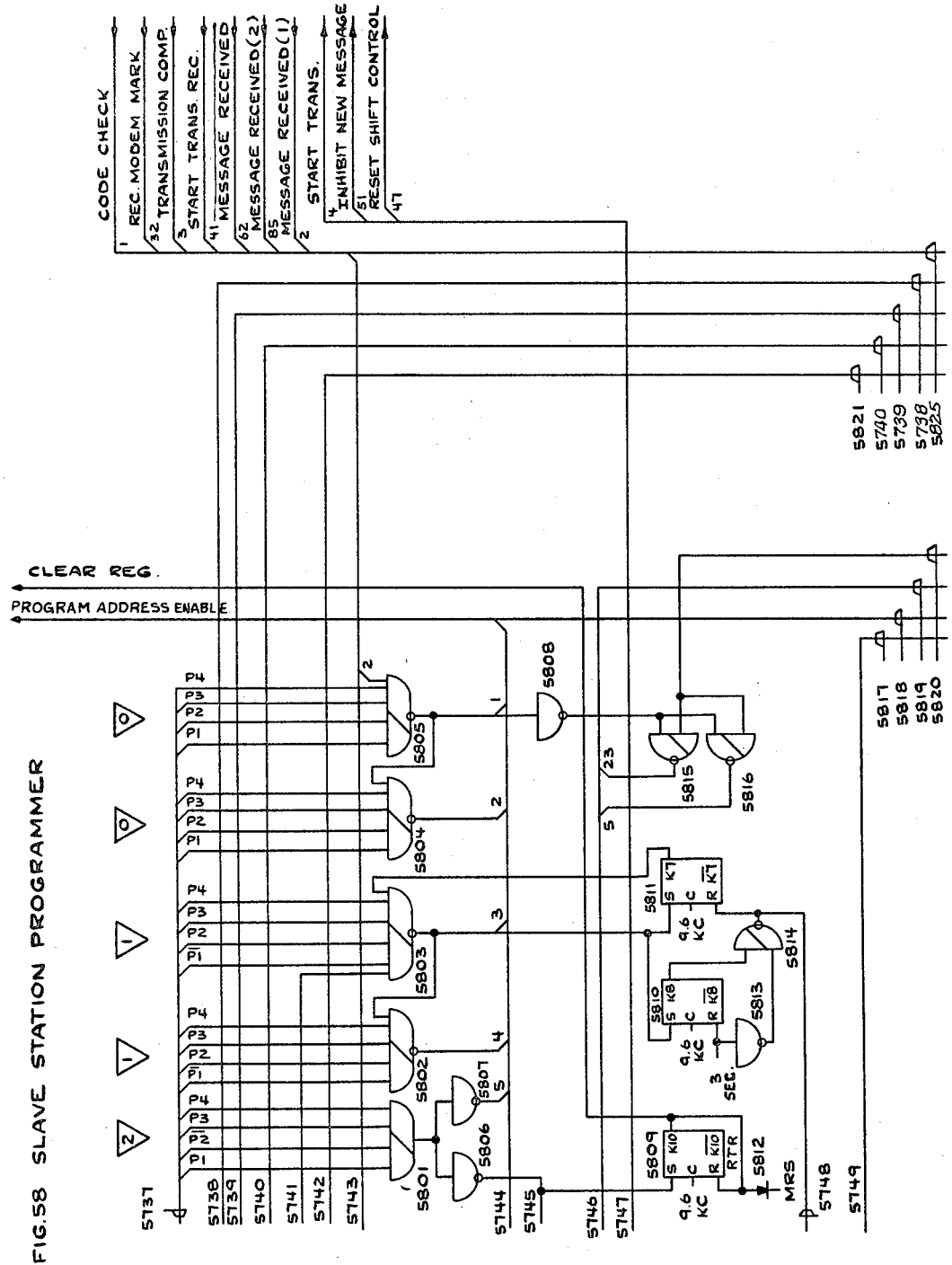

Referring to FIGURE 58, the four input leads to NOR circuits 5804 and 5805 labelled "P1–P4" will all be at the logic 0 level at this time.

Assuming that the transmission from the master station has not yet been received, the lead labelled "message received (1)" which is the input designated 2 to NOR gate 5805 will be a logic 0. The output of NOR gate 5805 will now be a logic 1, holding the output of NOR gate 5804 at a logic 0. The logic 1 output of NOR gate 5805 causes the output of inverter 5808 to be a logic 0 which is an input to NOR gates 5851 and 5816. As the input is idle at this time, lead 5820 labelled "input busy" from the squelch timer will also be at a logic 0 level, and the output of NOR gate 5816 is caused to be a logic 1 which via lead 5 sets flip-flop 5723 of FIGURE 57 at the next clock pulse. The K9 logic 1 output of flip-flop 5723 resets the error code and shift pulse circuit 903 of FIGS. 61–62 via lead 47 labelled "reset shift control." The output of NOR gate 5815 will also be a logic 1 at this time and sets flip-flop 6022 (FIG. 60) via lead 23. The K12 logic 1 output of flip-flop 6022 resets receive register 802 (FIG. 52) via lead labelled "clear register." The logic 1 output of NOR gate 5805 also goes to program register 811 (FIG. 56) via lead 1 in cable labelled "program address enable."

*Address 1*

Referring to FIGURE 56, the logic 1 input on program address enable causes the output of NOR gate 5607 to be a logic 0 and the output of inverter 5608 to be a logic 1 setting flip-flop 5601 at the next clock pulse resulting in the next program address of A1 which reads "Operate register, transmit register and reply flip-flop reset."

Referring to FIGURE 58, the leads labelled "$\overline{P1}$, P2, P3, and P4" going to NOR circuits 5802 and 5803 will all be at the logic 0 level. As the operate register equals the transmit register the 28 input leads to NOR circuit 5435 (FIG. 54) will all be at the logic 0 level at this time. Input leads labelled T3–T7 will also be logic 0 at this time assuming that no alarm condition is present. Input lead labelled "forced no compare" will also be a logic 0 at this time as the transmission from the master station has not yet been received by the slave. The output of NOR circuit 5435 will now be a logic 1 which goes to slave station programmer 812 via lead labelled "compare (c)."

Referring to FIGURES 57 and 58, the logic 1 input on lead labelled "compare (c)" causes the output of NOR circuit 5803 to be a logic 0 which in turn causes the output of NOR circuit 5802 to be a logic 1. The logic 1 output of NOR gate 5802 goes to program register 811 via lead 4 in the cable labelled "program address enable."

Referring to FIGURE 56, the logic 1 input on lead 4 in the cable labelled "program address enable" will reset flip-flop 5601 and set flip-flop 5602 at the next clock pulse. When flip-flop 5602 is set, the next program address will be A2 sent to slave station programmer 812 via lead labelled "next program address."

*Address A2*

Address A2 (FIG. 64) reads "Reset transmit register." Referring to FIGURE 58, the four inputs to OR gate 5801 will now all be at the logic 0 level resulting in a logic 0 output which causes the outputs of inverters 5806 and 5807 to be logic 1's. The logic 1 output of inverter 5806 will set flip-flop 5809 at the next clock pulse. The K10 logic 1 output of flip-flop 5809 goes to transmit register 801 (FIG. 51) via lead labelled "clear register."

Referring to FIGURE 51, the logic 1 input on lead labelled "clear register" is amplified by current driver 5140 and resets flip-flops 5101–5138 and sets flip-flop 5138A. Flip-flop 5138A is a mark flip-flop used to signal error code and shift pulse circuit 903 of the condition of the transmit register. The logic 1 output of inverter 5807 goes to program register 811 (FIG. 56) via lead 5 in the cable labelled "program address enable," setting flip-flop 5601 at the next clock pulse resulting in the next program address of A3 which reads "gate input to load transmit register."

*Address 3*

Referring to FIGURE 57, the four inputs to OR gate 5712 will now be at the logic 0 level resulting in a logic 0 output which causes the outputs of inverters 5718 and 5719 to be logic 1. The logic 1 output of inverter 5718 will set flip-flop 5725 at the next clock pulse. The $\overline{K11}$ logic 0 output of flip-flop 5725 goes to logic interlock and entry gates 737 (FIGS. 45–46) via lead labelled "entry control."

Referring to FIGURES 45 and 46, the logic 0 input on lead labelled "entry control" enables each of the NOR gates feeding the cable labelled "parallel entry" which results in the latest status of all control conditions being loaded into the transmit register 801 (FIG. 51). The logic 1 output of inverter 5719 of FIGURE 57 goes to program register 811 via lead 6 in the cable labelled "program address enable," resetting flip-flops 5601 and 5602 and resulting in the next program address of A0 which is the beginning of the small loop previously described.

*Reception by slave station*

It is now assumed that the transmission from the master station is in the process of being received by the error code and shift pulse circuit 903 (FIGS. 61, 62) of the slave station which circuit is very similar to circuit 603 (FIGS. 43, 44) and accordingly the last two digits of designations for corresponding equipment is the same.

The error code and shift pulse circuit 903 (FIGS. 61, 62) has been reset by a logic 1 over reset lead "reset shift control" previously mentioned and is ready to start receiving.

The initial part of the transmitted word comprises a 92.05 ms. primary sync signal which is on lead 905A from demodulator 905 and sensed at the output of gate 6204 via leads labelled "input and $\overline{input}$" respectively to the squelch timer circuit 902 (FIG. 42). It should be understood that 602 at the master station and 902 at the slave station are both illustrated by FIG. 42, which has not been duplicated.

As in the description of the sending mode of this logic, all flip-flops are considered to be in the reset state, and the lead labelled "data inhibit" into the logic is a zero.

FF 4202 is continuously copying and re-clocking the input data from the receiving demodulator 905 via the leads "input and $\overline{input}$." If FF 4202 gets set by an incoming logic 1, the $\overline{S2}$ output becomes a logic 0 into NOR gate 4216. Also, the lead data inhibit is a logic 0 into this gate, and the S3 output of FF 4203 is a logic 0. Therefore, the lead $\overline{600\ c.p.s.}$ will go a logic 0 at a 600 c.p.s. rate and cause the output of NOR gate 4216 to go to a logic 1 which makes the output of NOR gate 4218 go to a logic 0 and thus the output of inverter 4224 becomes a logic 1. This will enable clock pulse amplifier 4223 to provide an output to the shift counter at a 600 c.p.s. rate as long as all of the conditions just described remain true.

If the shift counter counts as far as count 30, NOR gate 4215 will be enabled and give a logic 1 on its output to set FF 4203. The S3 output of FF 4203 will now be a logic 1 and will inhibit NOR gate 4216 and thus stop the shift counter. This same lead also feeds the input of NOR gate 4220, and this portion of the logic will be explained last.

The $\overline{S3}$ output of FF 4203 will now be a logic 0 and will enable one input to NOR gate 4212. When the incoming data (i.e., primary sync pulse) as copied by FF 4202 goes to a logic 0, FF 4202 will be reset. The S2 output of FF 4202 will then be a logic 0 and it feeds the other input to NOR gate 4212. NOR gate 4212 will now have a logic 1 output and will set FF 4201 on the next clock pulse. The lead labelled "data inhibit" from OR gate 4213 controls the data input to the error code and shift pulse circuit. If this lead is a logic 1, data is not allowed to be received. When FF 4201 becomes set, both inputs to OR gate 4213 are logic 0's and the data inhibit lead becomes logic 0 and starts the error code and shift pulse circuitry receiving data in the manner earlier described. The fact that the shift counter reached count 30 determines that a primary sync pulse has been received, and was uninterrupted for a period of time of at least 48.2 ms. out of a possible 92.05 ms.

If the incoming data had been interrupted before the counter had reached count 30, the entire squelch timer logic would be reset and would start again when the next logic 1 appeared in the data input to FF 4202.

Now digressing, if as just explained, the data input to FF 4202 had gone to a logic 0 before count 30, the resetting of the squelch timer would occur as now described.

Flip-flop 4203 would have been still reset. This would have provided a logic 0 input to NOR gate 4220 from S3. FF 4204 is in the reset state and the $\overline{S4}$ output drives inverter 4219 with a logic which gives a logic 0 output to another input of NOR gate 4220. The remaining input to NOR gate 4220 is the S2 output of the data copying flip-flop FF 4202. When this is reset by the incoming data going to a logic 0, S2 becomes a logic 0 and NOR gate 4220 now is enabled to give a logic 1 output to the set (S) input of FF 4205. Flip-flop FF 4205 will then jam reset the shift counter to all zeros. When the data input returns again to a logic 1, NOR gate 4220 will be inhibited and FF 4205 will reset from its own $\overline{S5}$ output via NOR gate 4221.

This mode of the logic is thus to continuously measure the width of incoming data pulses until one of satisfactory width (at least 48 milliseconds) is detected, thus unlocking the channel to incoming data. The squelch timer may also be reset by the main reset (MRS) or the lead labelled "reset 6" which are controlled by the automatic power on reset circuit or the code check and shift pulse circuit, respectively. The lead labelled "reset 6" is activated by the "message received" signal from the code check and shift pulse circuit when it has finished receiving the data following the primary sync pulse.

The data transmission pattern is the same as shown heretofore. When the first sync bit appears at the input to FF 6210, it is also fed to inhibit the gates 6253, 6254, and 6256. At clock pulse 1, the FF 6210 is set by the sync bit and this information is fed from C10 of FF 6210 to FF 6216 and gate 6259. The logic 0 from $\overline{C10}$ of FF 6210 is fed to the gates 6262, 6254, 6257, 6258.

The sync bit is utilized to create properly timed shift pulses for the receive register and error code register according to the method outlined in detail above.

At the first shift pulse, the applicable information in FF 6210 will be shifted into FF 5238A, the "mark" bit of which is shifted one step to FF 5238. The output of FF 6210 is also utilized to be exclusive OR-ed with the information in FF 6109 by means of the gates 6129 and 6130. This is explained in detail in the paragraph covering the error code generation and checking.

After 38 shift pulses, the 38 data bits constituting the message bits and address bits have been shifted into the receive register (FIG. 52), but one more shift is required to shift the information into the proper flip-flops due to the fact that the data has passed the extra flip-flop 5238A which is equivalent to one shift pulse delay. The extra mark bit, flip-flop 5238A, was set by the reset pulse, and now appears at the output of FF 5201 causing a logic 0 output from gate 5240, which means "Receive Register Full." This logic 0 breaks the inhibit that has been present at the input of gate 6122 and gives a logic 1 output enabling clock pulse amplifier 6119.

As shift pulse 39 is received, the content of the receiver register is shifted into proper flip-flops and the additional mark bit is shifted from FF 5201 to FF 5200. The logic 0 output from gate 5240 remains, and the logic 1 output from RO FF 5200 inhibits gate 5241, which means the clock amplifier 5242 is deactivated. FF 6101 is set.

The shift pulses 39 through 44 are required to perform the proper division in the error code circuit. As shift pulse 44 is received, the last error code bit is read into the error code shift register. The state of the flip-flops 6101, 6102, and 6103 is such that a logic level 1 appears at the output of gate 6110, and this logic is fed to the slave station programmer as "message received (2)" information. Furthermore, through gate 6207 a logic 0 output is furnished on the lead "reset 6" to the squelch timer. The logic 0 output from gate 6207 also causes a logic 1 output from gate 6208, which inhibits gate 6230 from keeping the clock amplifier 6229 enabled, and provides a logic 1 level on the lead designated "message received (1)." If all the error code shift register flip-flops contain 0's, a logic 1 output is furnished gate 6148 to the lead "code check," advising the remote station programmer that the code check was successful.

The status of the shift pulse and the error code circuit will be unchanged until the slave station programmer has checked the information "message received (1) and (2)" and the "code check." Then a "reset shift control" order is supplied by the programmer resetting the shift pulse and the error code circuits to the original state.

The sequence when receiving is the same as when transmitting.

|  | FF 6210 | Common Exclusive OR Gate for Reception | x⁵ FF 6104 | x⁴ FF 6105 | x³ FF 6106 | x² FF 6107 | x¹ FF 6108 | x⁰ FF 6109 |
|---|---|---|---|---|---|---|---|---|
| Immediately Before Shift: | | | | | | | | |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| As the first logic 1 appears in bit 26, the status of the flip-flops shift pulses 3 through 23 are omitted. | | | | | | | | |
| 24 | 0 | 0 | 0 | 0 | 0 | 0 | 0 | 0 |
| 25 | 0 | 0 | 0 | 0 | 0 | 0 | 0 | 0 |
| 26 | 1 | 1 | 0 | 0 | 0 | 0 | 0 | 0 |
| 27 | 1 | 1 | 1 | 0 | 0 | 0 | 0 | 0 |
| 28 | 0 | 1 | 1 | 1 | 0 | 1 | 0 | 1 |
| 29 | 0 | 0 | 1 | 1 | 1 | 1 | 0 | 0 |
| 30 | 1 | 1 | 0 | 1 | 1 | 1 | 1 | 0 |
| 31 | 1 | 0 | 1 | 0 | 1 | 0 | 0 | 1 |
| 32 | 1 | 1 | 0 | 1 | 0 | 1 | 0 | 0 |
| 33 | 1 | 1 | 1 | 0 | 1 | 1 | 0 | 0 |
| 34 | 0 | 0 | 1 | 1 | 0 | 0 | 0 | 0 |
| 35 | 0 | 0 | 0 | 1 | 1 | 0 | 0 | 0 |
| 36 | 0 | 0 | 0 | 0 | 1 | 1 | 0 | 0 |
| 37 | 0 | 0 | 0 | 0 | 0 | 1 | 1 | 0 |
| 38 | 1 | 0 | 0 | 0 | 0 | 0 | 1 | 1 |
| 39 | 1 | 0 | 0 | 0 | 0 | 0 | 0 | 1 |
| Before Shift: | | | | | | | | |
| 40 | 0 | 0 | 0 | 0 | 0 | 0 | 0 | 0 |
| 41 | 0 | 0 | 0 | 0 | 0 | 0 | 0 | 0 |
| 42 | 0 | 0 | 0 | 0 | 0 | 0 | 0 | 0 |
| 43 | 0 | 0 | 0 | 0 | 0 | 0 | 0 | 0 |
| 44 | 0 | 0 | 0 | 0 | 0 | 0 | 0 | 0 |
| After Shift 44 | 0 | 0 | 0 | 0 | 0 | 0 | 0 | 0 |

It will be observed that immediately before the 39th shift pulse, division by the generating function has given the same result as during the transmission case which is to be expected. It will also be observed that the error code shift register contains all 0's when the 44th shift pulse has taken place.

Referring to FIGURE 58, the lead labelled "message received 1" will be a logic 1 at this time as the word has just been received. The four inputs to NOR gates 5804 and 5805 labelled "P1–P4" will all be a logic 0 at this time. The "message received" logic 1 input on lead 2 to NOR gate 5805 causes its output to be a logic 0 which in turn causes the output of NOR gate 5804 to be a logic 1. The logic 1 output of NOR gate 5804 goes to program register 811 via lead 2 in the cable labelled "program address enable," setting flip-flops 5602–5604 at the next clock pulse. The setting of these three flip-flops results in the next program address of A14 which reads "reset shift control and receiver register."

Address 14

Figure 59:
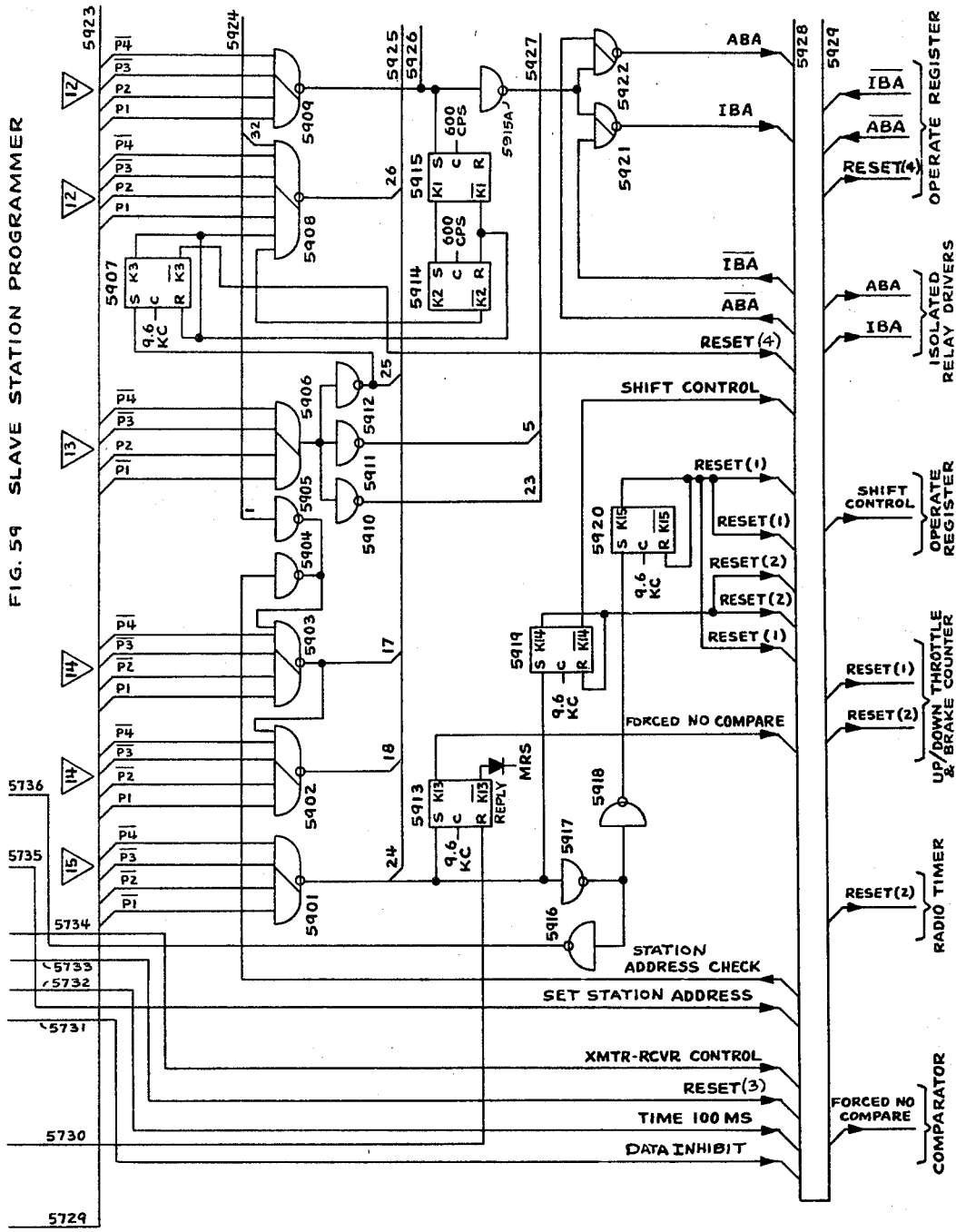

Referring to FIGURE 59, the four input leads to NOR gates 5902 and 5903 will now all be at the logic 0 level. If the word received was error-free, lead 1 labelled "code check" coming from error code and shift pulse circuit 903 will be a logic 1 at this time. This makes the output of inverter 5905 a logic 0. The data in the word just received was shifted into receive register 802 by the error code and shift pulse circuit 903.

Referring to FIGURE 52, the station address which is the outputs of flip-flops 5235–5238 is sent to station address switch 807 (FIG. 35) via cable labelled "station address." The address switch of the slave station is identical to that of the master station except that the four output leads labelled 2⁰, 2¹, 2², and 2³ which go to the reply timer are not used at the slave station as there is no reply timer in the slave station. The address switch at the slave station would be set to the same address position as the address switch at the master station. In the example being described, this position is 1 which determines station address 1.

In the address 1 position, the inputs to inverters 3555 and 3557 from the common of gang switch 3551, decks 3 and 4, will be at the logic 0 level as inputs labelled "R35, R36, R37, and $\overline{R38}$" are at the logic 0 at this time. The outputs of inverters 3555 and 3557 will now be logic 1's resulting in logic 0 outputs from inverter 3554 and 3556. NOR circuit 3553, having two logic 0 inputs, will have a logic 1 output which goes to the slave station programmer 812 via lead labelled "station address check."

Referring back to FIGURES 59 and 60, the logic 1 input on lead labelled "station address check" causes the output of inverter 5904 to be a logic 0. The output of NOR circuit 5903 will now be a logic 1 holding the output of NOR circuit 5902 at a logic 0. The logic 1 output of NOR gate 5903 goes to program register 811 via lead 17 in the cable labelled "program address enable," conditioning flip-flop 5601 to be set at the next clock pulse, resulting in the next program address of A15 which reads "Reset reply timer, receive register, tone squelch control and inhibit data."

Address 15

Digressing at this point and referring to FIGURE 59 if either the station address check or the error code check had been bad, the output of NOR circuit 5903 would have been a logic 0 making the output of NOR circuit 5902 a logic 1. This logic 1 via lead 18 in the cable "program address enable" would have carried the program register 811 (FIG. 56) to generate the next program address of A11 (Does address and code check agree) rather than A15. The error code and shift pulse circuit 903 and receive register 802 would have then been reset and the next program address of A0 generated.

The slave station programmer A12 would now be in the small loop A0, A1, A2, A3, previously described waiting for a new word to be received or for the comparator to signal the no-compare condition.

Transmission by slave station

Returning now to address 15 and referring to FIGURE 59, the four input leads to NOR gate 5901 will now be at the logic 0 level resulting in a logic 1 output. The logic 1 output of NOR gate 5901 will set flip-flop 5919 at the next clock pulse. The $\overline{K14}$ logic 0 output of flip-flop 5919 goes to operate register 803 (FIG. 53) via lead labelled "shift control" to inverter 5336 whose output will now be a logic 1. Inverter 5336 is the gating input to gated clock amplifier 5335, and the logic 1 output of inverter 5336 allows one clock pulse to go to flip-flops 5301–5334 causing the data from receive register 802 to be shifted in parallel into operate register 803 via cable labelled "parallel shift."

Referring to FIGURE 59, the logic 1 output of NOR gate 5901 also sets flip-flop 5913 with this same next clock pulse. The K13 logic 1 output of flip-flop 5913 goes to comparator 804 (FIG. 54) via lead labelled "forced no-compare," and the logic 1 input on lead labelled "forced no-compare" causes the output of NOR gate 5435 to be a logic 0. The logic 0 output goes to slave station programmer 812 (FIGS. 57–60) via lead labelled "compare C," causing the slave station programmer to go into the transmit cycle and address A1.

The K14 logic 1 output from the true side of flip-flop 5919 (FIG. 59) goes to radio timer 806 (FIG. 55) via lead labelled "reset (2)" to reset circuit 5534 (FIG. 55), the 63-count shift register.

The K14 logic 1 output of flip-flop 5919 (FIG. 59) also goes to up/down throttle and brake counter 814 (FIGS. 48–50) via lead labelled "reset 2" to reset flip-flops 4908 and 4906 (FIGS. 48, 49) to the logic 0 condition.

The logic 1 output of NOR gate 5901 (FIG. 59) also goes to inverter 5917, causing its output to be a logic 0 which causes the output of inverter 5918 to be a logic 1 which will set flip-flop 5920 at the next clock pulse. The K15 logic 1 output of flip-flop 5920 goes to clock time divide counters 810 via lead labelled "reset 1."

Referring to FIGURE 55, the logic 1 input on lead labelled "reset 1" will set allotter flip-flop 5501 to the logic 1 state, reset allotter counter which is composed of flip-flops 5502–5504 to the count of 001 and reset circuit 5513, the 30-count shift register. The K15 logic 1 output of flip-flop 5920 of FIGURE 59 also goes to radio timer 806 (FIG. 55) via lead labelled "reset 1."

The logic 1 input on lead labelled "reset 1" (FIG. 55) going to diode 5541 will reset the continuity flip-flop 5539.

Referring to FIGURE 59, the K15 logic 1 output of flip-flop 5920 also goes to up/down throttle and brake counter 814 via lead 4838 labelled "reset 1" and will reset flip-flop 4909 (FIGS. 48, 49). The logic 1 output of NOR gate 5901 (FIG. 59) also goes to program register 811 via lead 24 in cable labelled "program address enable," resetting flip-flops 5601 and 5603. This results in the next program address of A10 being sent to slave station programmer 812 via cable labelled "next program address."

*Address 10*

Referring to FIGURE 60, the four input leads to NOR gates 6002 and 6003 labelled P1, $\overline{P2}$, P3 and $\overline{P4}$ will now all be at the logic 0 level. As there is not a brake application at this time, the fifth input to NOR gate 6003, labelled "$\overline{IBA}+\overline{ABA}$" coming from receive register 802 (FIG. 52) will be a logic 1 at this time. This logic 1 forces the output of NOR gate 6003 to be a logic 0, in turn enabling NOR gate 6002 to have a logic 1 output. The logic 1 output of NOR gate 6002 causes the output of inverter 6011 to be a logic 0. The outputs of inverters 6012 and 6013 will be logic 1's. The logic 1 output of inverter 6012 will set flip-flop 5723 of FIGURE 57 at the next clock pulse via lead 5. The K9 logic 1 output of flip-flop 5723 will reset the error code and shift pulse circuit 903 via lead 47 labelled "reset shift control." The logic 1 output of inverter 6013 will set flip-flop 6022 at the next clock pulse via lead 23. The K12 logic 1 output of flip-flop 6022 will reset receive register 802 via lead labelled "clear register." The logic 1 output of NOR gate 6002 also goes to program register 811 of FIG. 56 via lead 19 in the cable labelled "program address enable."

Referring to FIGURE 56, the logic 1 input on lead 19 in the cable labelled "program address enable" will reset flip-flops 5602 and 5604 and set flip-flop 5601, resulting in the next program address of A1.

*Address A1*

The four input leads to NOR gates 5802 and 5803 labelled "$\overline{P1}$, P2, $\overline{P3}$ and P4" will now all be at the logic 0 level. Input lead 5741 labelled "compare C" will now be at the logic 0 level as the result of the setting of the reply flip-flop 5913. Flip-flop 5811 was previously reset at step A15 and the output lead going to NOR gate 5803 will now be at the logic 0 level. The output of NOR gate 5803 will now be a logic 1 and sets flip-flops 5810 and 5811 at the next clock pulse. The logic 1 output of flip-flop 5811 goes to NOR gate 5803 holding its output at a logic 0 thereby preventing the slave station programmer from following this path twice in a row. While the output of NOR gate 5803 was still a logic 1, it was also sent to program register 811 via lead 3 in cable labelled "program address enable," resetting reset flip-flop 5601 and setting flip-flop 5603 at the next clock pulse resulting in the next program address of A4.

*Address A4*

The four input leads to OR gate 5711 (FIG. 57) and NOR gate 5710 labelled "P1, P2, $\overline{P3}$ and P4" will be at the logic 0 level at this time. Referring to FIGURE 55, the continuity flip-flop 5539 was just previously reset at address 15, the continuity lead labelled "D1" will be at the logic 0 level at this time. This lead input to FIGURE 60, through FIG. 58 into FIG. 57 to OR gate 5711 causes the output of OR gate 5711 to be a logic 0. Lead labelled "$\overline{D1}$" will be a logic 1 at this time, holding the output of NOR gate 5710 at a logic 0. The logic 0 output of OR gate 5711 holds the output of inverters 5715, 5716 and 5717 at the logic 1 level. The logic 1 output of inverter 5717 will set flip-flop 5809 at the next clock pulse via lead 5745. The K10 logic 1 output of flip-flop 5809 will reset transmit register 801 (FIG. 51) via lead labelled "clear register." The logic 1 output of inverter 5715 will reset squelch timer 902 via lead 5733 labelled "reset 3." The logic 1 output of inverter 5716 goes to program register 811 via lead 7 in the cable labelled "program address enable," setting flip-flop 5601 at the next clock pulse, resulting in the next program address of A5 (FIG. 63).

*Address A5*

The four input leads to NOR gate 5709 (FIG. 57) labelled "$\overline{P1}$, P2, $\overline{P3}$ and P4" will be at the logic 0 level at this time. Assuming that a new word has not been received since the reception of the transmission from the master station lead 85 labelled "message received 2" coming from error code and shift pulse circuit 903 will be at the logic 0 level as an input to gate 5709. Another input to gate 5709 is lead labelled G1 in cable 5740 which is the allotter cable from the clock time divide circuit 810 of FIG. 55.

Referring to FIGURE 55, lead G1 in cable labelled "ALLOTTER" is the true side of allotter flip-flop 5501. This flip-flop was previously set to the logic 1 condition at address 15 and will be reset to the logic 0 condition in 350 milliseconds. When flip-flop 5501 is reset, this lead labelled G1 will go to the logic 0 level, causing the output of NOR gate 5709 to be a logic 1. The logic 1 output of NOR gate 5709 goes to program register 811 via lead 9 in the cable labelled "program address enable," resetting flip-flop 5601 and setting flip-flop 5602 at the next clock pulse. Flip-flops 5602 and 5603 will now be found set, resulting in the next program address of A6.

*Address A6*

The four input leads to NOR gate 5707 (FIG. 57) labelled "P1, $\overline{P2}$, P3 and P4" will now be at the logic 0 level. Assuming that a new word has not yet been received, lead 85 labelled "message received 2" will still be at the logic 0 level. In 350 milliseconds, allotter flip-flop 5501 will be set, causing lead $\overline{G1}$ in cable 5740 to be at a logic 0 level.

Referring to FIGURE 55, 100 milliseconds after the setting of allotter flip-flop 5501, NOR gate 5520 will be a logic 1. This logic 1 output goes to slave station programmer via lead labelled "100 milliseconds" which becomes lead 5739, and the logic 1 input on lead 5739 input to inverter 5708 (FIG. 57) causes the output of inverter 5708 to be a logic 0. This enables the output of NOR gate 5707 to be a logic 1. The logic 1 output of NOR gate 5707 will set flip-flop 5727 at the next clock pulse. The K5 logic 1 output of flip-flop 5727 on lead 5134 goes to transceiver switchover 901 (FIG. 55) via lead labelled "XMTR-receiver control."

The logic 1 input on lead labelled "XMTR-receiver control" causes the output of NOR gate 5566 to be a logic 0 and the output of inverter 5555 to be a logic 0. Transceiver switchover flip-flops 5550A and 5550 are both in the reset condition as neither the 75 second or 125 second switchover leads have reached the logic 1 level. The $\overline{H1}$ logic 1 output from the not side of flip-flop 5550 causes the output of NOR gate 5564 to be a logic 0. Both inputs to NOR gate 5563 are now logic 0's, causing the logic 1 output. The logic 0 output of NOR gate 5566 also causes the output of inverter 5558 to be a logic 1. Radio level shifters 5559 and 5562 will now be both biased on, turning off receiver 1 and turning on transmitter 1. This results in the FM carrier being sent out over the radio channel. The logic 0 output of NOR gate 5564 holds the output of inverter 5565 at a logic 1, which in turn holds the output of NOR gate 5556 at the logic 0 level. This keeps radio level shifter 5557 in the off condition which in turn holds transmitter 2 in the off condition. The logic 0 output of NOR gate 5564 also goes to logic interlock and entry gates 737 (FIGS. 45–46) via lead labelled "transceiver identification."

Referring to FIGURE 46, the logic 0 input on lead labelled "transceiver identification" will cause the output of NOR gate 4634 to be a logic 1 when entry control is a logic 0. This results in the setting of flip-flop 5108 of the transmit register 801 indicating to the master station console that transceiver 1 is being used.

Referring to FIGURE 57, the logic 1 output of NOR gate 5707 also goes to squelch timer 902 (FIG. 42) via lead 5732 labelled "time 100 milliseconds" and results in the squelch pulse i.e., the logic 1 portion of the primary sync signal being sent out for a period of 92.05 milliseconds in the same manner as previously described for the master station transmission.

The logic 1 output of NOR gate 5707 (FIG. 57) will also set flip-flop 5722 at the next clock pulse. The K6 logic 1 output of flip-flop 5722 goes to squelch timer 902 (FIG. 42) via cable 5731 labelled "data inhibit." This will stop any incoming data from the data demodulator from entering flip-flop 6210 of FIGURE 62 in the same way as described at the master station.

The logic 1 output of NOR gate 5707 (FIG. 57) also goes to program register 811 via lead 10 in the cable labelled "program address enable." It should be mentioned at this point that the slave station programmer 812 can return to address 0 while in address 5 or 6 if a word is received. Such operation is accomplished by NOR gates 5705 and 5706. If a word has been received, lead 62 labelled "message received" would go to a logic 0 level which via cables 5825 and 5743 enters gates 5705 and 5706 causing the outputs of NOR gate 5705 or 5706 to be a logic 1. This logic 1 via lead 30 would go to program register 811 in the cable "program address enable," resetting flip-flops 5601–5603, resulting in the next program address of A0.

At the same time that lead 62 labelled "not message received" went to a logic 0, lead 85 labelled "message received 2" would have gone to a logic 1 thereby inhibiting the outputs of NOR gates 5707 and 5709.

Referring to FIGURE 56, the logic 1 input on lead 10 labelled "program address enable" would set flip-flop 5601 at the next clock pulse. This results in the next program address of A7 which is sent to slave station programmer 812 via cable labelled "next program address."

*Address A7*

The four input leads to OR gate 5703 (FIG. 57) labelled "$\overline{P1}$, $\overline{P2}$, $\overline{P3}$ and $\overline{P4}$" will now all be at the logic 0 levels. Input lead 5738 labelled "200 milliseconds" will be a logic 1 in 200 milliseconds after the setting of allotter flip-flop 5501. At this time, the output of inverter 5704 will be a logic 0 enabling the output of OR gate 5703 to be a logic 0 causing the outputs of inverters 5713 and 5714 to be logic 1's. The logic 1 output of inverter 5713 will set flip-flop 5721 at the next clock pulse. The K4 logic 1 output of flip-flop 5721 goes to station address switch 807 via lead 5735 labelled "set station address." The slave station address will now be set into the transmit register 801 by means of station address switch 807 in the same manner as previously described for the master station. The logic 1 output of inverter 5714 will set flip-flop 5725 at the next clock pulse. The $\overline{K11}$ logic 0 output from the not side of flip-flop 5725 goes to logic interlock and entry gates 737 via lead labelled "entry control."

Referring to FIGURES 45 and 46, the logic 0 input on lead labelled "entry control" will now enable each of the NOR gates feeding cable labelled "parallel entry."

At this point, in further explanation of the previous disclosure and in preparation of the further disclosure, a description of how up/down throttle and brake counter 814 of FIGURES 48–50 supplies outputs via cable labelled "TH/DB" to activate the isolated relay drivers 813 is set forth.

*Slave up/down throttle and brake counter—FIGS. 48, 49, 50*

This section of logic is comprised of three main items comprising a reversible binary 16-counter, an arithmetic high, low, equal comparator, and the logic to control emergency shut down of throttle or dynamic brake and to isolate the air brake system by operating the air brake feed valve (ABFV).

The reversible binary 16-counter consists of the flip-flops FF 4901, FF 4902, FF 4903, and FF 4904. The NOR gates associated with these flip-flops are 4910, 4911, 4913, 4914, 4912, 4919, 4920, 4922, 4924, 4925, 4927, 4928, 4930, 4931, 4933, 4934, 4935, 4936, 4937, and inverters 4911, 4914, 4923, 4926, 4929, 4932, and several other logic control elements. The clock feeding these flip-flops runs at 3 seconds per cycle. The logic 1 output of NOR gate 4910 enables the counter to count up at the clock rate, and a logic 1 output on NOR gate 4913 enables the counter to count down at the clock rate. These NOR gates are controlled by the high, low, equal comparator.

The high, low, equal comparator consists of NOR gates 4801, 4803, 4806, 4807, 4809, 4810, 4938, 4939, 4940, 4941, 4921, and 4915. This logic compares the up/down counter with four bits O33, O32, O31, and O30, from the operate register 803 of FIG. 53 received over input cable TH/DB. These bits are binary weighted and matched as follows: $O33=FF\ 4901=2^0$, $O32=FF\ 4902=2^1$, $O31=FF\ 4903=2^2$, and $O30=FF\ 4904=2^3$. This is an iterative comparator which compares starting from the highest weight bit, i.e., $2^3$, and propagates toward the lowest weight bit, i.e., $2^0$. At each stage there is thus a priority depending on the binary weight, and if the answer for that stage or higher weighted stages is something other than "equal," the answer is resolved. If the answer is "equal," then the lower weight stages must resolve the answer, until the final answer high-low-equal is determined. If the bits in the "operate" register have a higher value than the counter, an up signal will be given and will remain step-by-step until the comparator says "equal," at which time the counting will stop. The opposite is true also.

The output of the up/down counter is combined with data, $\overline{O29}$, $\overline{O28}$, O29, and O28 received from the operate register 53 over input cable TH/DB; and this data is decoded and recoded to give the dynamic brake and throttle codes over output cable TH/DB, to the isolating relay driver circuits of FIG. 47. These outputs are at the top of FIGURE 48. As there shown, leads labelled "GF, BV, CV, AV, and FV" going to output cable TH/DB will be in a logic 0 condition, and all others will be in a logic 1 condition.

Referring to FIGURE 47, the logic 0's on leads labelled GF, AV, BV, and CV cause the outputs of relay drivers 4703 through 4706 to be at a −72 v. The logic 0 level on lead labelled FV is one input to NOR gate 4738. The other input is also a logic 0 at this time as flip-flop 4737 is in the reset condition. The output of NOR gate 4738 is now a logic 1 which keeps the output of relay driver 4717 in the "off" condition. Leads labelled "$\overline{O15}$ and $\overline{O16}$" will both be a logic 1 at this time causing the output of NOR gate 4733 to be a logic 0. This in turn causes the output of inverter 4734 to be a logic 1 and the output of inverter 4739 to be a logic 0. This logic 0 is amplified by current driver 4740 and causes the outputs of relay drivers 4718–4720 to be −72 v. Leads labelled "$\overline{O27}$ and $\overline{O26}$" are also a logic 0 at this time causing the outputs of relay drivers 4726 and 4727 to be a −72 v. All other relay drivers in FIGURE 47 are inhibited at this time. The outputs of the activated relay drivers now go to relays 703 via cable 754 and 755 where the associated relays are now actuated. The outputs of relay 703 go to the various control circuits as shown in FIGURE 7 including the isolating sensor circuits. Each activated relay will be putting out +72 v. causing the output of the associated isolating sensor circuit to be a logic 0.

Referring to FIGURE 46, inputs labelled AV, BV, CV, GF, ER, and FO will all be at the logic 0 level. The logic 0 input on lead labelled "AV" causes the output of inverter 4611 to be a logic 1 which in turn causes the output of inverter 4612 to be a logic 0. The output of NOR gate 4613 will now be a logic 1 which passes through OR gate 4614 causing lead labelled "T33" to be a logic 1. The logic 0 input on lead labelled "BV" causes the output of inverter 4615 to be a logic 1 which in turn causes the output of inverter 4616 to be a logic 0. The output of NOR gate 4617 will now be a logic 1 which passes through OR gate 4605 causing lead labelled "T31" to be a logic 1. The logic 0 input on lead labelled "CV" causes the output of inverter 4620 to be a logic 1 and the output of inverter 4621 to be a logic 0, which is one input to NOR gate 4623. The logic 1 input on lead labelled "DV" causes the output of inverter 4625 to be a logic 0 which is the other input to NOR gate 4623. As all three inputs to NOR gate 4623 are now at the logic 0 level, the output is a logic 1 which passes through OR gate 4624 causing lead labelled "T32" to be a logic 1. The logic 0 input on lead labelled "GF" goes to NOR gate 4628 causing its output to be a logic 1 on lead labelled "T30." The logic 0 input on lead labelled "ER" goes to NOR gate 4631 causing its output to be a logic 1 on lead labelled "T27." The logic 0 input on lead labelled "FO" goes to NOR gate 4632 causing its output to be a logic 1 on lead labelled "T26." Lead labelled "transceiver identification" is also a logic 0 at this time causing the output of NOR gate 4634 to be a logic 1 on lead labelled "T8." The logic 1 outputs of OR gates 4603, 4605, 4624 and NOR gates 4628, 4631, 4632 and 4634 go to transmit register 801 (FIG. 51) via cable labelled "parallel entry."

Referring to FIGURE 51, these logic 1 inputs on cable labelled "parallel entry" result in the setting of flip-flops 5108, 5126, 5127, 5130–5133, of which 5108 and 5133 are shown, the rest being indicated.

Transmit register 801 now contains the correct data to be sent to the master station by this transmission. The slave station programmer 812 therefore signals the error code and shift pulse circuit 903 to transmit the data contained in the transmit register in the same manner as previously described. The slave station programmer 812 now returns to the small loop A0, A1, A2, A3, A0, A1, etc. as previously described.

Reception by master station

Referring to FIGURE 63, the master station programmer 512 has been in the small loop, A10, A12, A13, A10, A12, etc., during the time that the slave station has received the transmission and has made its reply.

It is now assumed that the reply timer has not yet timed out and the master station programmer has just reached address 10. Referring to FIGURE 38, the four leads labelled "P1, $\overline{P2}$, P3, and $\overline{P4}$" going to NOR circuits 3809 ad 3810 will all be logic 0's at this time. As the transmission from the slave station is now received by error code and shift pulse circuit 603, a logic 1 is caused to be present on lead 2 labelled "message received." This holds the output of NOR gate 3810 at a logic 0 causing the output of NOR gate 3809 to be a logic 1. The logic 1 output of NOR gate 3809 goes to program register 511 via lead 14 in cable labelled "program address enable," causing flip-flop 3701 to be set at the next clock pulse. This results in sending of the next program address of A11 sent to master station programmer via cable labelled "next program address."

Address 11

The four input leads labelled "$\overline{P1}$, $\overline{P2}$, P3 and $\overline{P4}$" going to OR circuit 4006 will now be at the logic 0 level. Assuming that the address check and the code check of the incoming word were both good, the inputs to inverters 4007 and 4008 will both be logic 1's at this time. This causes their outputs to be a logic 0 making the output of OR circuit 4006 a logic 0 and the outputs of inverters 4060 and 4061 a logic 1. The logic 1 output of inverter 4061 will set flip-flop 4094 via lead 11 at the next clock pulse, and the M9 logic 1 output of flip-flop 4094 will reset reply timer 508 via lead labelled "reset 4." The logic 1 output of inverter 4060 will set flip-flop 3802 via lead 3839 at the next clock pulse. The M2 logic 1 output of flip-flop 3802 goes to the radio timer circuit 506 (FIG. 36) via lead 7 labelled "reset 2." The $\overline{M2}$ logic 0 output of flip-flop 3802 also goes to the radio timer circuit 506, FIGURE 36, via lead 43 labelled "reset 1."

These two reset inputs result in the resetting of the 60 count shift register 3631 (FIG. 36) the 63 count shift register 3634 and the continuity flip-flop 3638. Referring to FIGURE 40, the logic 1 output of inverter 4060 also goes to program register 511 via lead 17 in the cable labelled "program address enable" resulting in the resetting of flip-flops 3701 and 3704.

Address A2

This results in the next program address of A2 which is sent to master station programmer 512 via cable labelled "next program address." Referring to FIGURE 39 the five input leads to OR gate 3901 will now be at the logic 0 level causing the output to be at a logic 0. The logic 0 output of OR gate 3901 goes to operate register 503 via lead number 3921 labeled "shift control." This results in the data held in receive register 502 being shifted into operate register 503. The logic 0 output of OR gate 3901 causes the output of inverter 3908 to be a logic 1 which via lead 5 causes flip-flop 3931 to be set at the next clock pulse. The MS logic 1 output of flip-flop 3931 will reset the error code and shift pulse circuit 603 via lead number 37 labelled "reset shift control." The logic 0 output of OR gate 3901 also causes the output of inverter 3909 to be a logic 1 which goes to program register 511 via lead number 5 labelled "program address enable," resulting in the resetting of flip-flop 3702 and the setting of flip-flops 3701, 3703 and 3705. This results in the next program address of A21 sent to master station programmer via cable labelled "next program address." The master station programmer 512 is now back in the basic loop A0, A3, A21, A22, A23, A0, A3, etc., as previously described.

Address A21

Transmit register 501 will now be loaded with the latest status of all control conditions at the master station and compared with those just received from the slave station. As the two registers will compare at this time, the comparator 504 will indicate a good compare to master station programmer 512 via lead labeled "compare C" and keep the master station programmer 512 from entering into the transmit cycle again. At this point it should be mentioned that flip-flop 2908, not shown, but indicated, of receive register 502 would have been set as a result of the reply received from the slave. This in turn causes flip-flop 3008 of the operate register 503 to be set when the data is shifted from the receive register to the operate register. Referring to FIGURE 30 the O8 logic 1 output of flip-flop 3008 goes to lamp drivers 438 via lead number O8 in cable labelled "display," as an input to amplifier 3212, the amplified output from which is sent console manual control and display 435 (FIG. 23) via lead labelled "trans. 1." Referring to FIGURE 23, this logic 1 input will light lamp labelled "slave transc. 1," indicating that the slave station is still using the primary transceiver. The routine 30 second communication has thus been described in detail.

Control initiated by master station

It is now assumed that the engineer moves lever 2A2 of FIGURE 2A from the throttle 8 position to the throttle 7 position. Referring to Table 1, it can be seen that this results in a 75 r.p.m. decrease in speed by the dropping out of the AV relay which is detected by isolating sensor circuit 423 of FIGURE 4 which will now have a logic 1 output. This signal passes through recoder 434, console 435, encoder 436 and into the logic interlock and entry gates 437 as previously described. Transmit register 501 will now be loaded with the new data via path labeled "parallel data." The data now contained in transmit register 501 will be the same as before with the exception of bit 33 which will now be a logic 0. This results in a no compare condition generated by comparator 504 via lead labeled "compare C." Master station programmer 512 will now go to address 4 and into the transmit cycle as previously described.

Transmission by master station

The transmission by the master station at this time will be the same as that described for the regular 30 second communication.

Reception by slave station

The slave station will receive the transmission from the master station in the same manner as previously described for the regular 30 second communication. The data will be checked for errors and the correct address will be shifted into the operate register 803. Referring to FIGURE 53, as the 33rd bit is now a zero, flip-flop 5333 will be in the reset condition. The logic outputs of this flip-flop labelled O33 and $\overline{O33}$ go to the up-down throttle and brake counter 814 via cable labelled "TH/DB." These outputs cause the up-down throttle and brake counter to count down one step, resulting in a logic 1 output from inverter 4828. This logic 1 output goes to the isolated relay drivers 813 via lead labelled "AV" on cable labelled "TH/DB." Referring to FIGURE 47 the logic 1 input on lead labelled "AV" turns off the output of isolated relay driver 4704 which in turn causes the AV relay in 703 (FIG. 7) to drop out. This is now sensed by isolating sensor circuit 723 and sent to the logic interlock and entry gates 737 as a logic 1 condition. Referring to FIGURE 46, the logic 1 input on lead labelled "AV" causes the output of inverter 4611 to be a logic 0 and the output of inverter 4612 to be a logic 1. This holds the output of NOR gate 4613 at a logic 0 level which is received by OR circuit 4614 placing a logic 0 on lead labelled "T33." Referring to FIGURE 51, flip-flop 5133 will not be set as a result of the logic zero on lead labelled "Tee" from cable labelled "parallel entry."

Transmission by slave station

The new data now contained in the transmit register 801 will now be transmitted to the master station as previously described because of the forced no compare going to the comparator 804 causing the slave station programmer 812 to go into the transmit cycle.

Reception by master station

The reception of the reply from the slave station is handled in the same way as previously described for the regular 30 second communication. The incoming data will be checked for errors and the correct station address, and then shifted into operate register 503. Referring to FIGURE 30, flip-flop 3033 will be reset and the logic outputs labelled "O33" and "$\overline{O33}$" go to lamp drivers 438 via cable labelled "display." Referring to FIGURE 33 the logic zero input on lead labelled O33 goes to NOR gate 3307. The other two inputs will be logic zeros at this time causing the output to be a logic 1 which goes to the binary to decimal converter 3322. This circuit converts the binary code into the decimal equivalent which is TH7. The logic 1 on lead labelled TH7 goes to console manual control and display 435 to cause light TH7 to be lit at this time indicating to the engineer that the slave station is now in the throttle 7 condition.

Air brake application

Assume now that the engineer moves lever 2A2 of FIGURE 2A through the throttle positions and into the change position and goes into dynamic braking condition.

In order to increase the amount of braking, lever 2A2 is moved in the clockwise direction, the various DB1–DB8 lamps (FIG. 23) lighting as progression is made from DB1 to DB8, i.e., from the least to the greatest amount of dynamic braking. At each of the various throttle and brake positions, a transmit from the master to the slave and a reply back from the slave to the master would have taken place as previously described for the control initiated by master station.

At this time, if a very steep grade were being descended or it was desired to bring the train to a complete halt, the air brake system on the train would be used in assisting the dynamic braking of the engine. This would be accomplished by pressing and holding push-button 2B4 (FIG. 2B).

The pressing of push-button 2B4 would result in a signalling of relays 416 (FIG. 4). As the relays in 416 are actuated, a signal is sent out to isolating sensor circuit 420 via lead labelled "ABA." The output of isolating circuit 420 will now be a logic 0 which is sent to logic interlock and entry gates 437 via lead labelled "ABA."

Referring to FIGURE 24, the logic 0 input on lead labelled "ABA" causes the output of inverter 2403 to be a logic 1, resulting in the setting of flip-flop 2408 at the next clock pulse. The L2 logic 0 output of flip-flop 2408 goes to NOR gate 2409 and at address A22, when input lead labelled "entry control" is a logic 0, the output of NOR gate 2409 will be a logic 1. The logic 1 output of NOR gate 2409 is sent to transmit register 501 via lead labelled "T20" in cable labelled "parallel entry."

Referring to FIGURE 28, this would result in the setting of flip-flop 2820 not shown, but indicated, placing logic 1 on T20 and a logic 0 on $\overline{T20}$. The setting of flip-flop 2820 causes the comparator 504 to give a "no compare" signal to the master station programmer 512.

Address 3

When the master station programmer 512 reaches address A3, entry into the transmit cycle will be initiated.

Address 4

Referring now to FIGURE 38, and assuming that the master station programmer 512 has just entered address 4, the five input leads to OR gate 3811 will all be at the logic 0 level resulting in a logic 0 output. This logic 0 output of OR gate 3811 causes the output of inverter 3833 to be a logic 1 and the output of NOR gate 3836 to be a logic 0, forcing the output of inverter 3837 to be a logic 1. The logic 1 output of inverter 3837 results in the setting of flip-flop 4096 via lead 13 at the next clock pulse. The $\overline{M11}$ logic 0 output of flip-flop 4096 is one of the inputs to NOR gate 4072.

The logic 1 output of inverter 2403 (FIG. 24) also goes to NOR gate 2405 causing its output to be a logic 0. The logic 0 output of NOR gate 2405 goes to master station programmer 512 via lead labelled "$\overline{ABA}$ or $+\overline{IBA}$."

The logic 0 input enters the top of FIG. 39 over lead $\overline{IBA}+\overline{ABA}$, is labelled lead 10, passes through cables 3924 and 4087, and emerges via lead 10 as an input to NOR gate 4072. The output of NOR gate 4072 will now be a logic 1 as both inputs are logic 0. The logic 1 output of NOR gate 4072 goes to brake accumulator 505 of FIG. 34 via lead labelled "UP," and enables the brake accumulator circuit to begin counting upward from a count of 1 at a rate of 50 ms. per step (i.e., 20 c.p.s.).

Address 25

The master station programmer 512 continues through its transmit cycle as previously described and upon reaching program address A25 the three input leads to NOR gate 4054 labelled "$\overline{P1}$, $\overline{P4}$ and $\overline{P5}$" will be at the logic 0 level.

When the error code and shift pulse circuit 603 sends the signal that transmission is complete via lead "transmission complete" labelled 3, which will be a logic 0, the output of NOR gate 4054 will be a logic 1. This results in the resetting of flip-flop 4096 at the next clock pulse. The output from the $\overline{M11}$ not side of flip-flop 4096 will now be a logic 1, which causes the output of NOR gate 4072 to be a logic 0. This logic 0 output from NOR gate 4072 now stops the brake accumulator counter 505 from counting any further in the up direction.

Address 19

The master station programmer 512 will now step to the next program address of A19 and the four input leads to NOR gate 4051, labelled "$\overline{P1}$, $\overline{P2}$, P3 and $\overline{P5}$ will now all be at the logic 0 level.

As there was a brake application during this transmission, the brake-by-pass flip-flop 4093 was not set at step A17 as previously described in the regular 30-second communication. This results in a logic 0 output which goes to NOR gates 4052 and 4050. The other input to NOR gate 4052 lead 10 labelled "$\overline{IBA}+\overline{ABA}$" will remain a logic 0 as long as the engineer is depressing push-button 2B4 of FIGURE 2B. This holds the output of NOR gate 4052 in a logic 1 condition inhibiting NOR gate 4051.

When the engineer releases push-button 2B4, the output of isolating sensor circuit 420 will be a logic 1 on lead labelled "ABA" which causes the output of inverter 2403 (FIG. 24) to be a logic 0. This logic 0 goes to NOR gate 2405 as one input. The other input to NOR gate 2405 will also be a logic 0 at this time as there is no independent brake application. The output of NOR gate 2405 will now be a logic 1, and goes to master station programmer 512 via lead labelled "$\overline{ABA}+\overline{IBA}$."

Referring back to FIGURE 40, the logic 1 input on lead 10 labelled "$\overline{ABA}+\overline{IBA}$" causes the output of NOR gate 4052 to be a logic 0 enabling the output of NOR gate 4051 to be a logic 1. The logic output of NOR gate 4051 goes to logic interlock and entry gates 437 via lead 80 labelled "reset brake application" which will result in the resetting of flip-flop 2408 (FIG. 24) at the next clock pulse.

Address 20

Master station programmer 512 now advances to address A20. The four input leads to NOR gate 4056 (FIG. 40) will now be at the logic 0 level causing the output to be a logic 1. The logic 1 output of NOR gate 4056 goes to brake accumulator 505 (FIG. 34) via lead 25 labelled "down" to cause the brake accumulator circuit to begin counting down at the 50 ms. per step rate (i.e., 20 c.p.s. rate). The brake accumulator circuit will continue counting down until reaching the count 1 at which time NOR gate 3445 will be enabled and having a logic 1 output. The logic 1 output of NOR gate 3445 goes to master station programmer via lead labelled "count 1."

Referring to FIGURE 40, while the brake accumulator circuit was counting down, input lead 4077 was at a logic 0 level. This is one input to NOR gate 4050 and the other input is also at a logic 0 level as it is the logic 0 output of the brake-by-pass flip-flop 4093 which was not set. This held the output of NOR gate 4050 at a logic 1 inhibiting the output of NOR gate 4009. When the brake accumulator circuit reaches count 1, input lead 4077 to NOR gate 4050 will be a logic 1 causing its output to go to a logic 0 enabling the output of NOR gate 4009 to be a logic 1.

Address 9

Master station programmer 512 now goes to address A9 and starts timing the reply from the slave station and resets the error code and shift pulse circuit 603 via lead labelled "reset shift control."

It should be noted at this time that while master station programmer 512 was in addresses 25, 19, and 20, the output of NOR gate 4062 was held at the logic 0 level. This logic 0 was sent to the error code and shift pulse circuit 603 via lead 39 labelled "keep tone on."

Referring to FIGURE 43, the logic 0 input on lead labelled "keep tone on" is one of the inputs to NOR gate 4332. when transmission is completed, the logic 1 output from NOR gate 4310 causes a logic 0 level output from inverter 4407. This logic 0 is the other input to NOR gate 4332 via lead 4361. The output of NOR gate 4332 will be a logic 1. This logic 1 output goes to the data modulator and results in the extended tone signal at the high level as shown in FIGURE 3F, being the amount of time indicated between points I and J.

Reference is now made to the remote station logic flow chart (FIGURE 64). The air brake application transmission just described at the master station was received by the slave station in the same manner as described for the control initiated by master station. The incoming data was checked for errors and the correct station address and shifted into operate register 803 (FIG. 53).

Address 10

At address A10, the four input leads to NOR gate 6003 (FIG. 60) labelled "P1, $\overline{P2}$, P3, and $\overline{P4}$ would all be at the logic 0 level. Also, the incoming data resulted in the setting of flip-flop 5220 (FIG. 52) whose R20 logic 1 output goes to NOR circuit 5239 causing its output to be a logic 0. This logic 0 output goes to slave station programmer 812 via lead labelled "$\overline{IBA}+\overline{ABA}$."

Referring back to FIGURE 60, this logic 0 on lead labelled "$\overline{IBA}+\overline{ABA}$" now causes the output of NOR gate 6003 to be a logic 1. The logic 1 output of NOR gate 6003 goes to program register 811 of FIG. 56 via lead labelled "program address enable."

Address 12

Referring to FIGURE 56, the logic 1 input on lead 20 of cable labelled "program address enable" results in the resetting of flip-flop 5602 and the setting of flip-flop 5603 at the next clock pulse. This results in the next program address of A12 sent to slave station programmer 812 via cable labelled "next program address."

Referring to FIGURE 59, the four input leads to NOR gate 5908 and 5909 labelled "P1, P2, $\overline{P3}$ and $\overline{P4}$" will all be logic 0's at this time. The output of NOR gate 5909 will now be a logic 1 causing the output of inverter 5915A to be a logic 0. The logic 0 output of inverter 5915A is an input to NOR gates 5921 and 5922.

Referring now to FIGURE 53, flip-flop 5320 will be set as the result of having the data from the receive register shifted into it. The logic 0 output of flip-flop 5320 goes to slave station programmer 812 via lead labelled "$\overline{ABA}$."

Referring back to FIGURE 59, the logic 0 input on lead labelled "$\overline{ABA}$" goes to NOR gate 5922 which now has two logic 0 inputs forcing its output to be a logic 1. The logic 1 output of NOR gate 5922 goes to isolated relay drivers 813 via lead labelled "ABA."

Referring to FIGURE 47, the logic 1 input on lead labelled "ABA" causes the output of inverter 4732 to be a logic 0 activating isolated relay driver 4702 causing its output to be a —72 v. This output goes to relays 715 of FIGURE 7 via cables 754 and 756. This activates relays in 715 which in turn send outputs to slave control braking system 716 thereby activating the air brake system.

Referring back to slave station programmer, input lead 32 labelled "receive modem mark" in the upper right part of FIG. 58 emerges at NOR gate 5908 and will be at the logic 1 level as long as the extended brake tone is being received. This holds the output of NOR gate 5908 at the logic 0 level and prevents slave station programmer 812 from going on to the next program address, thereby applying the air brakes as long as the extended brake tone is being received.

When the extended brake tone ends, lead 32 labelled "receive modem mark" will go to a logic 0 level enabling the output of NOR gate 5908 to be a logic 1. The logic 1 output of NOR gate 5908 goes to program register 811 via lead 26 in the cable labelled "program address enable."

*Address 13*

Referring to FIGURE 56, the logic 1 input on lead 26 of cable labelled "program address enable" results in the setting of flip-flop 5601 at the next clock pulse. This results in the next program address A13 sent to slave station program 812 via cable labelled "next program address."

The four input leads to OR gate 5906 (FIG. 59) will now all be at the logic 0 level resulting in a logic 0 output. This causes the output of inverter 5912 to be a logic 1 resulting in the setting of flip-flop 5907 at the next clock pulse. The $\overline{K3}$ logic 0 output of flip-flop 5907 goes to operate register 803 via lead labelled "reset 4."

Referring to FIGURE 53, the logic 0 input on lead labelled "reset 4" causes the output of inverter 5338 to be a logic 1 resulting in the resetting of flip-flop 5320.

It should also be noted at this point that when slave station programmer 812 went from address A12 to address A13 the output of NOR gate 5909 returned to a logic 0 condition forcing the output of inverter 5915A to be a logic 1 which inhibited the output of NOR gate 5922. This resulted in the termination of the ABA signal to the isolated relay drivers which in turn stopped any further reduction in the air pressure of the air brake system.

Referring back to FIGURE 59, the logic 0 output of OR gate 5906 also causes the output of inverter 5911 to be a logic 1 resulting in the setting of flip-flop 5723 at the next clock pulse. The K9 logic 1 output of flip-flop 5723 results in the resetting of error code and shift pulse circuit 903 via lead 47 labelled "reset shift control."

The logic 0 output of OR gate 5906 also causes the output of inverter 5910 to be a logic 1 resulting in the setting of flip-flop 6022 at the next clock pulse via lead 23. The K12 logic 1 output of flip-flop 6022 will reset receive register 802 via lead labelled "clear register." The logic 1 output of inverter 5912 also goes to program register 811 via lead 25 in the cable labelled "program address enable."

*Address 1*

This results in the next program address of A1 and the slave station programmer is now back in the small loop A0, A1, A2, A3, A0, A1, etc. previously described.

*Alarm reporting initiated by slave station*

In describing the alarm reporting by the slave station, it will be assumed that the system is again operating in the normal mode with the controls in some throttle position and that continuity of the system is being maintained by the regular 30-second communications.

If a slave locomotive begins to run low on oil, a signal is generated from the train line over lead labelled "OS" isolating sensor circuit 738 of FIGURE 7 is activated. This causes the output of isolating sensor circuit 738 to be a logic 0 which is sent to the logic interlock and entry gates 737 of FIGS. 45–46 via lead labelled "OS."

Referring to FIGURE 45, the logic 0 input on lead labelled "OS" goes to NOR gate 4513. The other input to NOR gate 4513 labelled "entry control" will be a logic 0 when slave station programmer 812 reaches address A3. At this time the output of NOR gate 4513 will become a logic 1 and is sent to transmit register 801 (FIG. 51) via lead labelled "T5" on cable labelled "parallel entry."

Referring to FIGURE 51, the logic 1 input on lead labelled "T5" of cable labelled "parallel entry" result in the setting of flip-flop 5105 not shown, but indicated. The logic 1 output of flip-flop 5105 labelled "T5" of cable labelled "compare T" goes to comparator 804 of FIG. 54.

Referring to FIGURE 54, the logic 1 input on lead labelled "T5" from cable labelled "compare T" causes the output of NOR gate 5435 to be a logic 0 which indicates a no-compare condition. This, in turn, causes the slave station programmer 812 to enter into the transmit cycle.

*Transmission by slave station*

The transmission of the low oil condition from the slave station to the master station is accomplished in the same manner as previously described in the transmission by slave station during the regular 30-second communication.

*Reception by master station*

The reception of the alarm transmission from the slave station is accomplished in the master station in the same manner as previously described in the reception by the master station during the regular 30-second communication.

The incoming data would be checked for errors and the correct station address would be shifted into operate register 503 (FIG. 30).

Referring to FIGURE 30, the transmission containing the alarm of low oil results in flip-flop 3005 being set when the data is shifted from the receive register 502 to operate register 503. The logic 1 output of flip-flop 3005 is shifted to alarm control circuit 439 via lead labelled "O5" in cable labelled "alarms" when the master station programmer gives the shift control signal over the lead shift control which via inverter 3035 and gated clock amplifier causes parallel shifting out of all the information in the operate register.

Referring to FIGURE 27, the logic 1 input on lead labelled "O5" of cable labelled "alarms" results in the setting of flip-flop 2703. The logic 1 output of flip-flop 2703 causes the output of NOR gate 2710 to be a logic 0. This logic 0 activates isolating relay driver circuit 2600 causing its output to be —72 v. This in turn causes an alarm bell located in the lead engine of the front consist to begin ringing.

Referring back to FIGURE 30, the logic 1 output of flip-flop 3005 also goes to lamp drivers 438 via lead labelled "O5" on cable labelled "displays."

The logic 1 input on lead labelled "O5" from cable labelled "displays" goes to current driver 3206. The logic 1 output of current driver 3206 goes to console manual control and display 435 of FIG. 23.

Referring to FIGURE 23, the logic 1 input will light lamp labelled "LO," i.e., low oil. The engineer is now made aware of the alarm reporting by the slave station by the ringing of the alarm bell 440 and the lighting of the low oil lamp located on the console. He would then take appropriate measures to correct this alarm condition and can stop the ringing of the alarm bell by depressing push-button 2B9 of FIGURE 23. This causes a logic 1 to be sent out to alarm control circuit 439 of FIGURE 27 via lead labelled "AR."

Referring to FIGURE 27, the logic 1 input on lead labelled "AR" passes through current driver 2709 and resets flip-flop 2703 which was previously set by the low oil alarm condition. The output from A2 of flip-flop 2703 will now be a logic 0 causing the output of NOR gate 2710 to return to the logic 1 condition. This inhibits the output of isolating relay driver circuit 2600 causing the alarm bell to stop ringing.

*Dynamic braking*

Dynamic braking at the master locomotive results in like dynamic braking at the slave locomotive in a manner now described. Referring to FIGURE 4, a dynamic brake analog-to-digital converter 433 shown thereat includes input leads N, B over which negative and positive potential respectively are supplied by the 72 v.±20 v. locomotive power source. An additional input lead BC from the train line provides an analog signal which is representative of the percentage of dynamic braking being applied at the master locomotive as the engineer moves the dynamic braking lever to different position. It should be appreciated that since the 72 v.±20 v. is used to provide the analog signal, the analog signal varies with the train potential supply. If the conductor N be considered the reference point, conductor B is 70 v.±20 v. more positive than conductor N, and at any given instant time, conductor BC is at a positive potential determined by the amount of applied dynamic braking which is some factor K times 72 v.±20 v.

The A/D converter, as more fully shown in FIGURE 19, includes a signal chopper 1903 having inputs connected to conductors N and BC, and a reference chopper 1902 having inputs connected to conductors N and B. Thus, a negative reference potential is supplied over conductor N to both the signal chopper 1903 and the reference chopper 1902, and the analog signal is supplied over conductor BC to only the signal chopper 1903. The 70 v.±20 v. positive potential from the train is supplied over conductor B only to the reference chopper 1902.

The signal chopper 1903 as shown in FIGURE 20, comprises a filter which essentially eliminates large transient spikes, a bridge chopper, such as 2021, coupled via a transformer, such as 2013, to a chopper driver fed by 4.8 kc. and via another transformer 2030 to a full wave bridge rectifier, such as 2034, the output of which drives a power amplifier powered by system +12 v. and −12 v. potential. The last stage of the amplifier comprises an NPN transistor 2044 connected as an emitter-follower from which output signals are taken via conductor 1903A.

The reference chopper is similarly organized with the output signals being taken via conductor 1902A from NPN transistor 2088.

In operation, the input analog signal via conductor BC is filtered, goes through the DC-DC converter and leaves via lead 1903A. As the analog signal on conductor BC varies with respect to conductor N, a replica of the analog signal, which varies with respect to ground, is obtained via lead 1903A.

Similarly, the input positive potential received via conductor B is filtered, applied to a DC-DC converted, and leaves via conductor 1902A. As the reference signal varies with respect to terminal N, a replica of this signal which varies with respect to ground is obtained via lead 1902A.

The outputs derived over conductor 1903A, 1902A are applied to the input circuits of a plurality of different detector and amplifier circuits 1904–1911 (FIGURE 19), an illustrative one of which is shown in more detail in FIGURE 21. As there shown, the signal on lead 1903A is input to one transistor 2104 of the different amplifier, and the signal on lead 1902A via an NPN transistor 2100 is input to the second transistor 2107 of the differential amplifier. The differential amplifier transistors 2104, 2107 are supplied with constant current by means of a constant current generator including transistor 2122 connected common to the emitter of transistors 2104 and 2107. The output of the differential amplifier is fed to a voltage amplifier circuit comprising transistors 2114 and 2118, such signal being indicative of the percentage (relationship between the analog signal input to BC and the positive train potential input to terminal B) of applied dynamic braking even though the analog signal varies with variation of the train supply voltage.

The differential amplifiers 1904–1911 are each preset to operate at different percentage values of applied braking by means of an adjustable resistor 2113. Thus, such resistor 2113 in the first differential detector and amplifier 1904 is set so that the signal input to transistors 2104, 2107 will be substantially equal and a signal output obtained from transistor 2107 when the applied dynamic braking is 5%. In a similar manner, the resistors 2113 are adjusted to correspondingly different positions in the other differential detector and amplifier circuits 1905–1911 to provide output signals as the percentage of applied dynamic braking increases to 10%, 15%, etc., respectively.

It is an important feature that this converted arrangement may be adjusted to give outputs which are a function of increasing non-linear points of percentage.

Outputs from the differential detector and amplifier as provided via leads A, B, and C are interconnected as shown, and are further connected in the manner illustrated in FIGURE 19 to an encoder circuit 436 which encodes the resultant digital signals provided over conductors DB1–DB8 into message bits.

The level detectors are wired such that when a circuit such as circuit 1905 is at or above its preset level it will inhibit the output of circuit 1904; over the connection of lead A of 1905 to lead B of 1904; and 1906 will inhibit 1905 in like manner, etc. Thus, the only output is the circuit set to the threshold level being detected.

While we have shown and described what we regard to be the preferred embodiment of our invention, it will be appreciated that various changes, rearrangements and modifications may be made therein without departing from the scope of the invention, as defined by the appended claims.

What is claimed is:

1. In a control system for a railroad train having mobile units including at least a master locomotive and a remote slave locomotive, a master station on one of said units, a remote slave station on another one of said units for controlling operation of equipment at said slave locomotive, a plurality of sensor means at said master station for continuously providing indications of information relating to train operation including the condition of certain equipment at the master locomotive, transmitting means at said master station, means for providing a first word to said transmitting means having an information portion having only logic 0 and logic 1 bits which represent said information supplied by said sensor means, and an address portion having only logic 0, logic 1 bits, and a plurality of error code check bits determined by dividing the information and address bits by a generating function and adding the remainder as check bits, receiving means at said slave station coupled to said transmitting means over channel means for receiving said first word, operating means controlled by said receiving means to adjust equipment at the slave locomotive to the condition corresponding to the condition of equipment at the master locomotive indicated by bits in the word, sensor means at said slave station for providing information relating to the condition of said equipment at the slave locomotive, transmitter means at said slave station, means for providing a second word having bits which represent said information supplied by said sensor means at said slave station to transmitting means at said slave station, receiving means at said master station for receiving said second word, and operating means at said master station controlled by said receiving means to effect the display of said information in said second word to the engineer in said master locomotive.

2. A system as set forth in claim 1 which includes throttle means at the master locomotive and at the slave locomotive adjustable to vary the amount of applied throttle at the locomotives, and in which certain sensor means at said master station provide signals indicating the applied throttle at the master locomotive to said means for providing said first word, and in which said receiver means and said operating means in said slave station are controlled by the resultant first word from said master station to effect adjustment of the throttle at the slave locomotive by a corresponding amount.

3. A system as set forth in claim 1 which includes dynamic braking means at the master locomotive and the slave locomotive adjustable to change the degree of dynamic braking applied at the locomotives, and in which one of said sensor means at the master station includes analog to digital converter means for providing digital signals representative of the different degrees of dynamic braking at said master locomotive to said means for providing said first word, and means for translating said digital signals into bits for inclusion in said first word.

4. A system as set forth in claim 1 which includes dynamic braking means at the master locomotive and the slave locomotive adjustable to change the degree of dynamic braking applied at the locomotives, and in which one of said sensor means at the master station includes analog to digital converter means for providing digital signals representative of the different degrees of dynamic braking at said master locomotive to said means for providing said first word, and means for translating said digital signals into bits for inclusion in said first word and in which said receiver means and said operating means at said slave station adjust said dynamic braking means at said slave locomotive to an amount indicated by the resultant first word.

5. A system as set forth in claim 1 in which said train includes a first air brake system for the portion of the train forward of the slave locomotive, and means in said master locomotive for controlling said first air braking system, and in which certain of said sensor means includes means for providing signals which indicate said air brake application to said means for providing said first word, a second air brake system for the remaining portion of the train, and means at said remote station responsive to said resultant first word to control said second air brake system.

6. In a control system for a railroad train having mobile units including at least a master locomotive and a remote slave locomotive, a master station on one of said units, a remote slave station on another one of said units for controlling operation of equipment at said slave locomotive, transmit register means at said master station loaded with a first word having logic 0 and logic 1 bits which indicate information relating to certain equipment at the master locomotive, operate register means at said master station for storing words representative of the condition of certain equipment at the slave locomotive, code generator means for generating a secondary sync signal for each predetermined group of logic 0 and logic 1 bits in a word, each word being comprised of a plurality of said groups; transmitter means at said master station for transmitting said first word including said sync signals to said slave station, comparator means at said master station for comparing certain bits of said first and second words without said sync signals on said transmit register means and said operate register means, and means controlled by said comparator means to enable said transmitter means responsive to detection of a difference in said certain bits in the words.

7. In a control system for a railroad train having mobile units including at least a master locomotive and a remote slave locomotive, a master station on one of said units, a remote slave station on another one of said units for controlling operation of equipment at said slave locomotive, a plurality of sensor means at said master station for continuously providing indications of information relating to train operation including operation of master locomotive equipment, transmitter means at said master station, means including a transmit register means at said master station for providing a first word having certain bits which represent said information supplied by said senor means to said transmitter means and code generator means for generating a secondary sync signal for transmission with each predetermined group of logic 0 and logic 1 bits in a word, each word being comprised of a plurality of said groups, slave station transmitter means, means for providing a second word having bits which represent the corresponding information at said slave station to said slave station transmitter means, receiving means at said master station for receiving said second word, operate register means at said master station controlled by said receiving means to store said second word without said sync signal, and comparator means for comparing said first and second words as stored by said transmit register means and said operate register means, and means for initiating transmission of a word by said transmitter means responsive to detection of a miscompare signal by said comparator means.

8. In a control system for a railroad train having mobile uints including at least a master locomotive and a remote slave locomotive, a master station on one of said units, a remote slave station on another one of said units for controlling operation of equipment at said slave locomotive, transmitter means at said master station, receiving means at said remote station coupled over channel means to said transmitter means, means for providing a first word for transmission by said transmitter means to said receiving means for control of said equipment at said slave locomotive having a plurality of logic 0 and logic 1 information bits which represent the condition of equipment at said master station corresponding to said equipment at said slave station, means for providing a primary sync signal as the initial part of said word, and means for inserting a plurality of secondary sync signals in said word between at least each of a plurality of groups of information bits in said word, said sync signals including at least one of said logic 0 and logic 1 bits.

9. In a control system for a railroad train including at least a master station, a slave station remote from said master station for controlling from said master station operation of equipment at said remote station corresponding to similar equipment at said master station, transmitter means at said master station and receiver means at said remote station linked by a communicating channel, means for providing a first word for transmission by said transmitter means over said channel comprised of a plurality of logic 0 and logic 1 message bits which represent the condition of said equipment at said master station, means for providing a primary sync signal as the initial part of said word, means for inserting a secondary sync signal in said word between at least a first and a second one of said message bits of said word which sync signal is comprised of at least one logic 0 bit and at least one logic 1 bit.

10. In a control system for a railroad train including at least a master station, a slave station remote from said master station for controlling from said master station operation of equipment at said remote station corresponding to similar equipment at said master station, transmitter means at said master station for transmitting word messages over a channel to said remote station, means for generating said words for transmission each of which is comprised of a primary sync signal, a plurality of message bits comprised of a plurality of logic 0 and logic 1 bits which represent the condition of certain equipment at said master station, a plurality of secondary sync signals in said word at least one of which is positioned between a plurality of said message bits, at least one other of which is position between a plurality of the bits of the address of the remote station, and a further one of which is positioned between a plurality of error checking bits, said address bits and said error checking bits being comprised of logic 1 and logic 0 bits.

11. A system as set forth in claim 10 in which said master station includes means for dividing the message bits of the word by a primitive polynomial to derive said error bits for said word.

12. A system as set forth in claim 10 in which said remote station includes receiver means for receiving said words, register means for storing the received word messages, means for detecting the presence of said secondary sync signals in said received words, and means for terminating further registration of a word in the absence of a secondary sync signal in its assigned place in each word.

13. In a control system for a railroad train having mobile units including a master station on one of said units, a remote slave station on another one of said units for controlling operation of equipment at one slave locomotive at least, from a master locomotive, transmitter means at said master station, means for providing a first word for transmission of said transmitter means which includes at least a plurality of message bits which represent the condition of the equipment at said master station, and secondary sync signals between certain of said message bits, receiver means at said remote slave station, circuit means including counting means for measuring a predetermined time period, means for starting said counting means with receipt of a secondary sync signal in a word, and detection means for providing a signal indicating receipt of an invalid word with failure to receive at least a portion of one further sync signal in said predetermined time period.

14. A system as set forth in claim 13 which includes means responsive to receipt of at least a portion of a sync signal during a predetermined end portion of said time period to restart said counting means.

15. A system as set forth in claim 13 which includes means for resetting said counting means prior to complete measurement of said predetermined time period, and means for restarting said counting means only with receipt of a secondary sync signal in the period subsequent to said to reset and prior to the end of said measured period.

16. A system as set forth in claim 13 in which said circuit means includes register means, and gating means for shifting each message bit to said register means at predetermined intervals in said predetermined time period.

17. In a control system for a railroad train having mobile units including a master station on one of said units, a remote slave station on another one of said units for controlling operation of equipment at one slave locomotive at least, transmitter means at said master station, means for providing a first word for transmission by said transmitter means which includes at least a primary sync signal, a plurality of message bits which represent the condition of the equipment at said master station, and a secondary sync signal prefixing each two message bits, receiver means at said remote slave station, clock means for providing pulses at a predetermined rate and means including counting means for counting said pulses to measure a predetermined time period, means for starting said counting means with receipt of the first secondary sync signal of the word, means operative a first given number of counts after start to strobe the first information bit after said first secondary sync signal, means operative a second given number of counts after start to strobe the second information bit, means for resetting said counting means after a third given number of counts, means for restarting said counting means responsive to receipt of the next secondary sync pulse prior to the end of said predetermined time period, and means providing a signal indicating an invalid word receipt with failure to receive the next secondary sync signal in said predetermined time period.

18. In a control system for a railroad train having mobile units including at least a master locomotive and a slave locomotive, a master station on one of said units, a remote slave station on another one of said units for controlling operation of equipment at said slave locomotive, a first air brake system for the portion of the train forward of the slave locomotive and a second air brake system for the remaining train portion, each system including air reservoir control means, start means at said master station for releasing air from the reservoir of said first air brake system in the application of the brakes controlled by said first system, measuring means for precisely measuring the period of air release in said first system, transmitter means at said master station, means for providing a word for transmission by said transmitter means which includes at least one bit, requesting release of air from the reservoir in said second system at said remote station, and signal means at said master station for providing a signal for transmission to said remote station after termination of said word which is of a duration equal to the duration of the period of air release in said first system.

19. A system as set forth in claim 18 in which said measuring means includes accumulator means enabled responsive to operation of said start means to count up from a predetermined value until termination of transmission of said word, and means responsive to release of said start means for controlling said accumulator means to initiate count down to said predetermined value, and means for enabling said signal means at the time of termination of the count up by said accumulator means until count down of said accumulator means at the end of said predetermined value.

20. In a control system for a railroad train having mobile units including at least one master locomotive and one slave locomotive each of which includes a dynamic braking system, a master station on one of said units, a remote slave station on another one of said units for controlling operation of equipment at said slave locomotive, transmitter means at said master station, control means for applying a plurality of small incremental steps, of dynamic braking at said master locomotive and means for providing a first word for transmission by said transmitter means to receiver means at said remote station which includes at least one message bit which represents the percentage step of braking applied at said master locomotive station, including means for providing an analog signal having a value selected to the percentage of applied dynamic braking, and analog to digital converter means for providing different digital signals to represent the different percentage steps of applied dynamic braking power, and encoder means for translating said digital signals into corresponding message bits.

(References on following page)

References Cited

UNITED STATES PATENTS

| | | | |
|---|---|---|---|
| 1,786,815 | 12/1930 | Aspinwall | 140—93 |
| 1,900,404 | 3/1933 | Grondahl | 246—63 |
| 1,900,405 | 3/1933 | Bossart | 246—63 |
| 1,900,408 | 3/1933 | Sorensen | 246—63 |
| 2,242,196 | 5/1941 | Thompson et al. | 178—69 |
| 2,337,717 | 12/1943 | Hines | 105—61 |
| 2,354,534 | 7/1944 | Mason | 178—69 |
| 2,620,394 | 12/1952 | Valensi | 340—147 |
| 2,626,382 | 1/1953 | Coley | 340—26 |
| 3,158,409 | 11/1964 | Hughson et al. | 303—15 |
| 3,268,727 | 8/1966 | Shepard | 246—187 |

ARTHUR L. LAPOINT, *Primary Examiner.*

S. B. GREEN, B. FAUST, H. BEITRAN,
*Assistant Examiners.*